(12) United States Patent
Kudo et al.

(10) Patent No.: US 10,795,195 B2
(45) Date of Patent: Oct. 6, 2020

(54) LIQUID CRYSTAL DISPLAY APPARATUS

(71) Applicant: Mitsubishi Electric Corporation, Tokyo (JP)

(72) Inventors: Yukihiro Kudo, Tokyo (JP); Koji Yonemura, Tokyo (JP); Hiroshi Umeda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/371,152

(22) Filed: Apr. 1, 2019

(65) Prior Publication Data

US 2019/0324310 A1    Oct. 24, 2019

(30) Foreign Application Priority Data

Apr. 19, 2018 (JP) .................................. 2018-080777

(51) Int. Cl.
  *G02F 1/1333* (2006.01)
  *G02F 1/1339* (2006.01)
(52) U.S. Cl.
  CPC ........ *G02F 1/13338* (2013.01); *G02F 1/1339* (2013.01); *G02F 1/133305* (2013.01); *G02F 1/133308* (2013.01)
(58) Field of Classification Search
  CPC .................................................. G02F 1/13338
  See application file for complete search history.

(56) References Cited

U.S. PATENT DOCUMENTS

| | | | |
|---|---|---|---|
| 2014/0092350 A1* | 4/2014 | Byeon ................... | G02F 1/1339 349/106 |
| 2014/0347614 A1* | 11/2014 | Asada ............... | G02F 1/133707 349/123 |
| 2015/0316810 A1* | 11/2015 | Shibahara ............. | G02F 1/1333 349/150 |
| 2017/0160580 A1* | 6/2017 | Song .................... | G02B 6/0051 |
| 2018/0173034 A1 | 6/2018 | Yonemura et al. | |
| 2019/0064572 A1* | 2/2019 | Park .................... | G02F 1/13394 |
| 2019/0271874 A1* | 9/2019 | Fu ...................... | G02F 1/133308 |

FOREIGN PATENT DOCUMENTS

| | | |
|---|---|---|
| JP | 2007272107 A | 10/2007 |
| JP | 2012133428 A | 7/2012 |
| JP | 2013125261 A | 6/2013 |

* cited by examiner

*Primary Examiner* — Edmond C Lau
(74) *Attorney, Agent, or Firm* — Studebaker & Brackett PC

(57) ABSTRACT

A liquid crystal display apparatus of the present invention includes a housing holding an outer peripheral portion of a liquid crystal panel with gap portions provided in a central portion thereof such that a curvature of a curved shape is variable when a surface pressing stress is applied, in which columnar spacers are arranged at a higher density in a region of the central portion in a curve direction than in a region of a peripheral portion, the density being the density of the columnar spacers holding a gap between glass substrates in a display region of the curved liquid crystal panel.

26 Claims, 27 Drawing Sheets

F I G. 8
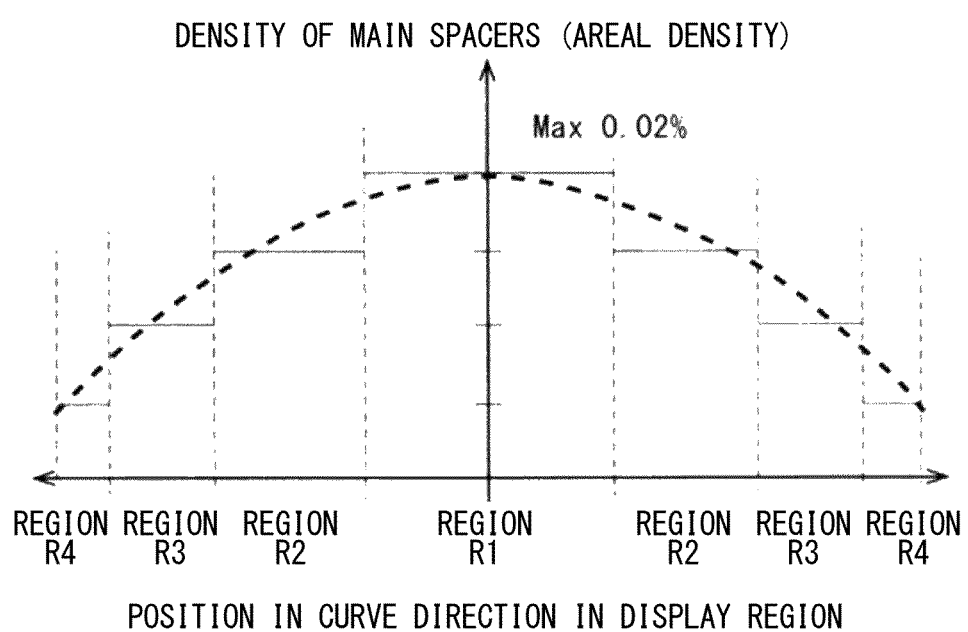

LIQUID CRYSTAL DISPLAY APPARATUS

BACKGROUND OF THE INVENTION

Field of the Invention

The present invention relates to a liquid crystal display apparatus, and particularly to a curved liquid crystal display apparatus including a curved liquid crystal panel.

Description of the Background Art

From the viewpoint of designability and space saving, the necessity of a curved display apparatus (also referred to as a curved display), which is a display apparatus having a curved display screen, has increased. As a form of this curved display, there are a type of using a liquid crystal display apparatus (also referred to as a liquid crystal display) in which a liquid crystal panel forming the liquid crystal display is curved, a type of using an organic EL display apparatus (also referred to as an organic EL display) in which an organic EL panel forming the organic EL display is curved, and the like.

First of all, it is possible to say that the curved display of the type in which the organic EL panel is curved, which is the latter, is suitable for an application to the curved display since it is comparatively easy to form the organic EL panel using a flexible substrate such as a plastic substrate, but the number of manufacturers stably mass-producing curved displays is small because manufacture of the organic EL panel itself requires high cost and mass-production techniques therefor are not sufficiently established, and there is a problem in terms of reliability. Particularly, curved displays that have problems in terms of reliability are not suitable due to the nature of products in automotive applications where the curved displays have been demanded in recent years. Therefore, at the present moment, the curved display of the type in which the liquid crystal panel is curved, which is the former, is adopted in many cases particularly in the automotive applications and the like.

On the other hand, in the curved display of the type in which the liquid crystal panel is curved, it is difficult to use a plastic substrate basically due to constraints such as heat-resistance with respect to processing temperature of a realistic manufacturing process, a positional shift, and the like of the liquid crystal panel. For example, a curved display configured using a liquid crystal panel using a plastic substrate has been limitedly used for an application to perform relatively simple display of characters, figures, and the like such as a wristwatch application. Therefore, a liquid crystal panel is configured using a glass substrate in the case of a curved display for a general application which can perform relatively complicated display such as video display, for example, as described in Japanese Patent Application Laid-Open No. 2007-272107. Such a curved display configured using the glass substrate adopts a configuration in which a liquid crystal panel, obtained by performing a thinning process (also referred to as a slimming process), which is a process of thinning the thickness of the glass substrate, is produced at the time of curving the liquid crystal panel in order to give flexibility to the glass substrate to such an extent that the glass substrate can be curved with a desired curvature, and then, the liquid crystal panel is curved.

As described above, a glass substrate having a thickness of about 0.1 mm to 0.2 mm is used for the thinned glass substrate to form the liquid crystal panel used for the curved display. For example, Japanese Patent Application Laid-Open No. 2007-272107 describes a configuration in which a glass substrate of 0.7 mm forming a liquid crystal panel is thinned up to 0.25 mm, and then, is formed into a curved shape. Such a glass substrate having a thickness of about 0.1 mm to 0.2 mm, as a matter of course, has extremely weak strength, and the strength of the liquid crystal panel configured using the thinned glass substrate is weak as a whole. Meanwhile, it has also been demanded that the curved display incorporate a touch panel function. Particularly when the touch panel function is provided, it is assumed that a person touches a display surface of the display for a touch panel operation, an external pressure (external force: hereinafter referred to as surface pressing stress), applied as the person touches the surface of the liquid crystal panel constituted by such a thinned glass substrate, is applied, a technical problem such as damage of the liquid crystal panel occurs. Even when no touch panel function is provided, there are opportunities for people to touch the liquid crystal panel although the frequency is low, and still there are opportunities of such an application of the surface pressing stress. That is, even if there is a difference in degree, the curved displays of the type in which the liquid crystal panel is curved generally have the common technical problem that the liquid crystal panel constituted by the thinned glass substrate is easily damaged, which is a first major problem.

Further, as problems caused by the surface pressing stress being applied as a person touches the liquid crystal panel in the general curved displays of the type in which the liquid crystal panel is curved, not only the above-described damage is concerned but also a cell gap becomes narrow as the surface pressing stress is directly applied in a pressed portion even if the application of the surface pressing stress does not lead to the damage. Further, the cell gap varies even when a curved shape changes due to action of the surface pressing stress on the liquid crystal panel and action of a holding stress by a holding portion. As a result, when the cell gap of the liquid crystal panel varies nonuniformly within a plane, display unevenness is visually recognized, and such generation of the display unevenness is also a problem that coexists with the damage of the liquid crystal panel itself. Particularly, in addition to the action of direct surface pressing stress and the action of holding stress by the housing, a relationship between the volume of the cells forming the liquid crystal panel and the volume of the sealed liquid crystal and a relationship with holding of the cell gap by the spacer in the liquid crystal panel complicatedly act on the gap variations when the surface pressing stress is applied to the curved display. As a result, the cell gap of the liquid crystal panel nonuniformly varies in the plane, which leads to the display unevenness. The surface pressing stress is applied as the person touches the liquid crystal panel so that display unevenness occurs, which is a second major problem.

For example, Japanese Patent Application Laid-Open No. 2007-272107 discloses a configuration in which a frame-shaped stress buffer material is mainly arranged between a peripheral edge portion of the liquid crystal panel and the housing concerning that display unevenness occurs as the cell thickness is non-uniform when the external stress acts on the liquid crystal panel due to the action caused by holding or thermal action caused by a thermal expansion difference between the respective members at the time of holding the liquid crystal panel in a predetermined curved shape by the housing so as to hold the liquid crystal panel in the curved shape via the stress buffer material, as a problem slightly similar to the above-described second problem without focusing on the easy damage which is the first problem described above when the liquid crystal panel configured using the glass substrate having the thickness of 0.25 mm is used as the curved display. As an example of focusing on the easy damage in the first problem, for example, Japanese Patent Application Laid-Open No. 2012-133428 discloses a configuration of a curved display of a type in which a liquid crystal panel is curved, in which a touch panel, which is arranged to adhere to the liquid crystal panel formed in a curved shape via an adhesive layer having a predetermined film thickness on a display surface side, and a surface protection plate formed in a curved shape is arranged on the outer side of the touch panel are arranged as a configuration that aims at suppression of a decrease in touch panel detection sensitivity caused by a deformation of a display screen or substrate cracking at the time of operating the touch panel and noise from the liquid crystal panel particularly in the case of having a touch panel function.

However, Japanese Patent Application Laid-Open No. 2007-272107 and Japanese Patent Application Laid-Open No. 2012-133428 do not focus on both the two major problems generated by the surface pressing stress applied as the person touches the liquid crystal panel in the above-described curved display of the type in which the liquid crystal panel is curved, and do not disclose a configuration or a method capable of collectively solving both the problems in a balanced manner.

Specifically, even if the configuration of Japanese Patent Application Laid-Open No. 2007-272107 is used, no solution is illustrated with respect to, for example, the direct action of the surface pressing stress generated by the surface pressing stress applied as the person touches the liquid crystal panel, the action by the holding stress generated by the housing, and the variation of the cell gap caused by the influence of the configuration inside the liquid crystal panel, and the accompanying display unevenness although countermeasures against the variation of the cell gap generated by the stress applied to the liquid crystal panel from the housing and the accompanying display unevenness are taken with respect to the two major problems.

Even if the configuration of Japanese Patent Application Laid-Open No. 2012-133428 is used, it is expected that the direct action of the surface pressing stress applied from the front side on the liquid crystal panel is mitigated by the surface protection plate or the adhesive layer arranged on the front side with respect to the above two major problems. However, a holding mode using the housing of the liquid crystal panel is not specifically illustrated, for example, and thus, a stress held by the housing is applied to the back side of the liquid crystal panel when being pressed from the front side in the case of holding the back side of the liquid crystal panel with the housing so that there is a concern that the liquid crystal panel may be damaged from the back side. Further, similarly to Japanese Patent Application Laid-Open No. 2007-272107, no solution is illustrated for the action of holding stress generated by the housing, and the variation of the cell gap caused by the influence of the configuration inside the liquid crystal panel and accompanying display unevenness, although the action of mitigating the variation of the cell gap caused by the direct action of the surface pressing stress on the liquid crystal panel is expected.

SUMMARY

An object of the present invention is to prevent damage of a liquid crystal panel in a curved liquid crystal display apparatus having the curved liquid crystal panel and to make display unevenness less likely to occur when a person touches the liquid crystal panel.

A liquid crystal display apparatus according to a first aspect of the present invention has a configuration in which a liquid crystal panel including a pair of glass substrates is incorporated in a curved shape curved in one curve direction. Regarding a density of a columnar spacer holding a gap between the pair of glass substrates in a display region of the liquid crystal panel in a state where an external force except for an atmospheric pressure is not applied to a surface of the liquid crystal panel, the density in a region of a central portion in the curve direction is higher than the density of a region of a peripheral portion in the curve direction. Further, the liquid crystal display apparatus includes a housing that holds an outer peripheral portion of the liquid crystal panel such that a curvature of the curved shape is variable when the external force is applied to the surface of the liquid crystal panel and holds at a state where a gap portion is provided in the liquid crystal panel at the central portion of the liquid crystal panel.

A liquid crystal display apparatus according to a second aspect of the present invention has a configuration in which a liquid crystal panel including a pair of glass substrates is incorporated in a curved shape curved in one curve direction. The liquid crystal display apparatus includes a housing that holds an outer peripheral portion of the liquid crystal panel such that a curvature of the curved shape is variable when an external force is applied to a surface of the liquid crystal panel. The outer peripheral portion of the liquid crystal panel is held by the housing in such a manner that the housing holds two non-curved sides in a direction perpendicular to the curve direction among four sides of the outer peripheral portion of the liquid crystal panel. A gap portion is provided between the housing and the liquid crystal panel on both two sides along the curve direction in a state where the external force is not applied in the central portion in the curve direction. Alternatively, when the liquid crystal panel is integrated with another member to form a stacked body, a gap portion is provided between the housing and the other member on both the two sides along the curve direction in a state where the external force is not applied in the central portion in the curve direction.

A liquid crystal display apparatus according to a third aspect of the present invention has a configuration in which a liquid crystal panel including a pair of glass substrates is incorporated in a curved shape curved in one curve direction. The liquid crystal display apparatus includes a housing that holds an outer peripheral portion of the liquid crystal panel such that a curvature of the curved shape is variable when an external force is applied to a surface of the liquid crystal panel. The outer peripheral portion of the liquid crystal panel is held by the housing with a buffer member interposed between the housing and the liquid crystal panel on all of four sides of the outer peripheral portion of the liquid crystal panel. Alternatively, when the liquid crystal panel is integrated with another member to form a stacked body integrated, the outer peripheral portion of the liquid crystal panel is held by the housing with a buffer member interposed between the housing and the other member on all of four sides of the outer peripheral portion of the liquid crystal panel. The buffer members provided on both two sides along the curve direction are made of a member having a larger deformation amount when a pressure is applied as compared with the buffer members provided on the two non-curved sides.

In the liquid crystal display apparatus including the curved liquid crystal panel, it is possible to prevent the damage of the liquid crystal panel or to make the display unevenness less likely to occur when a person touches the liquid crystal panel.

These and other objects, features, aspects and advantages of the present invention will become more apparent from the following detailed description of the present invention when taken in conjunction with the accompanying drawings.

BRIEF DESCRIPTION OF THE DRAWINGS

FIG. 8 is an explanatory view illustrating another setting example relating to the density distribution of the columnar spacers;

DESCRIPTION OF THE PREFERRED EMBODIMENTS

First Preferred Embodiment

Figure 1:
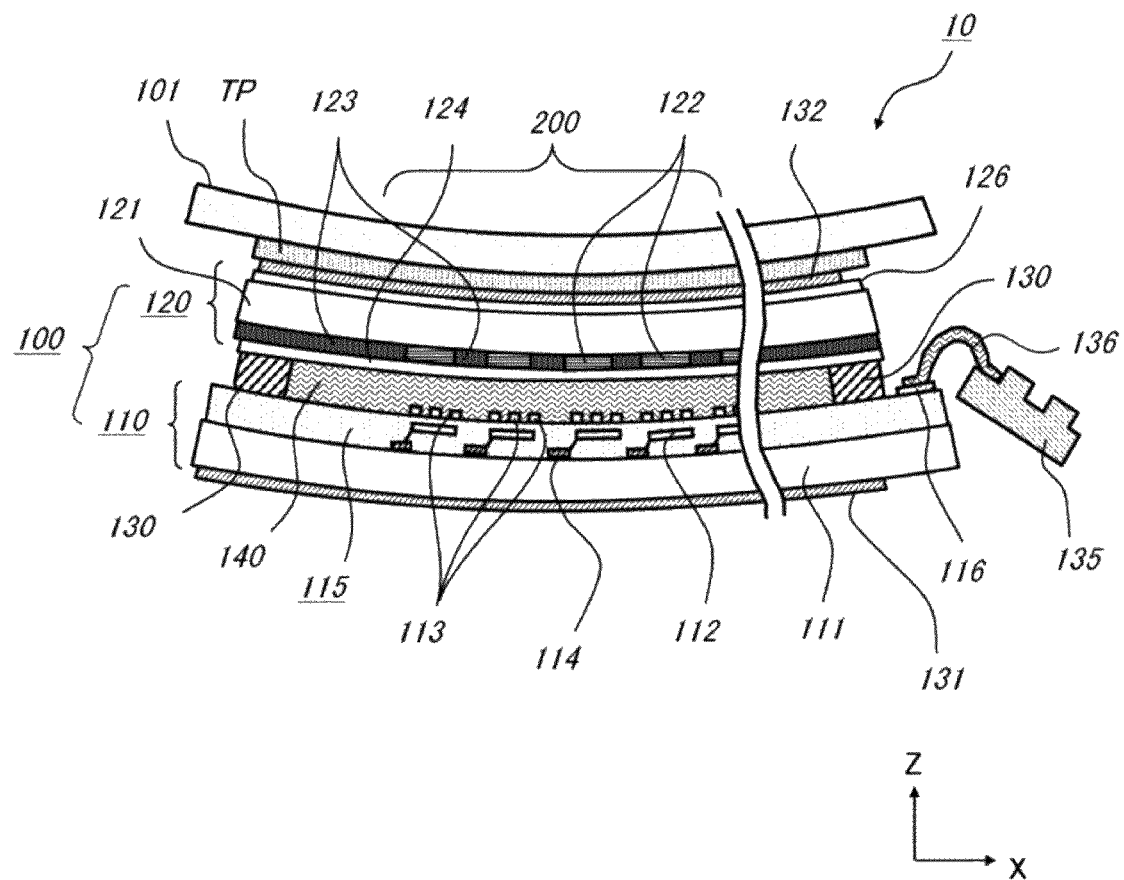
FIG. 1 is a cross-sectional view mainly illustrating a liquid crystal panel in a liquid crystal display apparatus according to a first preferred embodiment of the present invention.
Figure 2:
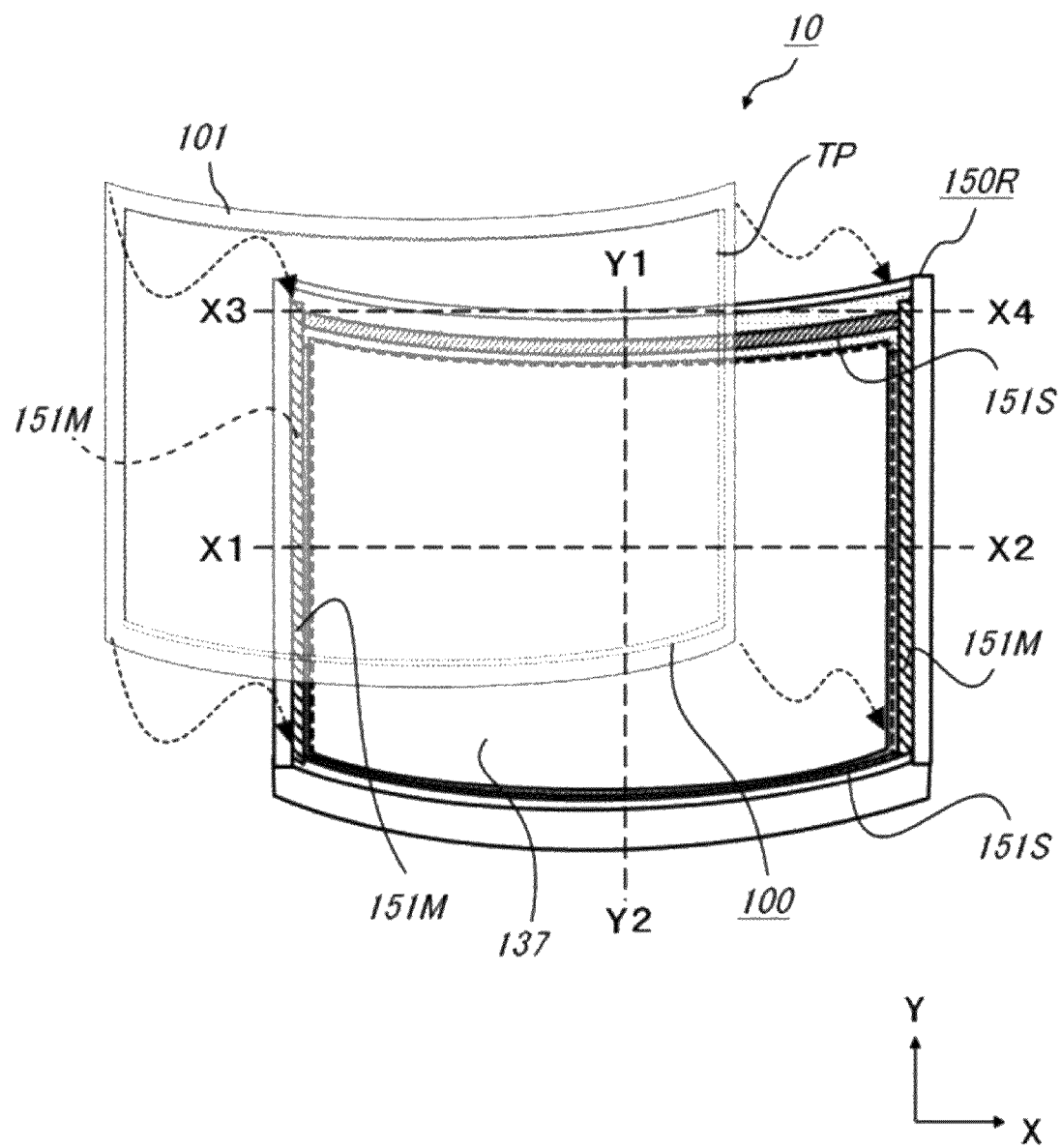
FIG. 2 is an overall view of the liquid crystal panel and a housing in the liquid crystal display apparatus according to the first preferred embodiment of the present invention.
Figure 3A:
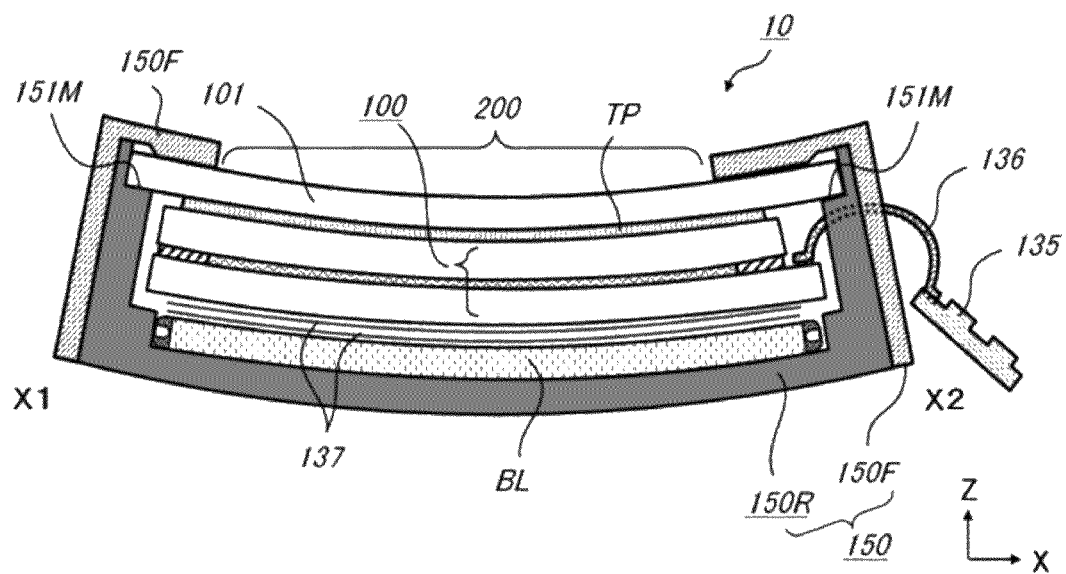
FIGS. 3A and 3B are cross-sectional views of the liquid crystal panel in the liquid crystal display apparatus according to the first preferred embodiment of the present invention.
Figure 3B:
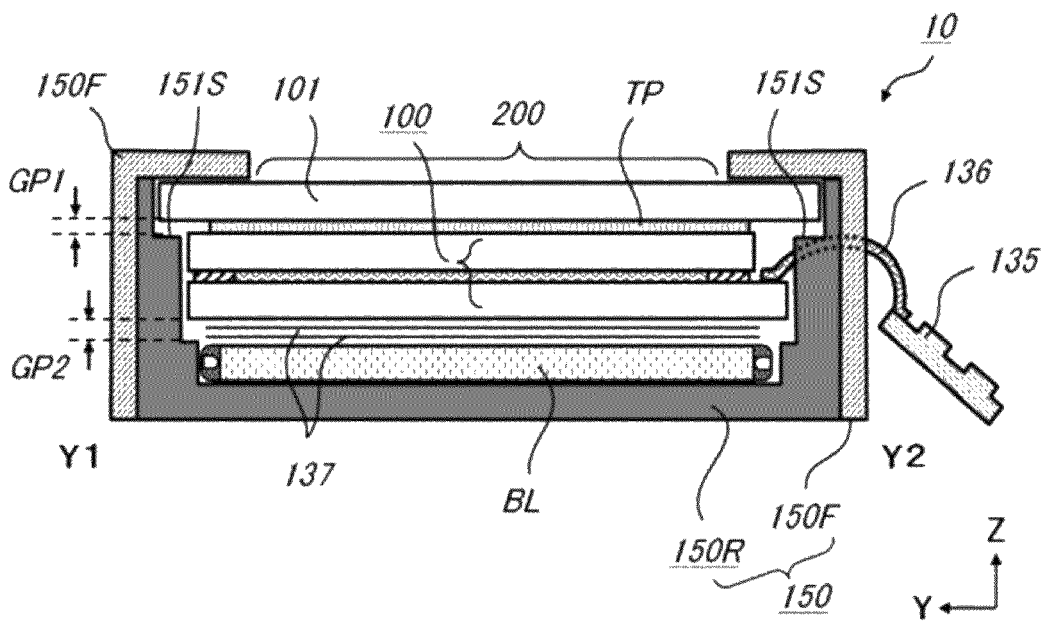
Figure 4:
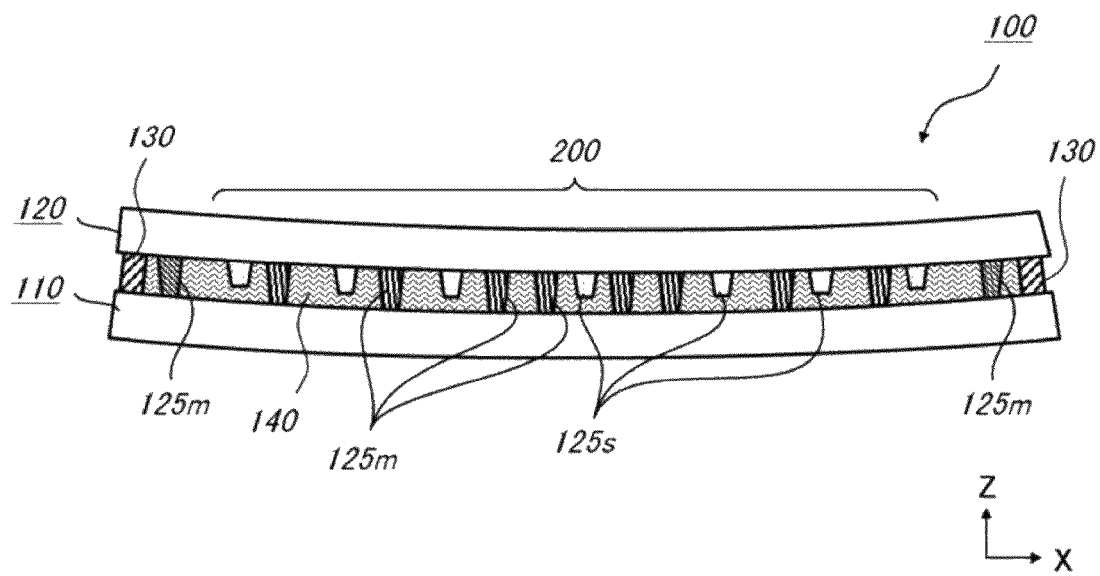
FIG. 4 is a cross-sectional view of a main part of the liquid crystal panel in the liquid crystal display apparatus according to the first preferred embodiment of the present invention.
Figure 5:
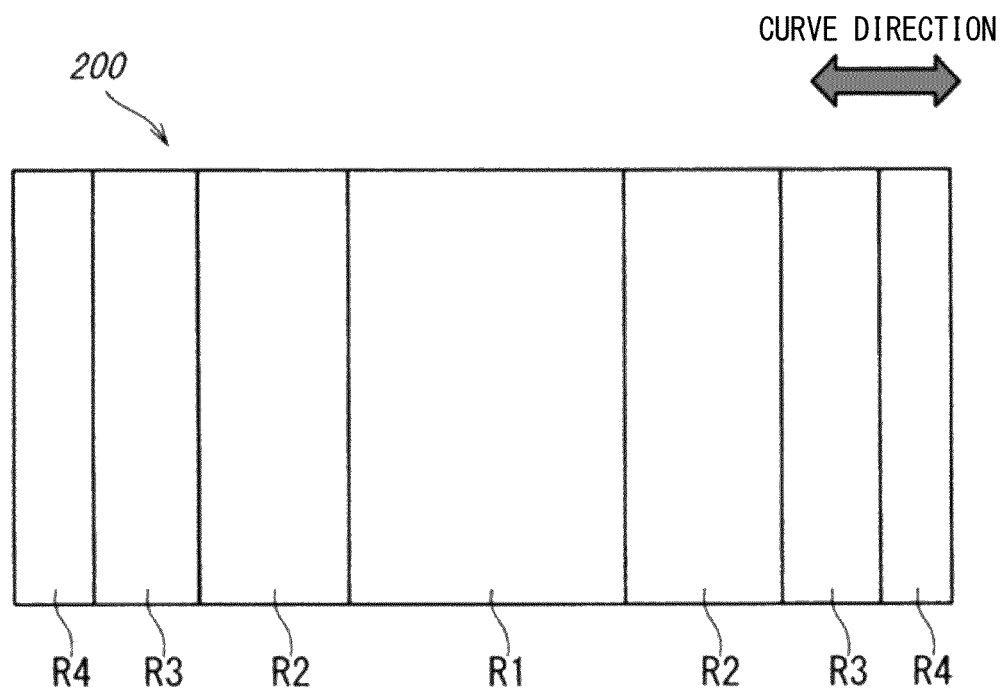
FIG. 5 is a view for describing a density distribution of columnar spacers.
Figure 6A:
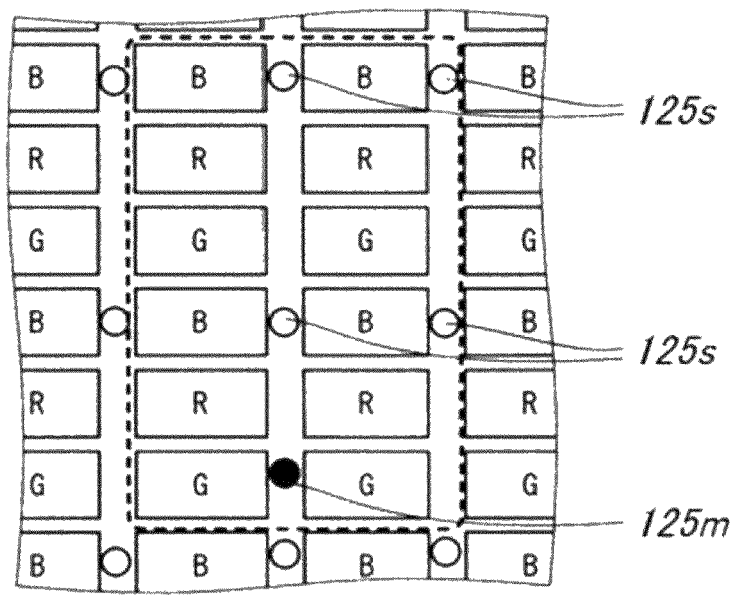
FIGS. 6A and 6B are views illustrating arrangements of the columnar spacers in regions R1 and R4 according to the first preferred embodiment.
Figure 6B:
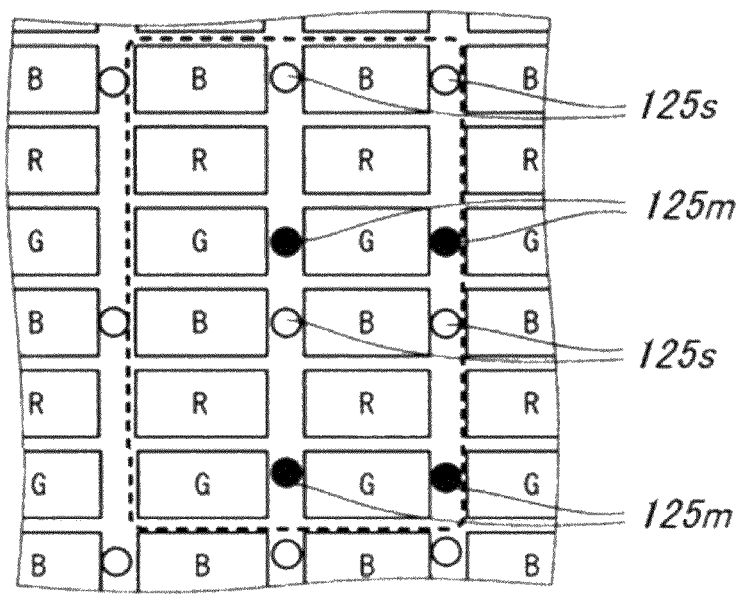
Figure 7A:
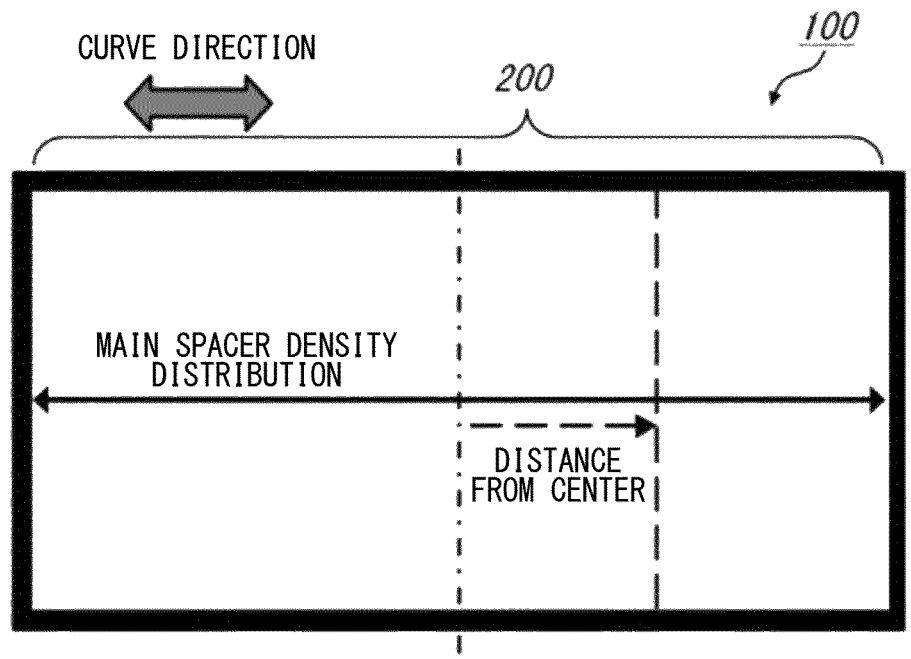
FIGS. 7A and 7B are explanatory views illustrating a setting example relating to the density distribution of the columnar spacers.
Figure 7B:
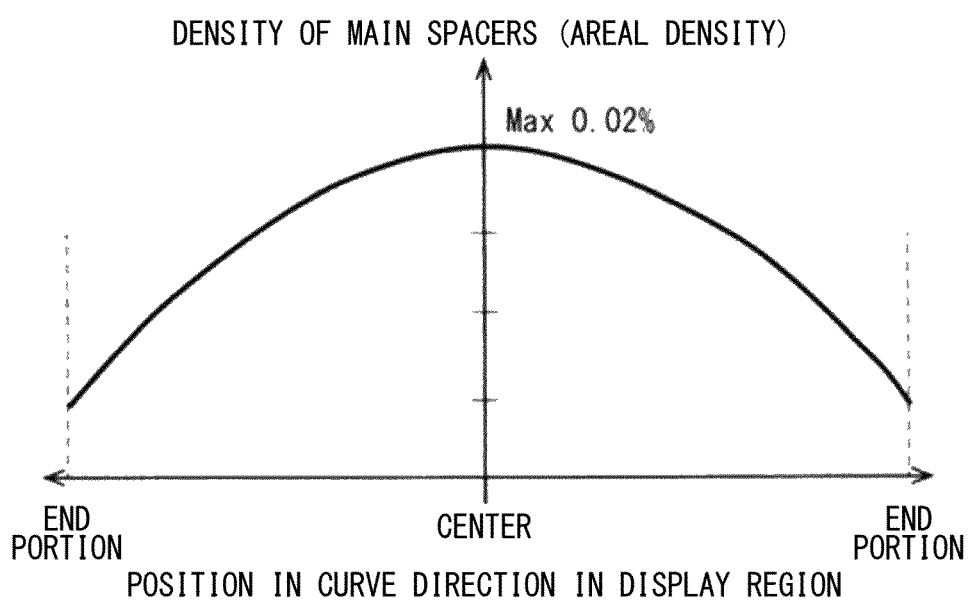

A description will be given regarding a configuration of a curved display of a first preferred embodiment which is a curved liquid crystal display apparatus including a curved liquid crystal panel, the liquid crystal display apparatus of the first preferred embodiment which is an example to which the present invention is applied with reference to FIGS. 1 to 7B. FIG. 1 is a schematic diagram illustrating a cross-sectional view of an overall configuration of a liquid crystal panel 100 forming a curved display 10. FIGS. 2 to 3B are explanatory views illustrating an overall configuration of the curved display 10 and particularly illustrating a mode of holding the curved display 10 by a housing of the liquid crystal panel 100 which is one main part of the present invention. FIG. 2 illustrates an overall view of the liquid crystal panel 100 and the housing holding the liquid crystal panel 100, FIG. 3A corresponds to a cross-sectional view in a direction along a curve direction (a vicinity of a central portion: a position along cross-sectional line X1-X2 in FIG. 2), and FIG. 3B corresponds to a cross-sectional view in a direction perpendicular to the curve direction (a vicinity of the central portion: a position along cross section line of Y1-Y2 in FIG. 2). FIGS. 4 to 7B are explanatory views for describing a detailed arrangement of a columnar spacer provided between an array substrate and a counter substrate forming the liquid crystal panel 100 which is another main part of the present invention. FIG. 4 illustrates a cross-sectional view of the liquid crystal panel 100 (conceptual view relating to an arrangement density of columnar spacers in the curve direction, that is, a direction parallel to an X direction in the drawing), FIG. 5 is a plan view of a display region 200 for describing a density distribution of columnar spacers, FIGS. 6A and 6B are plan views illustrating an arrangement of columnar spacers in each of regions (R1 and R4) illustrated in FIG. 5, and FIGS. 7A and 7B are explanatory views of a setting example relating to the density distribution of columnar spacers.

Incidentally, the drawings are schematic and do not reflect exact sizes of the illustrated constituent elements. In particular, regarding the arrangement between the array substrate and the counter substrate, a distance between the substrates and a length in a direction perpendicular to the substrate surface are exaggeratedly illustrated as compared with each thickness of both the substrates for convenience of the description. Further, in order not to make the drawing complicated, parts other than the main part of the present invention are omitted and some of the configurations are simplified as appropriate. The same description also applies to the following drawings. Further, in the following drawings, the same reference signs are assigned to the same constituent elements as those described in the previous drawings, and descriptions thereof will be omitted as appropriate.

In the following description, first, a detailed description mainly regarding a configuration of the liquid crystal panel 100 part with reference to FIG. 1 (partly see also FIGS. 3A to 4), then, a detailed description mainly regarding the holding mode of the liquid crystal panel 100 by the housing, relating to the entire configuration of the curved display 10 with reference to FIGS. 2 to 3B, and finally, a detailed description regarding an arrangement of columnar spacers in the liquid crystal panel 100 with reference to FIGS. 4 to 7B will be sequentially given.

<Configuration of Liquid Crystal Panel Part>

First, the overall configuration of the liquid crystal panel 100 part in the curved display of the first preferred embodiment will be described with reference to FIG. 1. Here, a description will be given regarding a case, as an example, in which the present invention is applied to the curved display 10 having a configuration in which the liquid crystal panel 100 using a fringe field switching (FFS) type is incorporated in a curved shape to be curved in one direction among transverse electric field type liquid crystal panels operated using a thin film transistor (TFT) as a switching element.

As illustrated in FIG. 1, the curved display 10 includes: the liquid crystal panel 100 as the main configuration; a curved transparent protection cover 101 made of a transparent protection plate that has a holding surface having a curved surface with a predetermined curvature; and a touch panel TP. The touch panel TP and the liquid crystal panel 100 are pasted and integrated to each other via an adhesive layer (not illustrated) made of a transparent pressure-sensitive adhesive sheet or an adhesive along the curved surface of the holding surface provided on the curved transparent protection cover 101, thereby forming a stacked body. As the order of stacking the respective components in the stacked body, the touch panel TP and the curved transparent protection cover 101 are stacked in this order on a front side of the liquid crystal panel 100, that is, on a display surface side on which an image is displayed, and the curved transparent protection cover 101 is arranged on the foremost surface that is likely to be directly touched by a person. Incidentally, the curved transparent protection cover 101 used here is molded so as to maintain a curved shape with a predetermined curvature singly, that is, in a state where no external force is particularly applied. Regarding the touch panel TP, a touch panel of any known type, such as an optical type, a resistive film type, and a projected capacitive type (also referred to as a PCAP type), may be selected. Here, the touch panel of the projected capacitive type is selected as a preferable combination with the present invention that is excellent in operability by a human finger and is a main countermeasure against the surface pressing stress.

As specific configurations, the liquid crystal panel 100 is constituted by: a TFT array substrate (hereinafter referred to as array substrate) 110 in which TFTs are arrayed and arranged; a color filter substrate (hereinafter referred to as a counter substrate) 120 arranged to oppose the array substrate 110 and having the display region 200 to display an image; a sealing material 130 arranged so as to surround a region corresponding to the display region 200 between the array substrate 110 and the counter substrate 120 and made of a resin pasting both the substrates to each other; and a liquid crystal layer 140 surrounded by the sealing material 130 and sandwiched by regions corresponding to the display region 200 between the array substrate 110 and the counter substrate 120. Further, an appearance curved with a predetermined curvature in a direction in which the counter substrate 120 side, which is the display surface side on which the image is displayed, has a concave surface is formed in a state where the curved display 10 is configured. Incidentally, the curve direction is a direction in which a curvature of a curve is the maximum in a direction parallel to the longitudinal direction of the substrate (the direction parallel to the X direction in the drawing), and the liquid crystal panel 100 is curved with a predetermined curvature having a curvature (curvature radius) R of 800 mm in the direction parallel to the longitudinal direction of the substrate as the degree of curvature to be curved.

Regarding specific outer dimensions of the liquid crystal panel 100, the liquid crystal panel 100 has a rectangular outer shape in a plan view in a flat state before curving in the present preferred embodiment, and a rectangle of 300 mm×120 mm is used as an outer size of the counter substrate 120 substantially corresponding to a region surrounded by the sealing material 130 and sandwiched by the liquid crystal layers 140 as an outer size of the liquid crystal panel 100. Although the example of the rectangle is used for convenience of the description, the outer shape of the liquid crystal panel 100 is not limited to the rectangle, and a so-called different type liquid crystal panel having a circular shape, an elliptical shape, a polygonal shape, or a partially curved outer shape may be applicable.

The array substrate 110 and the counter substrate 120, which are arranged to oppose each other, are arranged, respectively, on a glass substrate 111 and a glass substrate 121 which are transparent substrates. Further, the glass substrate 111 and the glass substrate 121, which form the array substrate 110 and the counter substrate 120, are configured using a glass substrate thinned to about 0.2 mm so as to have such a degree of flexibility that can be changed to a curved shape having a curvature within a predetermined range. Further, if being within the range of the substrate having flexibility, a transparent substrate made of another material such as transparent plastic and quartz serving as a transparent material may be used in the case of a transmissive liquid crystal panel, and a silicon substrate may be used for one substrate in the case of a reflective liquid crystal panel and a transparent substrate is not necessarily used. However, in the first preferred embodiment, the glass substrate is selected, and the thickness is set to about 0.15 mm (for example, managed to have a median of 0.15 mm and a variation range within a range of ±20%) in consideration of balance between visibility of unevenness caused by strain and ease of processing as described above.

Further, the sealing material 130 is provided in a frame region arranged at the outer side of the display region 200 corresponding to the display surface on which the image is displayed. Further, both the outer shapes of the array substrate 110 and the counter substrate 120 are rectangular, the outer shape of the array substrate 110 is larger than the outer shape of the counter substrate 120, and the array substrate 110 is arranged in a superposed manner to have a protruding portion partially protruding from an outer end face of the counter substrate 120. Here, the protruding portion of the array substrate 110 is provided on two adjacent sides of the counter substrate 120, and the protruding portions are provided on two adjacent sides of the array substrate 110 as illustrated in the two cross-sectional views of FIG. 3A and FIG. 3B.

Further, the display region 200 is provided in a rectangular outer shape at the slightly inner side of the rectangular outer shape of the counter substrate 120, and the frame region is provided at the outer side of the display region 200. Incidentally, the frame region used here means a frame-shaped region surrounding the display region 200 located at the outer side of the display region 200, that is, all the regions excluding the display region 200 on the array substrate 110, on the counter substrate 120, or in a region sandwiched between both the substrates of the liquid crystal panel 100. Further, even the display region 200 is used in all the regions on the array substrate 110, on the counter substrate 120, or the region sandwiched between both the substrates of the liquid crystal panel 100, and used as the same meaning in the present specification.

Further, multiple columnar spacers (a main spacer 125*m* and a sub-spacer 125*s*) to form and hold a gap within a predetermined fixed range between the substrates are arranged inside the display region 200 (not illustrated in FIG. 1) between the array substrate 110 and the counter substrate 120 as illustrated in the cross-sectional view of FIG. 4 (conceptual view relating to the arrangement density of the columnar spacers). The columnar spacer is formed by patterning a resin on one of the substrates, and the main spacer 125*m* and the sub-spacer 125*s* are arranged in a dual spacer structure provided with predetermined arrangement and density depending on the region in the present preferred embodiment.

To be more specific, the dual spacer structure is constituted by the main spacer 125*m*, which is relatively high (also referred to as thick or long film thickness) and constantly abuts on and holds both the array substrate 110 and the counter substrate 120 in a use temperature range, and the sub-spacer 125*s* which is relatively low (also referred to as thin or short film thickness). Since the height is relatively low, the sub-spacer 125*s* abuts on only one of the array substrate 110 and the counter substrate 120 in a normal state, that is, in a state where no external pressure (external force:

hereinafter referred to as surface pressing stress) applied particularly by touch of a person is not applied to the surface of the liquid crystal panel 100 and a temperature is at a room temperature level, and abuts on both the glass substrates to hold the gap between the substrates only when these substrates are brought close to each other within a range in which the main spacer 125*m* elastically deforms. Although a state where the sub-spacer 125*s* described above does not hold the gap between the substrates is premised on that no surface pressing stress is applied, in a state where an external force other than an atmospheric pressure is not applied is basically a premise since, as a matter of course, the atmospheric pressure is always applied as the external force to the surface of the liquid crystal panel 100 other than the surface pressing stress.

Further, the columnar spacers are provided in the region other than the display region 200, that is, in the frame region in the liquid crystal panel 100 as illustrated in FIG. 4. The columnar spacers provided in the frame region are configured by arranging only the main spacer 125*m*, that is, not using the dual spacer structure.

Incidentally, the detailed arrangement of the columnar spacers (the main spacer 125*m* and the sub-spacer 125*s*) forming and holding the gap within a predetermined fixed range between the substrates is a characteristic configuration of the present invention, and thus, will be separately described in detail.

Next, a detailed configuration of the above counter substrate 120 will be described. In at least the display region 200 on one surface of the glass substrate 121 set to have a thickness of about 0.15 mm as described above, the counter substrate 120 includes: an alignment film (not illustrated) aligning liquid crystal; a black matrix (BM) 123, which is a light shielding layer provided to shield a portion between a color filter 122 (here, provided by arraying color material layers corresponding to red (R), green (G), and blue (B) which are three primary colors) provided below the alignment film and the color filter 122 from light or to shield the frame region arranged at the outer side of the display region 200 from light; and an overcoat layer (OC layer) 124 which is provided in a lower layer of the alignment film, covers surfaces of the color filter 122 and the BM 123, and is a planarizing film made of a transparent resin film that planarizes the surface of the counter substrate 120 by planarizing a surface difference in level formed by the color filter 122 and the BM 123.

Although not illustrated, since an alignment film material to form the alignment film is applied after formation of the columnar spacer, the alignment film formed on the surface of the counter substrate 120 is mainly formed in a region other than a formation portion of the columnar spacer in the display region 200, but the alignment film material is also applied to the surface of the columnar spacer. However, the alignment film material itself formed on the surface of the columnar spacer is formed to be relatively thin, and on the surface of the columnar spacer, the alignment film does not function substantially as the alignment film which has been subjected to alignment processing.

The columnar spacers (the main spacer 125*m* and the sub-spacer 125*s*) are provided between the array substrate 110 and the counter substrate 120, but are fixed to the surface on the counter substrate 120 side, particularly the surface of the overcoat layer (OC layer) 124.

Further, an antistatic transparent conductive layer 126 connected to the ground is provided on the other surface of the glass substrate 121 of the counter substrate 120, that is, on a surface opposite to a surface on which the color filter 122, the BM 123, and the like are provided. The antistatic transparent conductive layer 126 is provided such that, for example, a transparent conductive film such as an indium thin oxide (ITO) film covers at least the display region 200 of the glass substrate 121, and is advantageous for preventing display failure due to charging by static electricity or an external electric field in the transverse electric field type liquid crystal panel. Further, a polarizing plate 132 is provided on the other surface of the counter substrate 120 at the outer side of the antistatic transparent conductive layer 126.

Next, a detailed configuration of the array substrate 110 will be described. Even each configuration of the array substrate 110 is arranged on the glass substrate 111 set to have a thickness of about 0.15 mm as described above. First, descriptions will be sequentially given from the configuration provided in the display region 200 of the array substrate 110 hereinafter. In the display region 200, the array substrate 110 includes: an alignment film (not illustrated) that aligns liquid crystal on one surface of the glass substrate 111; a pixel electrode 112 and a counter electrode 113 which are a pair of electrodes provided below the alignment film and generating an electric field in a direction parallel to a substrate surface of the array substrate 110 or the counter substrate 120 to apply a voltage to drive the liquid crystal; a TFT 114 which is a switching element writing a voltage to the pixel electrode 112 which is one of the pair of electrodes; an insulating film 115 covering the TFT 114; and a plurality of scanning signal lines (hereinafter also referred to as gate wirings) and video signal lines (hereinafter also referred to as source wirings) which are wirings to supply signals to the TFT 114 (all of which are not illustrated).

Further, the TFT 114 includes a semiconductor serving as an active layer of a transistor and a gate electrode of the transistor provided to overlap with the semiconductor layer (also provided in common with a part of the gate wiring in some cases), a source electrode, a drain electrode, and the like (each electrode is not illustrated). Further, each of the TFTs 114 is electrically connected to each of the pixel electrodes 112 via the drain electrode with respect to the source wiring via the source electrode (in the drawing, only the connection relationship is conceptually illustrated by connecting the configurations of the TFT 114 and the pixel electrode 112 by a line).

Although the pixel electrode 112 and the counter electrode 113 which are the pair of electrodes to which the voltage to drive the liquid crystal is applied are conceptually illustrated in the cross-sectional view in the first preferred embodiment, the pixel electrode 112 which is one electrode is configured using a transparent conductive film pattern of a flat plate shape, and the counter electrode 113 which is the other electrode has a slit electrode formed of a plurality of slit-shaped openings provided in parallel in a region overlapping with the pixel electrode 112, and further, is configured using a transparent conductive film pattern having an opening provided in a region overlapping with the TFT 114. In particular, a formation region of the slit electrode is arranged so as to be overlapped on the pixel electrode 112 with the insulating film 115 interposed therebetween.

Further, the above configurations of the pixel electrode 112 and the counter electrode 113 are not indispensable, but both the pixel electrode 112 and the counter electrode 113, which are generally used as transverse electric field type electrodes in the related art, may be formed as comb-tooth electrodes having a comb-tooth shape. Alternatively, as another mode of the FFS type, it may be configured such that the pixel electrode 112 and the counter electrode 113 are arranged in an upper layer of the counter electrode 113 as a pattern having a slit electrode formed of a plurality of slit-shaped openings provided in parallel on the pixel electrode 112 side, and the counter electrode 113 is arranged in a flat plate shape in a lower layer of the pixel electrode 112 by reversing the shapes and the vertical relationship of the pixel electrode 112 and the counter electrode 113, and further, the TFT 114 is connected to the pixel electrode 112 made of the above-described pattern having the slit electrode to apply a voltage.

Incidentally, the insulating film 115 forming the array substrate 110 is illustrated in a simplified manner as an integrated insulating film of each insulating film that insulates the semiconductor layer, the gate electrode, the source electrode, the drain electrode, and the like forming the TFT 114 from each other, an insulating film covering the TFT 114, an insulating film formed between the pixel electrode 112 and the counter electrode 113, and the like in the drawing, but the insulating film 115 is configured as a transparent insulating film of a single layer or a stacked film of a plurality of layers of transparent insulating films between the respective electrodes and the like.

Next, a configuration provided in the frame region of the array substrate 110 will be described. A signal terminal 116, which receives a signal supplied to the TFT 114 from the outside, is provided on a surface on a side where the counter substrate 120 is arranged particularly in the protruding portion partly protruding from the end face of the counter substrate 120 of the frame region on the array substrate 110. Although a state where the signal terminal 116 is provided only at one end of the liquid crystal panel 100 (array substrate 110) is illustrated in the cross-sectional view in the curve direction (FIG. 1), the signal terminal 116 is provided in each of the frame regions on two sides of the array substrate 110 so as to correspond to the protruding portions provided on the two adjacent sides of the array substrate 110 described above. For example, one provided on a side in a direction perpendicular to the curve direction (direction parallel to a Y direction in the drawing) supplies a scanning signal to the gate wiring, and the other provided on a side in the direction parallel to the curve direction (direction parallel to the X direction in the drawing) supplies a video signal to the source wiring. In detail, the signal terminal 116 is configured such that a plurality of rectangular pads separated to correspond to a plurality of signals is arrayed along a substrate end portion.

Further, a control substrate 135 equipped with a control integrated circuit (IC) chip, which generates a control signal for control of a driving IC or the like, is connected to each pad of the signal terminals 116 provided on the two adjacent sides of the array substrate 110 via a flexible flat cable (FFC) 136 serving as a connection wiring. Further, the control signal from the control substrate 135 is input to an input side of a source driving IC chip for the source wiring attached to the protruding portion or a gate driving IC chip for the gate wiring (none of which are illustrated) through the signal terminal 116, and an output signal output from an output side of the source driver IC chip or gate driving IC chip is supplied to the TFT 114 in the display region 200 through a large number of signal lead-out wirings (not illustrated) led out from the display region 200 and the gate wiring or the source wiring.

Incidentally, the signal terminal 116, the control substrate 135, the FFC 136, and the like are provided on two sides of the liquid crystal panel 100 in the above description, but may be configured to be arranged on only one side of the liquid crystal panel 100. In the case of being arranged on only the one side, the signal terminal 116, the control substrate 135, the FFC 136, and the like may be arranged on a side that is curved or on a side that is not curved.

Further, the antistatic transparent conductive layer 126 formed on the surface of the counter substrate 120 is connected to the ground. Although a detailed description of a connection structure by an illustration is omitted, here, for example, a grounding pad is provided on the protruding portion of the array substrate 110, and the antistatic transparent conductive layer 126 and the grounding pad are connected via a conductive paste or a conductive tape. Incidentally, a silver paste which is a general conductive paste agent can be used as the conductive paste. As the conductive tape, a base material, made of a metal foil such as an Al foil and a Cu foil, coated with a conductive pressure-sensitive adhesive can be used, and a commercially available conductive tape can be used.

<Holding Mode Using Housing>

Next, a brief description on an overall configuration of the curved display 10 including components other than the liquid crystal panel 100 of the first preferred embodiment, and a holding mode when the liquid crystal panel 100 particularly as a main part of the present invention is held by the housing, specifically, a detailed configuration of the housing portion, which is a portion holding the liquid crystal panel 100 in the configuration of the curved display 10, will be described with reference to FIGS. 2 to 3B. The cross-sectional views of FIGS. 3A and 3B illustrate a state where a surface pressing stress is not particularly applied to the display surface side of the liquid crystal panel 100 and the curved transparent protection cover 101.

First, as the overall configuration of the curved display 10 including the components other than the liquid crystal panel 100, a backlight unit BL serving as a light source (which is located on a back surface of an optical sheet 137, and thus, is not illustrated in FIG. 2) is first arranged at a position opposing the array substrate 110 on a back side of the liquid crystal panel 100, that is, a side opposite to the display surface as illustrated in FIGS. 2 to 3B. As the backlight unit BL used herein, the dedicated backlight unit BL having a curved shape is used so as to correspond to the curved liquid crystal panel 100. Further, the optical sheet 137, which controls a polarization state, a directivity, and the like of light, is arranged between the liquid crystal panel 100 and the backlight unit BL. Further, the liquid crystal panel 100 is housed in a housing 150 partially open on the outer side of the counter substrate 120 in the display region 200 to form the display surface together with the curved transparent protection cover 101 and the touch panel TP, whereby the curved display 10 of the first preferred embodiment is configured.

Since the curved display 10 is configured by incorporating the liquid crystal panel 100 in a curved state, the housing 150 that houses and holds the liquid crystal panel 100 is configured using a combination of two members of a rear frame 150R and a front frame 150F. The rear frame 150R is serving as a housing, is arranged on the back side of the liquid crystal panel 100, houses the backlight unit BL, and mainly houses and holds the liquid crystal panel 100 and the like, and the front frame 150F (not illustrated in FIG. 2) is arranged on the front side of the liquid crystal panel 100 to mainly cover the frame region of the liquid crystal panel 100 and is provided with an opening corresponding to the display region 200 as illustrated in the drawing.

Further, as a mode in which the housing 150 holds the liquid crystal panel 100, basically, an outer peripheral portion of the liquid crystal panel 100 is held such that the curvature of the curved shape of the liquid crystal panel 100 is variable, and the liquid crystal panel 100 is held in a state where a clearance (gap portion) is provided between the liquid crystal panel 100 and the housing 150 at least in the central portion of the liquid crystal panel 100 in the curve direction (the direction parallel to the X direction in the drawing). In the first preferred embodiment, the liquid crystal panel 100 is configured to be integrated with the touch panel TP and the curved transparent protection cover 101 pasted via an adhesive layer to form a stacked body, and an outer shape of the curved transparent protection cover 101 is provided to protrude from an outer end portion of the liquid crystal panel 100. The housing 150 adopts a mode of indirectly holding the outer peripheral portion of the liquid crystal panel 100 by holding the protruding outer peripheral portion of the curved transparent protection cover 101 of the stacked body.

As a more specific configuration of the housing 150, holding surfaces 151M, which hold the protruding portions of the curved transparent protection cover 101, on two non-curved sides, that is, two side in the direction perpendicular to the curve direction (the direction parallel to the Y direction in the drawing) among four sides of the outer peripheral portion of the liquid crystal panel 100 are provided on a pair of side walls in the direction parallel to the Y direction in the drawing, among four side walls provided in a frame shape in the rear frame 150R forming the housing 150. The pair of holding surfaces 151M is provided to oppose lower surfaces to abut on the lower surfaces in the vicinity of the two non-curved sides among the four sides of the outer peripheral portion of the curved transparent protection cover 101 to be capable of holding, and holds mainly the liquid crystal panel 100 and the curved transparent protection cover 101. As illustrated in the cross-sectional view of FIG. 3A, the holding surfaces 151M are provided to abut on lower surfaces of end portions on both sides of the curved transparent protection cover 101, respectively, and the curved transparent protection cover 101 is held from the lower side by the holding surface 151M provided on the rear frame 150R, and is pressed from the upper side by a portion arranged to oppose an upper surface of the curved transparent protection cover 101 on a lower surface of the front frame 150F. With the above configuration, an end portion of the curved transparent protection cover 101 is held in a space sandwiched between the upper surface of the holding surface 151M and the lower surface of the front frame 150F.

On the other hand, a pair of holding surfaces 151S is provided to oppose the lower surfaces in the vicinity of the two sides of the outer peripheral portion of the curved transparent protection cover 101 with a clearance GP1 described above interposed therebetween, in the vicinity of the protruding portions of the curved transparent protection cover 101 on two curved sides, that is, both the two sides in the direction along the curve direction (direction parallel to the X direction in the drawing) among the four sides of the outer peripheral portion of the liquid crystal panel 100 in the rear frame 150R. This holding surfaces 151S are provided on a pair of side walls in the direction parallel to the X direction in the drawing among the four side walls provided in the frame shape in the rear frame 150R as illustrated in the drawing. The cross-sectional view of FIG. 3B in cross-sectional line Y1-Y2, positioned in the vicinity of the central portion in the curve direction (parallel to the X direction in the drawing) of the liquid crystal panel 100, illustrates that the holding surfaces 151S are provided on the lower surface of the curved transparent protection cover 101 at the end portions on both the sides, respectively, to oppose to the lower surface with the clearance GP1 interposed therebetween.

Incidentally, this holding surface 151S will be described in detail in the following description on the operation, but the holding surface 151S abuts on the curved transparent protection cover 101 to serve the role of holding only when the surface pressing stress is applied to the display surface side of the liquid crystal panel 100 and the curved transparent protection cover 101, and the liquid crystal panel 100 and the curved transparent protection cover 101 are deformed such that the degree of curving increases.

Further, if the lower surface of the liquid crystal panel 100 abuts on any part of the housing 150, it is difficult to hold the liquid crystal panel 100 such that the curvature of the curved shape is variable. Thus, a clearance GP2 is provided between the lower surface of the liquid crystal panel 100 and the housing 150 (the rear frame 150R) in the central portion in the curve direction of the liquid crystal panel 100 even with respect to the lower surface of the liquid crystal panel 100 as illustrated in the cross-sectional view of FIG. 3B. In particular, since the liquid crystal panel 100 is weaker in strength than the curved transparent protection cover 101, the clearance GP2 provided between the liquid crystal panel 100 and the housing 150 is set to be larger than the clearance GP1 provided between the curved transparent protection cover 101 and the housing 150 such that the liquid crystal panel 100 does not abut on the housing 150 (the rear frame 150R) first even when the curvature of the curved shape of the liquid crystal panel 100 has varied due to the surface pressing stress.

As described above, the housing 150 of the first preferred embodiment holds the two sides, which are particularly not curved among the four sides of the outer peripheral portion of the liquid crystal panel 100, via the curved transparent protection cover 101 that is pasted to the liquid crystal panel 100, and is provided with the clearance GP2 between the lower surface of the liquid crystal panel 100 and the housing 150 in the central portion in the curve direction of the liquid crystal panel 100 such that the curvature of the curved shape of the liquid crystal panel 100 is variable. Further, the liquid crystal panel 100 and the housing 150 abut on each other when the surface pressing stress is applied particularly to the display surface side so as to be deformed in a direction to increase the curvature of the curved shape, and the liquid crystal panel 100 is held in a state where the clearance GP1 is provided between the protruding portions on the two sides in the direction parallel to the curve direction of the curved transparent protection cover 101, which are portions that may hinder the curving deformation, and the holding surface 151S of the housing 150 arranged to particularly oppose the protruding portions.

<Detailed Configuration of Columnar Spacer>

Next, a description will be given particularly regarding detailed configurations of the columnar spacers (the main spacer 125m and the sub-spacer 125s) as another main part of the present invention, in the curved display 10 of the first preferred embodiment, particularly a planar arrangement density in the liquid crystal panel 100 with reference to FIGS. 4 to 7B.

As illustrated in the cross-sectional view of FIG. 4 (conceptual diagram relating to the arrangement density of columnar spacers), the columnar spacers arranged in the liquid crystal panel 100 have the dual spacer structure constituted by the main spacer 125m and the sub-spacer 125s, which have different heights (also referred to as different film thicknesses or different lengths) particularly in the display region 200 as described above, and further, are arranged such that the density of the main spacers 125m increases toward the central portion in the curve direction. Hereinafter, the arrangement of the main spacers 125m and the sub-spacers 125s will be described in more detail.

FIG. 5 is a view for describing the density distribution of the columnar spacers in the display region 200. In FIG. 5, for example, a central portion in the direction parallel to the curve direction of the liquid crystal panel 100 indicated by the arrow in the drawing in the liquid crystal panel 100, actually, in the display region 200 where the columnar spacers are mainly arranged is set as a region R1, regions on both sides of the region 1 are set as regions R2, regions on outer sides of the regions R2 are set as regions R3, regions on outer sides of the regions R3 (that is, both end portions in the curve direction of the display region 200) are set as region R4. The density of the main spacers 125m is constant within each of the regions R1 to R4. Further, the density of the main spacers 125m is the maximum in the region R1 at the central portion and decreases in order toward the outer region. Conversely speaking, the density of the main spacers 125m is the minimum in the regions R4 at both ends in the curve direction in the display region 200 and increases toward the region R1 at the central portion. That is, a relationship of the region R1> the region R2> the region R3> the region R4 is established regarding the density of the main spacers 125m.

Since the density of the main spacers 125m corresponds to an areal density (that is, the area occupied by the main spacers 125m per unit area), normally, it is possible to adjust the density by arranging the main spacers 125m, provided in a circular shape in a top view, while varying individual sizes (that is, diameters of circles). However, since the diameter of the main spacer 125m is often set to be a predetermined value due to some restrictions, practically, it is preferable to adjust the density of the main spacers 125m by changing the number of the main spacers 125m to be arranged per unit pixel number (that is, a ratio of the number of pixels in which the main spacers 125m are arranged in the unit pixel number) as will be illustrated below.

FIGS. 6A and 6B are views illustrating examples of the arrangement of the main spacer 125m and the sub-spacer 125s in the regions R1 and R4 illustrated in FIG. 5, respectively. FIGS. 6A and 6B illustrate a plurality of pixels arrayed in the display region 200 as a set of pixels of three colors of R (red), G (green), and B (blue). Further, one of unit pixels (twelve pixels) in the present preferred embodiment is illustrated to be surrounded by a broken line.

As illustrated in FIG. 6A, the main spacer 125m is arranged in one pixel per twelve pixels in the regions R4 at the both end portions in the curve direction of the display region 200. On the other hand, as illustrated in FIG. 6B, the main spacers 125m are arranged in four pixels per twelve pixels in the region R1 which is the central portion in the curve direction of the display region 200. Further, the number of pixels in which the main spacers 125m are arranged increases in a stepwise manner from the region R4 to the region R1. As illustrated in FIGS. 6A and 6B, the sub-spacer 125s is arranged in all of B (blue) pixels, and is arranged at a ratio of four pixels per twelve pixels with no change in the arrangement density of the sub-spacers 125s from the region R4 to the region R1. Meanwhile, as for the main spacer 125m, an arrangement ratio in G (green) pixels where the sub-spacer 125s is not arranged is changed as described above. That is, when adjusting the density of the main spacers 125m within a plane, the adjustment is performed by changing the number of the main spacers 125m to be arranged in pixels of a color where the sub-spacers 125s are not arranged without changing the arrangement of the sub-spacers 125s within a plane.

Adoption of such an adjustment method has the following advantages. Here, appropriate density, arrangement ratio, and the like of the main spacers 125m change depending on a situation such as a size of the liquid crystal panel 100 or a degree of curving (that is, the curvature of curve, particularly in the first preferred embodiment, a range of curvature variations when the surface pressing stress is applied is also taken into consideration), and thus, it is necessary to design the density, arrangement ratio, and the like while adjusting density, arrangement ratio, and the like for each of apparatuses having different sizes or degrees of curve. When adjusting the density of the main spacers 125m on such a design, it is possible to freely adjust the density of the main spacers 125m to be varied in the plane with a fixed arrangement design of the sub-spacers 125s, and it is easy to change the design relating to the arrangement and density adjustment of the main spacers 125m in accordance with each apparatus.

The examples of FIGS. 6A and 6B described above are exemplified to describe conceptual aspects of the present invention, and there is no indication of an absolute value of the density of the columnar spacers (main spacer 125m and sub-spacer 125s) that needs to be set in each region. For example, the arrangement ratio changes depending on a relationship between the area of one pixel and the area (size/diameter) of one columnar spacer (main spacer 125m and sub-spacer 125s).

Subsequently, specific setting examples of areal densities of the main spacer 125m and the sub-spacer 125s will be described. FIGS. 7A and 7B are views illustrating an example of the density distribution of the main spacers 125m. FIG. 7A clearly illustrates a range of the density distribution of the main spacers 125m in the direction parallel to the curve direction indicated by the arrow in the drawing and a position from the central portion of the liquid crystal panel 100 with respect to the display region 200 of the liquid crystal panel 100, and FIG. 7B illustrates a graph of the range of the density distribution of the main spacers 125m clearly illustrated in FIG. 7A and a relative value of the areal density of the main spacer 125m corresponding to the position from the central portion. End portions in the left-right direction of FIG. 7B correspond to end portions of the display region 200 in the direction parallel to the curve direction. Therefore, the density distribution of the main spacers 125m illustrated by the graph of FIG. 7B corresponds to the areal density of the main spacers 125m at each position in the direction parallel to the curve direction in the display region 200.

As illustrated in FIG. 7B, in the present preferred embodiment, it is desirable to set absolute values of the areal density to arrange the main spacers 125m such that the areal density is 0.02% (the area occupied by the main spacers 125m per unit area) in a curved portion of the liquid crystal panel 100, that is, the central portion in the longitudinal direction of the display region 200 and the areal density gently decreases toward the outside. Further, it is preferable to set the areal density of the main spacers 125m to vary within the range of 0.005% to 0.02% to be a density range in which the dual spacer structure effectively functions from the central portion to both the end portions. On the other hand, the areal density of the sub-spacers 125s is set constantly to 0.1% regardless of the location in the first preferred embodiment as the density at which a desired resistance is obtained to such an extent that significant display unevenness does not occur in a range of mitigated surface pressing stress assuming that the surface pressing stress applied to the liquid crystal panel 100 is mitigated as the curvature of the curved liquid crystal panel 100 varies as described above when the surface pressing stress is applied to the liquid crystal panel 100 (not illustrated).

In the specific setting example relating to the density distribution of the main spacers 125m illustrated in FIG. 7B, a desired density distribution of the main spacers 125m corresponding to a stress which continuously varies depending on the position in the curve direction is directly illustrated. However, it is difficult to perform such an analog adjustment in the case of using the adjustment method by changing the number (ratio) of the columnar spacers to be arranged as illustrated in the adjustment example described above with reference to FIGS. 5 to 6B. Regarding the mitigation of the surface pressing stress by adjusting the density of the main spacers 125m, the sufficient effect can be obtained by adjusting the density of the main spacers 125m within a certain range, and thus, the display region 200 may be divided and the density may be gradually adjusted as described conceptually with reference to FIG. 5.

Here, FIG. 8 is a view illustrating another example of the density distribution of the main spacers 125m. In FIG. 8, the density distribution illustrated in FIG. 7B is indicated by the broken line. As illustrated in FIG. 8, it may be set such that the areal density is maximized in the central portion in the curved portion of the liquid crystal panel 100, and then, the areal density decreases stepwise toward the outside. Although specific density setting values in the respective regions also vary depending on a way of division, it is preferable to set the density to 0.02% in the central portion, for example, similarly to the example of FIG. 7B. Further, a density change varies for each constant value when assuming that adjustment is performed using the number of the main spacers 125m to be arranged. For example, in the example of FIG. 8, the density of the main spacers 125m decreases stepwise from the region R1 to the region R4 from 0.02% to 0.015%, 0.01%, and 0.005% in order by a decrement of 0.005%. It is a matter of course that the divided regions may be further subdivided, and in such a case, the density varies stepwise more finely.

Subsequently, an operation and effects obtained in the curved display 10 according to the first preferred embodiment will be described in detail. First, the operation obtained by the holding mode using the housing which is one of the main parts of the present invention will be described.

<Description on Operation by Holding Mode Using Housing>

Figure 9A:
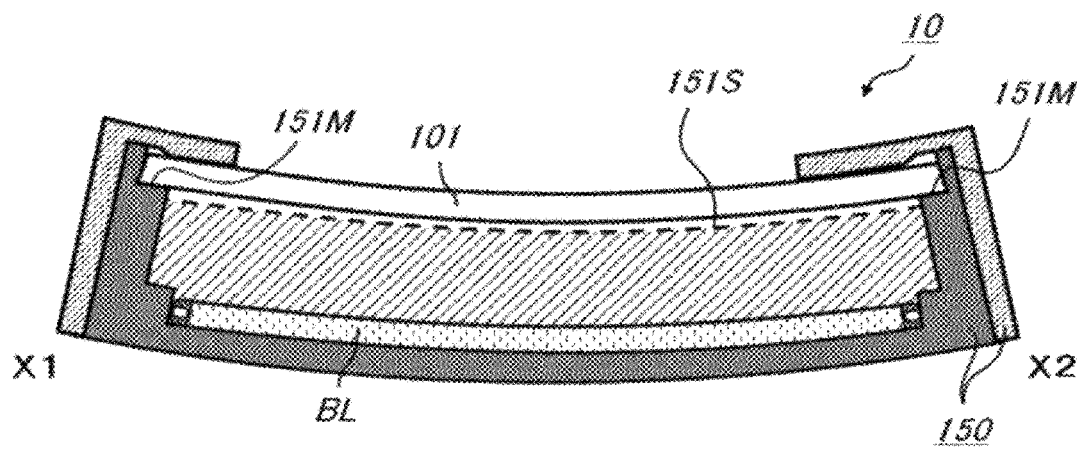
FIGS. 9A to 9C are cross-sectional views illustrating an operation of the liquid crystal display apparatus according to the first preferred embodiment of the present invention.
Figure 9B:
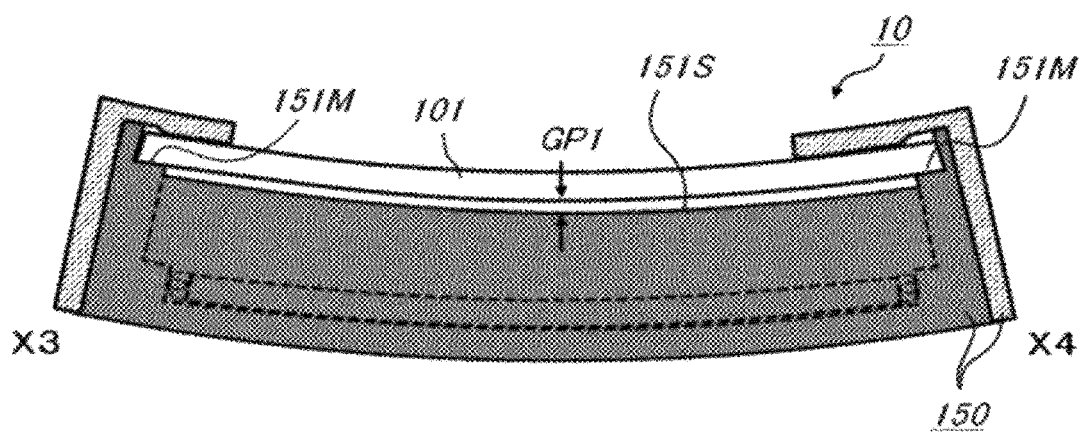
Figure 9C:
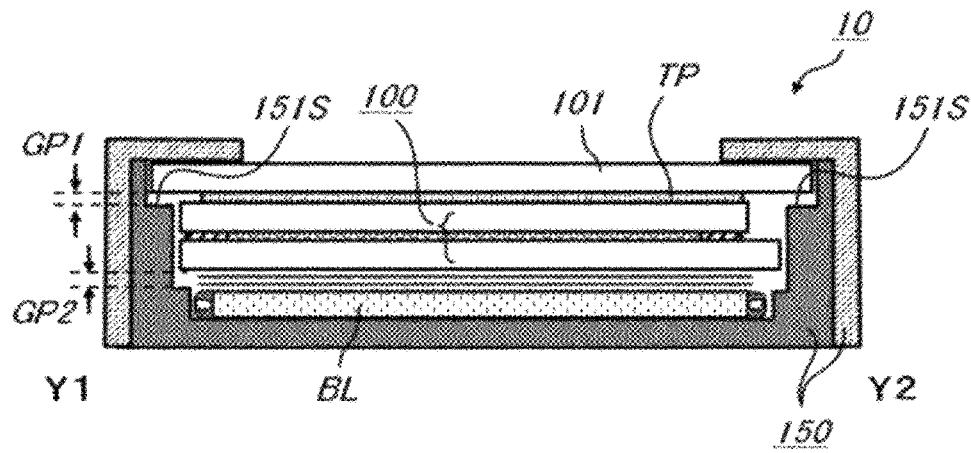
Figure 10A:
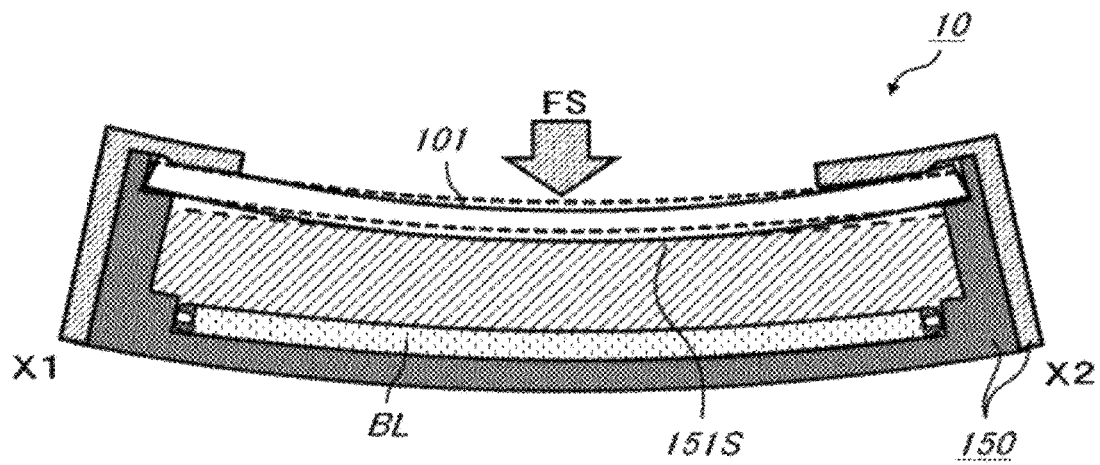
FIGS. 10A to 10C are cross-sectional views illustrating the operation of the liquid crystal display apparatus according to the first preferred embodiment of the present invention.
Figure 10B:
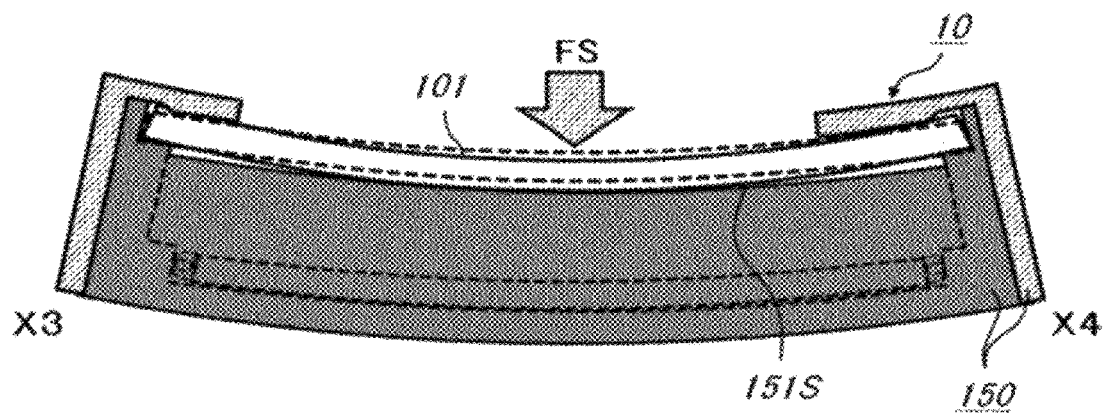
Figure 10C:
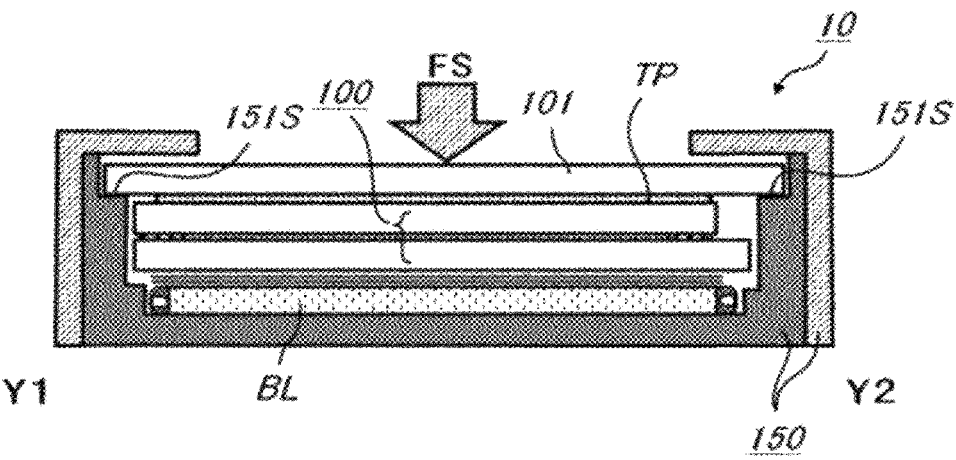

The operation obtained in the curved display 10 according to the first preferred embodiment will be described with reference to FIGS. 9A to 10C which illustrate a state corresponding to presence or absence of the application of the surface pressing stress to the display surface side of the liquid crystal panel 100. Here, FIGS. 9A to 9C illustrates cross-sectional views of each portion of the curved display 10 in a state where no surface pressing stress is applied to the display surface side of the liquid crystal panel 100. FIG. 9A corresponds to the cross-sectional view in the direction along the curve direction (the vicinity of the central portion: the cross-sectional view along cross-sectional line X1-X2 in FIG. 2), FIG. 9B corresponds to the cross-sectional view in the direction along the curve direction (a vicinity of end portion: the cross-sectional view along a cross-sectional line X3-X4 in FIG. 2), and FIG. 9C corresponds to the cross-sectional view in the direction perpendicular to the curve direction (the vicinity of the central portion: the cross-sectional view along cross-sectional line Y1-Y2 in FIG. 2). FIGS. 10A to 10C illustrate cross-sectional views of each portion of the curved display 10 in a state where the surface pressing stress is applied to the display surface side of the liquid crystal panel 100. FIG. 10A corresponds to the cross-sectional view in the direction along the curve direction (the vicinity of the central portion: the cross-sectional view along cross-sectional line X1-X2 in FIG. 2), FIG. 10B corresponds to the cross-sectional view in the direction along the curve direction (the vicinity of the end portion: the cross-sectional view along cross-sectional line X3-X4 in FIG. 2), and FIG. 10C corresponds to the cross-sectional view in the direction perpendicular to the curve direction (the vicinity of the central portion: the cross-sectional view along cross-sectional line Y1-Y2 in FIG. 2). In FIGS. 10A to 10C, a surface pressing stress FS is indicated by the downward arrow in the drawing in order to conceptually illustrate the state where the surface pressing stress is applied.

The liquid crystal panel 100 arranged below the curved transparent protection cover 101 is not illustrated in FIGS. 9A and 10A, or FIGS. 9B and 10B illustrating the cross-sectional views in the direction along the curve direction in order to facilitate understanding of a change in the curved shape of the curved transparent protection cover 101 depending on the presence or absence of the application of the surface pressing stress FS to the liquid crystal panel 100 and a holding state of the curved transparent protection cover 101 by the holding surface 151M provided in the housing 150. Further, the shape of the curved transparent protection cover 101 before the change in the curved shape occurs (corresponding to the shape in FIGS. 9A and 9B) is illustrated by the broken line in FIGS. 10A and 10B in order to facilitate understanding of the change in the curved shape of the curved transparent protection cover 101.

First, the clearance GP1 is provided in the vicinity of the central portion in the curve direction of the liquid crystal panel 100 between the lower surface of the curved transparent protection cover 101 and the holding surface 151S provided on the housing 150 as illustrated in each cross-sectional view of FIGS. 9A to 9C in a state where the surface pressing stress FS is not applied to the display surface side of the liquid crystal panel 100, which is the same as described in the description on the configuration with reference to FIGS. 3A and 3B. In particular, a curved surface approximately the same as the curved surface that is curved in the curved transparent protection cover 101 is formed for the holding surface 151S, and the clearance GP1 having basically the same distance from the lower surface of the curved transparent protection cover 101 is provided within a formation region of the holding surface 151S as illustrated in the cross-sectional views in the direction along the curve direction in FIGS. 9A and 9B.

When the surface pressing stress FS is applied to the display surface side in the state illustrated in FIGS. 9A to 9C illustrating the state where the surface pressing stress FS is not applied as described above, the curved transparent protection cover 101 is deformed such that a curvature of curving thereof is larger (curvature radius is smaller) than a curvature of an initial value in the state illustrated in FIGS. 9A to 9C as illustrated in each cross-sectional view of FIGS. 10A to 10C illustrating the state where the surface pressing stress FS is applied. The deformation is made as described above in the curved display 10 of the first preferred embodiment since the liquid crystal panel 100 is held in the state where the gap portion is provided against the housing 150 (the clearance GP1 and the clearance GP2 are provided, respectively, between the housing 150 and the curved transparent protection cover 101 and between the housing 150 and the liquid crystal panel 100) such that the curvature of the curved shape of the liquid crystal panel 100 is variable as the mode of holding the liquid crystal panel 100 by the housing 150, and further, the curved transparent protection cover 101 is only shifted in the transverse direction with respect to the surface of the holding surface 151M as the state of holding the curved transparent protection cover 101 by the holding surface 151M of the housing 150 and the curvature variation of the curved shape of the liquid crystal panel 100 is not particularly hindered.

As a result, the liquid crystal panel 100 is just held by the holding surface 151M provided on the housing 150 substantially on two sides which are the two non-curved sides of the liquid crystal panel 100 and the curved transparent protection cover 101 in the state of FIGS. 9A to 9C, but the liquid crystal panel 100 abuts on the holding surface 151S provided on the housing 150 particularly in the central portion in the curve direction of the liquid crystal panel 100 which protrudes downward due to the change in the curved shape even on the two curved sides of the curved transparent protection cover 101 in the state of FIGS. 10A to 10C. As a result, the liquid crystal panel 100 is held by the holding surfaces 151S on both the sides along the curve direction, and a further curvature variation (deformation in the direction of increasing the curvature) is less likely to occur.

In the state of FIGS. 10A to 10C, the curved transparent protection cover 101 is deformed so as to have a larger curvature than the curved shape having a predetermined curvature which is independently provided, and a repulsive force to return to the original curved shape (curvature) is generated similarly to repulsive action of a leaf spring. The repulsive force increases as the degree of the curvature variation increases, and thus, acts to prevent the curvature variation (deformation to increase the curvature) to the state of FIGS. 10A to 10C and also acts to prevent a further curvature variation (deformation to increase the curvature) from the state of FIGS. 10A to 10C.

Therefore, in the first preferred embodiment, the curvature variation (deformation to increase the curvature) does not occur beyond the state of FIGS. 10A to 10C basically, and thus, the housing 150, provided with the clearance GP2 larger than the clearance GP1 provided between the housing 150 and the curved transparent protection cover 101, does not abut against the liquid crystal panel 100. In addition, what is held by the holding surface 151M is the curved transparent protection cover 101 even on the two non-curved sides which mainly hold the liquid crystal panel 100 and the curved transparent protection cover 101, and the liquid crystal panel 100 is in the state of being indirectly held. That is, the holding force when the peripheral portion of the liquid crystal panel 100 is held by the housing 150 is not directly applied to the touch panel TP or the liquid crystal panel 100, and the holding force received from the housing 150 is applied to the curved transparent protection cover 101 having a relatively high strength. Therefore, it is possible to prevent the touch panel TP or the liquid crystal panel 100 having relatively low strength from being damaged by the holding force.

Further, in the first preferred embodiment, the liquid crystal panel 100 is held such that the curvature of the curved shape of the liquid crystal panel 100 is variable when the surface pressing stress FS is applied, and the repulsive action by the curved transparent protection cover 101 acts as a drag against the surface pressing stress FS. Therefore, the influence of the surface pressing stress FS directly applied to the surface of the liquid crystal panel 100 is mitigated, and it is also possible to prevent the liquid crystal panel 100 or the touch panel TP from being damaged by the direct action by the surface pressing stress FS. Since it is configured such that it is possible to mitigate the influence of the surface pressing stress FS acting directly, it is also possible to conversely use a relatively thin transparent protection plate for the curved transparent protection cover 101 within a range where the liquid crystal panel 100 or the touch panel TP is not damaged or to omit the provision of the curved transparent protection cover 101 itself. Accordingly, it is also possible to obtain a configuration in which the sensing sensitivity of the projected capacitive type touch panel TP is enhanced by adopting such a configuration.

Further, the curved transparent protection cover 101 is shifted in the transverse direction with respect to the surface of the holding surface 151M that mainly holds the curved transparent protection cover 101, and thus, the stress applied to the curved transparent protection cover 101 from the holding surface 151M and the stress applied to the liquid crystal panel 100 via the curved transparent protection cover 101 are weakened. Therefore, the stress other than the surface pressing stress FS is hardly applied with respect to the liquid crystal panel 100 (or the curved transparent protection cover 101) so that the liquid crystal panel 100 is hardly damaged.

In addition, the degree of the deformation (curvature variation) at the time of applying the surface pressing stress FS is also suppressed by the repulsive action by the curved transparent protection cover 101, and the degree of the deformation (curvature change) is basically limited to the range up to the state illustrated in FIGS. 10A to 10C as the holding surface 151S provided on the housing 150 abuts on and holds the curved transparent protection cover 101 even when the somewhat strong surface pressing stress FS is applied. Therefore, it is also possible to prevent the damage caused as the liquid crystal panel 100 is greatly curved due to the application of the surface pressing stress FS.

Next, an operation obtained by the arrangement of the columnar spacers (the main spacer 125*m* and the sub-spacer 125*s*) which is another main part of the present invention will be described.

<Description on Operation by Arrangement of Columnar Spacers>

First, a force in a compression direction applied to the main spacer when the liquid crystal panel having a length of 300 mm in which the density of the main spacers is constant in the plane is curved with R 800 mm in a length direction will be studied. As described with reference to FIGS. 3A and 3B, when the liquid crystal panel 100 is curved in the longitudinal direction thereof, the array substrate 110 and the counter substrate 120, which constitute the liquid crystal panel 100, are curved in the state of being fixed by the sealing material 130 in the peripheral portion, and thus, a tensile stress to be pulled toward the outer side of the substrate acts on the array substrate 110 arranged on a convex surface side of one curved surface, and a compressive stress to be compressed to the inner side of the substrate acts on the counter substrate 120 arranged on a concave side of the other curved surface.

As a result, it has been found that a force in a direction of narrowing a gap between the substrates acts between the array substrate 110 and the counter substrate 120 arranged to oppose each other, and the force becomes the largest in the curved portion of the liquid crystal panel 100, that is, in the central portion in the curve direction and becomes smaller toward the peripheral portion fixed by the sealing material 130. Further, in the first preferred embodiment, the liquid crystal panel 100 is deformed such that the curvature of the liquid crystal panel 100 becomes larger than the initial curvature of R 800 mm (the curvature radius decreases) when the surface pressing stress FS is applied to the liquid crystal panel 100, and thus, the force in the direction of narrowing the gap between the two substrates generated in the central portion in the curve direction further increases.

Since the force in the direction of narrowing the gap between the two substrates acting between the array substrate 110 and the counter substrate 120 corresponds to the force in the compression direction applied to the main spacer 125*m*, the force to compress the main spacer 125*m* becomes stronger in the curved portion of the liquid crystal panel 100, that is, the central portion in the curve direction than in the other portion, and the force to compress the main spacer 125*m* decreases toward the peripheral portion. Due to such a force distribution, a compressive deformation amount of the main spacer 125*m* differs depending on an in-plane position so that a display defect caused by gap unevenness might occur at the time of curving the liquid crystal panel 100 in some cases.

Figure 11A:
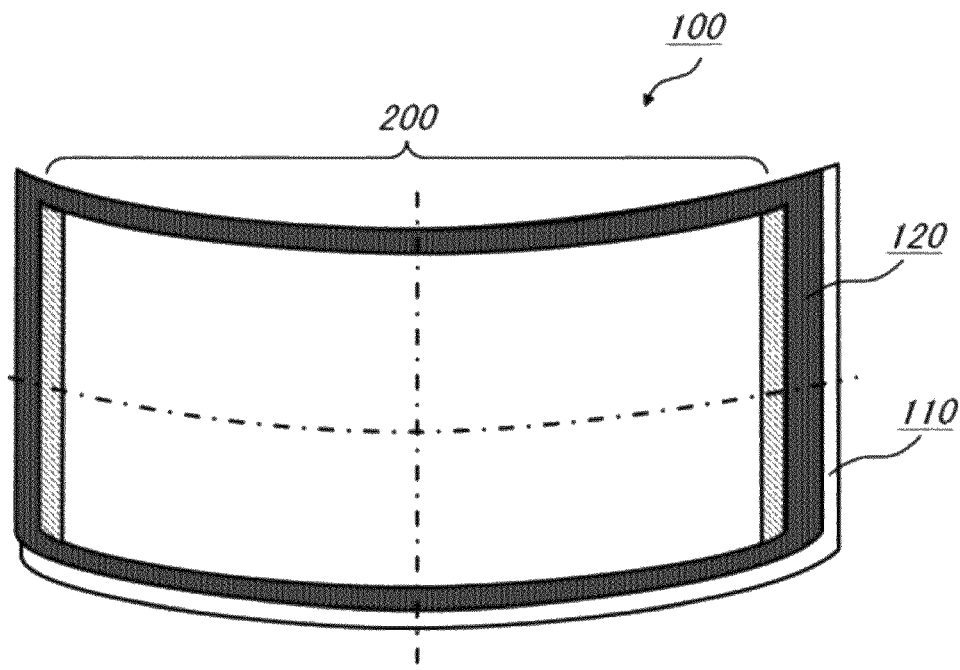
FIGS. 11A and 11B are views for describing gap unevenness and stress unevenness.

Here, FIG. 11A is a view for describing the gap unevenness. In FIG. 11A, a portion where the gap unevenness is likely to occur is illustrated as a hatched region. A cell gap becomes thicker in both the end portions in the curve direction of the liquid crystal panel 100 as illustrated in FIG. 11A so that the gap unevenness is likely to occur in both the end portions. For example, the gap unevenness is visually recognized as yellowing when the liquid crystal panel 100 displays an image ranging from halftone to white.

Therefore, in the liquid crystal panel 100 of the first preferred embodiment, it is possible to keep the cell gap constant to suppress the generation of gap unevenness by changing the density of the main spacer 125*m* as illustrated in FIGS. 7A to 8 in accordance with the above force distribution. Further, as a result of various studies, it has been experimentally confirmed that no unevenness caused by the stress generated between the glass substrates occurs without depending on the compressive deformation amount of the main spacer 125*m* by setting the density of the main spacers 125*m* to 0.02% or less.

Figure 12A:
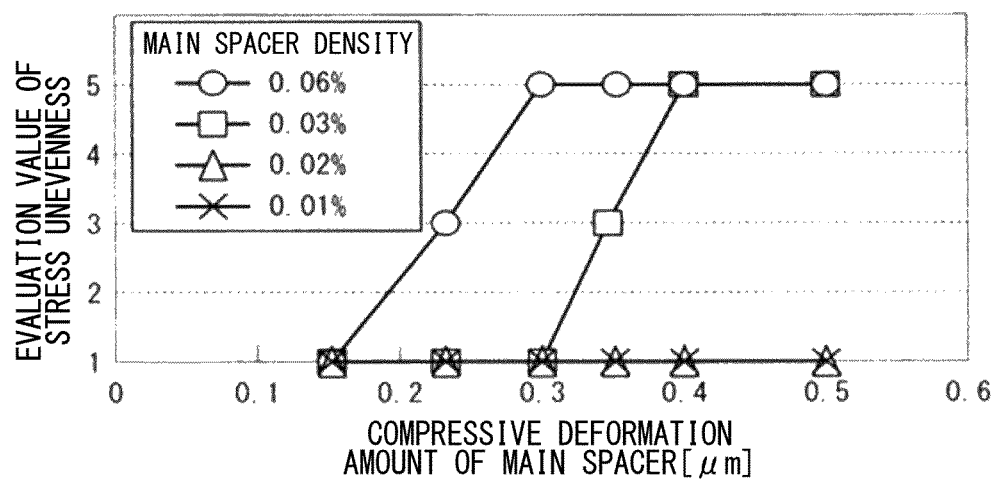
FIGS. 12A and 12B are views illustrating a relationship between a compressive deformation amount of a main spacer and stress unevenness, and a relationship between densities of the main spacer and a sub-spacer and a surface pressing strength.

FIG. 12A is a view illustrating a relationship between the compressive deformation amount of the main spacer 125*m* and stress unevenness. In FIG. 12A, the vertical axis represents a value obtained by evaluating shades of the stress unevenness in five stages, and it is illustrated that dense stress unevenness has been visually recognized as the numerical value increases. For example, "Evaluation value 5" indicates a result that extremely dense stress unevenness has been visually recognized, and "Evaluation value 1" indicates a result that stress unevenness has not been visually recognized.

Figure 11B:
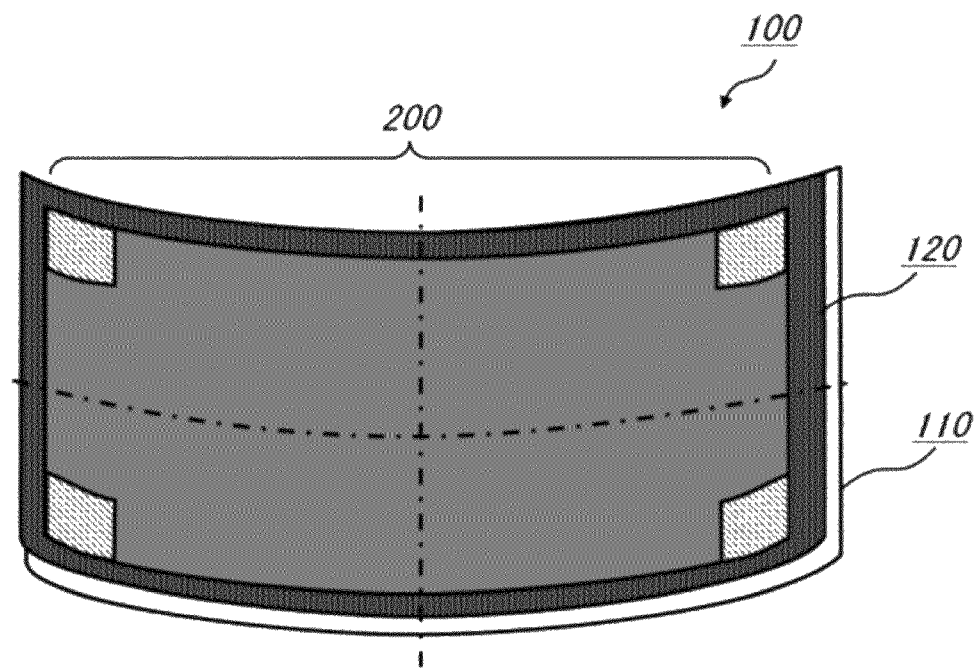

FIG. 11B is a view for describing the stress unevenness. In FIG. 11B, a portion where the stress unevenness is likely to occur is indicated by a hatched region. Regarding the stress unevenness, as the liquid crystal panel 100 is curved, the cell gap becomes narrow at the central portion in the curve direction, distortion caused by thickening of the cell gap in the peripheral portion entirely acts on the liquid crystal panel 100, and the stress particularly concentrates on the peripheral portion fixed by the sealing material 130, particularly on four corners of the liquid crystal panel 100 so that the stress unevenness is likely to occur at these four corners. For example, the stress unevenness is visually recognized as a white spot when the liquid crystal panel 100 displays an image ranging from black to low gradation.

As illustrated in FIG. 12A, when the density of the main spacer 125m is 0.06% and 0.03%, the stress unevenness is more likely to be visually recognized as the compressive deformation amount of the main spacer 125m increases. When the density of the main spacer 125m is 0.02% and 0.01%, it is understood that it is possible to suppress the stress unevenness without depending on the compressive deformation amount of the main spacer 125m. At that time, foaming at a low temperature was also evaluated, but no foaming occurred under any conditions. This is because the contraction of the main spacer 125m can also follow the contraction of the liquid crystal layer 140. From these results, it is possible to suppress not only the occurrence of gap unevenness but also the stress unevenness at the time of black display and generation of air bubbles due to an impact at a low temperature by setting the density of the main spacer 125m to 0.02% at most and changing the density of the main spacer 125m in accordance with the distribution of the force applied at the time of curving.

Figure 12B:
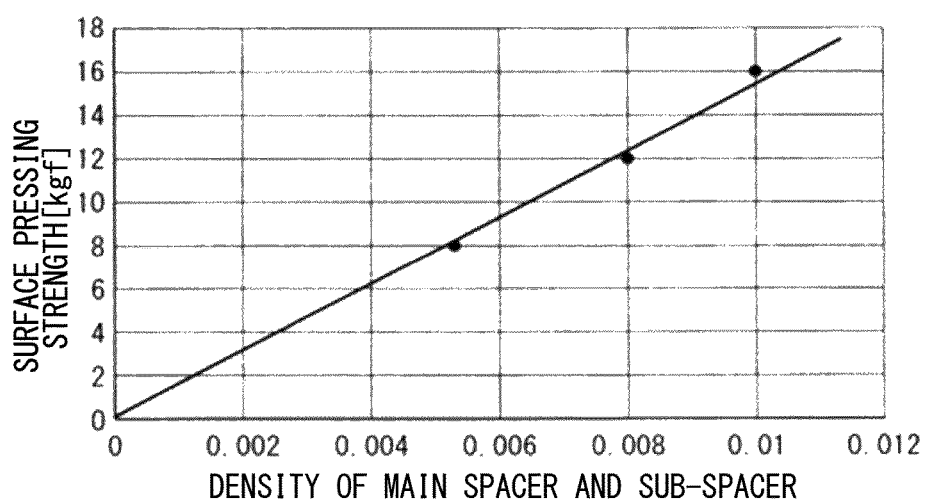

On the other hand, the gap unevenness or the like due to the application of the surface pressing stress FS from the outside is more likely to occur as the density of the main spacer 125m decreases. Therefore, it is possible to provide strength that can withstand the application of the surface pressing stress FS from the outside by forming the sub-spacer 125s having a lower height than the main spacer 125m as illustrated in FIG. 4. FIG. 12B is a view illustrating a relationship between the density of the main spacer 125m and the sub-spacer 125s and the surface pressing strength. More specifically, the surface pressing strength corresponds to a result obtained by applying the surface pressing stress FS to the liquid crystal panel 100 using a push-bull gauge having a diameter of 10 mm in a pseudo manner, and measuring a pushing pressure at which gap unevenness occurs. If the surface pressing strength, that is, the resistance with respect to the surface pressing is approximately 10 kgf or more, it can be said that there is sufficient strength against the application of the surface pressing stress FS, and the density of the main spacer 125m and the sub-spacer 125s is sufficient if being 0.6% or more as illustrated in FIG. 12B.

When the liquid crystal panel 100 is curved, the overall distortion in the liquid crystal panel 100 is mitigated by optimizing the dual spacer structure as described above since the stress unevenness mainly occurring at the four corners are fundamentally caused as the stress concentrates particularly on the four corners of the liquid crystal panel 100 as described above, and it is possible to obtain the improvement effect even for the stress unevenness generated at the four corners.

As described above, in the curved display 10 according to the first preferred embodiment, the dual spacer structure properly functions even in the case of being used in a wide temperature range by optimizing the arrangement of the dual spacer structure, and it is possible to suppress the stress unevenness at the time of display and the generation of air bubbles due to the impact at the low temperature and to suppress downward swelling failure at a high temperature. Therefore, when the curved display 10 is used in the wide temperature range, it is possible to suppress the occurrence of air bubbles and display unevenness. Since the appropriate arrangement of the dual spacer structure is adopted in accordance with the distribution of the force applied at the time of curving, it is possible to obtain the curved display 10 in which unevenness is suppressed even in the case of displaying white, halftone, black, or the like, that is, deterioration in display quality is suppressed.

Further, as the features of the holding mode using the housing 150 have been described above, the curved display 10 of the first preferred embodiment has the feature that the liquid crystal panel 100 is held to be deformable at the time of pressing by the surface pressing such that the curvature of the liquid crystal panel 100 is larger (the curvature radius is smaller) than the curved shape with a predetermined curvature before the application of the surface pressing. Even when the liquid crystal panel 100 is deformed to have the large curvature at the time of pressing by the surface pressing, the narrowing of the gap between the two substrates is mitigated in the central portion in the curve direction by using the liquid crystal panel 100 in which the arrangement of the dual spacer structure which is another feature is optimized. As a result, the deterioration of display quality is minimized as described above even when the curvature of the liquid crystal panel 100 is varied at the time of pressing by the surface pressing.

<Summary of Effects of First Preferred Embodiment>

The effects obtained by the curved display 10 of the first preferred embodiment as described above are summarized as follows. First, the curved display 10 of the first preferred embodiment adopts the configuration in which the liquid crystal panel 100 including the pair of glass substrates (the glass substrate 111 and the glass substrate 121) is incorporated in the curved shape curved in the one curve direction, the density of the main spacers 125m, which are the columnar spacers holding the gap between these substrates is higher in the region R1, which is the region of the central portion in the curve direction, than in the region R4, which is the region of the peripheral portion, in a state where the surface pressing stress FS except for the atmospheric pressure is applied to the surface of the liquid crystal panel 100, and the housing 150, which holds the outer peripheral portion of the liquid crystal panel 100 such that the curved shape is variable when the surface pressing stress FS is applied, in a state where the clearance GP1 and the clearance GP2 are provided in the central portion of the liquid crystal panel 100, is provided for the holding mode of holding the liquid crystal panel 100. Thus, it is possible to prevent the damage of the liquid crystal panel 100 even if the relatively weak liquid crystal panel 100, made of the pair of thinned glass substrates, is used to be formed in the curved shape, and to make the display unevenness hardly occur even when the surface pressing stress FS is applied as a person touches the liquid crystal panel 100.

Further, the curved display 10 of the first preferred embodiment is configured using the projected capacitive type touch panel TP in addition to the above features, and thus, has excellent operability with human fingers. Although it is assumed that there are various intensities of the stress from the central portion to the peripheral portion in the display region 200 as the position to which the surface pressing stress FS is applied and various types of the surface pressing stress FS are applied with a relatively high application frequency, it is possible to obtain the above-described effects and to prevent even the damage of the touch panel TP having the relatively low strength similarly to the liquid crystal panel 100. In addition, it is possible to mitigate the influence of the surface pressing stress FS acting directly and to use the thin transparent protection plate for the curved transparent protection cover 101 within the range where the liquid crystal panel 100 or the touch panel TP is not damaged or to omit the provision of the curved transparent protection cover 101 itself so that it is possible to obtain the curved display 10 equipped with the projected capacitive type touch panel TP with the high sensing sensitivity.

In addition to the above features, the curved display 10 of the first preferred embodiment is configured such that the curved transparent protection cover 101 having the curved shape with a predetermined curvature is pasted to the surface on the display surface side of the liquid crystal panel 100, which is the side where the surface pressing stress FS is applied, via the adhesive layer so as to be integrated. Thus, it is possible to mitigate the influence of the surface pressing stress FS directly acting on the liquid crystal panel 100 or the touch panel having the relatively low strength, and the influence of the surface pressing stress FS is mitigated even by the repulsive action which makes the curvature variation caused by the curved transparent protection cover 101 hardly occur. Further, as the holding mode of the liquid crystal panel 100, the protruding portion protruding from the end portion of the liquid crystal panel 100 is provided on the curved transparent protection cover 101 integrated with the liquid crystal panel 100. As the holding of the outer peripheral portion of the liquid crystal panel 100 by the housing 150 is performed by holding the protruding portion, it is possible to prevent the liquid crystal panel 100 or the touch panel TP having the relatively low strength from being damaged by the holding force of the housing 150 holding the liquid crystal panel 100.

Further, in the more detailed holding mode of the housing 150 holding the liquid crystal panel 100, the holding surface 151M that mainly holds the liquid crystal panel 100 is provided on the two non-curved sides of the liquid crystal panel 100, and the opposing holding surface 151S is provided with respect to the curved transparent protection cover 101, which is the other member integrated with the liquid crystal panel 100 to form the stacked body, or the liquid crystal panel 100 with the gap portion (clearance GP1), on both the two sides along the curve direction. When the surface pressing stress FS acts on the liquid crystal panel 100 so that the curvature varies, the liquid crystal panel 100 is held as the holding surface 151S abuts on the liquid crystal panel 100, and the degree of the deformation (curvature variation) is limited. Therefore, it is possible to prevent the damage caused as the liquid crystal panel 100 is greatly curved due to the application of the surface pressing stress FS.

In addition to the above features, in the curved display 10 of the first preferred embodiment, the dual spacer structure is adopted in the configuration of the columnar spacers forming the liquid crystal panel 100, and further, the density of the main spacer 125m is set within a predetermined range where the low-temperature foaming and gravity unevenness hardly occur. Thus, it is possible to obtain the highly reliable curved display 10 which hardly causes failure in the wide temperature range. Further, regarding the total density of the main spacer 125m and the sub-spacer 125s, the arrangement for each region is optimized assuming the curvature range which can be adopted when the liquid crystal panel 100 is held in the housing 150 such that the curvature is variable. Thus, it is possible to obtain the curved display 10 adopting the dual spacer structure which hardly causes the low-temperature foaming and gravity unevenness, to prevent the damage of the liquid crystal panel 100 used in the curved display 10, to make the display unevenness hardly occur even when the surface pressing stress FS is applied, and to obtain all the above effects together.

<Modification Relating to Arrangement of Columnar Spacers>

Next, a description will be given regarding the curved display 10 according to a modification in which a columnar spacer arrangement is changed from the example of the columnar spacer arrangement described above with reference to FIGS. 13A and 13B. In the modification, a method of adjusting a distribution density using a specific arrangement of the main spacer 125m and the sub-spacer 125s is changed from the above-described preferred embodiment. Hereinafter, changed portions from the above-described preferred embodiment will be described, and the other description will be omitted as appropriate.

Figure 13A:
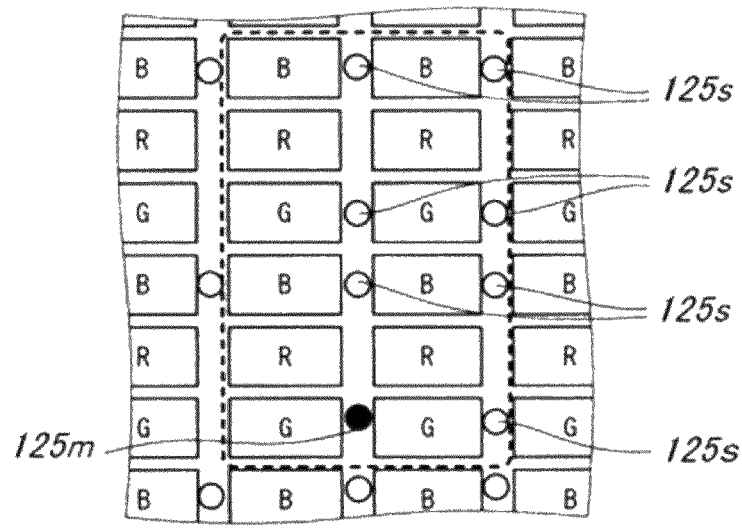
FIGS. 13A and 13B are views illustrating an arrangement of columnar spacers in a region R1 and a region R4 according to a modification of the first preferred embodiment.
Figure 13B:
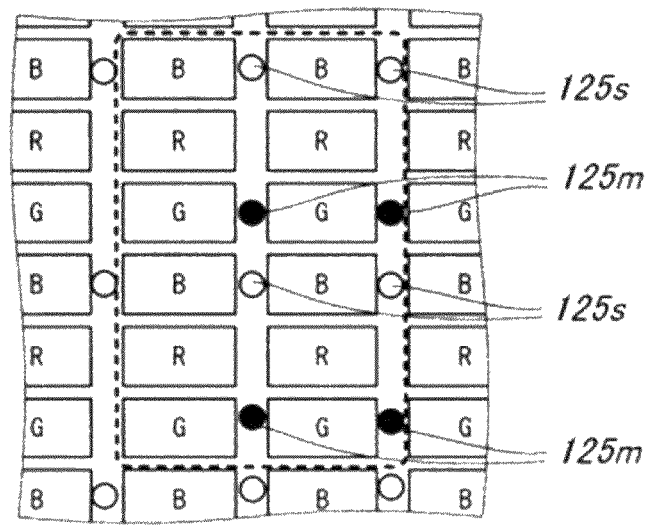

FIGS. 13A and 13B are views corresponding to FIGS. 6A and 6B in the above-described preferred embodiment, and FIGS. 13A and 13B are the views illustrating examples of the arrangement of the main spacer 125m and the sub-spacer 125s in the regions R1 and R4 illustrated in FIG. 5, respectively. In the modification, the main spacer 125m is arranged in one pixel per twelve pixels, and the sub-spacer 125s is arranged in seven pixels per twelve pixels, in the region R4 as illustrated in FIG. 13A. Further, the main spacer 125m is arranged in four pixels per twelve pixels, and the sub-spacer 125s is arranged in four pixels per twelve pixels, in the region R1 as illustrated in FIG. 13B. The arrangement of the sub-spacer 125s is omitted for the pixel in which the sub-spacer 125s is arranged in a stepwise manner from the region R4 to the region R1. Instead, the number of pixels in which the main spacer 125m is arranged is increased by arranging the main spacer 125m at such a position.

More specifically, the position where the main spacer 125m or the sub-spacer 125s is arranged is set to pixels of B (blue) and G (green), and an arrangement density of the columnar spacers in the regions R1 to R4 (a density of a combined arrangement of the main spacer 125m and the sub-spacer 125s) is constant at eight pixels per twelve pixels. On the other hand, the main spacer 125m is arranged in one pixel of G (green) per twelve pixels in the region R4, the sub-spacer 125s arranged in the pixel of G (green) is replaced with the main spacer 125m sequentially until reaching the region R1, the main spacer 125m is arranged in all the pixels of G (green) in the region R1 so that the main spacer 125m is arranged in four pixels per twelve pixels.

That is, when the density of the main spacer 125m is changed and adjusted within a plane, the adjustment is performed by increasing a ratio of pixels where the main spacer 125m is arranged by sequentially replacing the sub-spacer with the main spacer 125m in the pixels where any of the spacers is arranged without changing the total number of spacers of the main spacers 125m and the sub-spacers 125s in a unit region (twelve pixels in this example) within a plane.

Adoption of such an adjustment method has the following advantages. Here, the surface pressing strength which is a resistance when the surface pressing stress FS is applied to the liquid crystal panel 100 depends on the arrangement density of the sub-spacers 125s, in more detail, the total number of spacers (arrangement density) of the main spacers 125m and the sub-spacers 125s. Thus, it is possible to obtain an effect that the surface pressing strength can also be made uniform within a plane since the total number of spacers of the main spacers 125m and the sub-spacers 125s is uniform within a plane as described above in the arrangement of the modification. Therefore, it is possible to say that the configuration is suitable for the curved display 10 with the projected capacitive type touch panel TP in which a frequency of applying the surface pressing stress FS from the central portion to the peripheral portion in the display region 200 becomes relatively high, which is similar to, for example, the curved display 10 of the first preferred embodiment.

As described in the above-described preferred embodiment, a specific arrangement ratio changes depending on a relationship between one pixel area and the area (size/diameter) of one columnar spacer, and thus, the arrangement ratio may be appropriately changed and applied within a range of the above-described adjustment means.

Although the total number of spacers of the main spacers 125m and the sub-spacers 125s in the unit region is made constant within the plane in the modification, the adjustment may be performed together with a method of adding the main spacer 125m at a position where the sub-spacer 125s is not arranged, such as the central portion in the curve direction, as described in the above-described preferred embodiment when the density is insufficient for a desired density of the main spacers 125m only with the replacement from the sub-spacers 125s and when the ratio deviates from a desired ratio between the main spacer 125m and the sub-spacer 125s. In such a case, the total number of spacers of the main spacers 125m and the sub-spacers 125s in the unit region is not constant within the plane, but is increased from the peripheral portion to the central portion in the curve direction, which is similar to the example of the first preferred embodiment.

In particular, the configuration in which the total number of spacers of the main spacers 125m and the sub-spacers 125s in the unit region is not constant within the plane but is increased from the peripheral portion to the central portion in the curve direction is adopted in this manner. Such adoption of the configuration is desirable in the case of the curved display provided with the touch panel since the distribution of the intensity of the surface pressing stress FS generated at the time of operating the touch panel or the distribution of the application frequency of the surface pressing stress FS tends to increase from the peripheral portion to the central portion in the display region 200 particularly when operating the projected capacitive type touch panel TP.

When the density of the main spacer 125m is insufficient even with the replacement of the sub-spacer 125s or the method of adding the main spacer 125m at the position where the sub-spacer 125s is not arranged as described above in the central portion where the arrangement density of the main spacers 125m is to be increased the most, the arrangement of the sub-spacer 125s may be omitted in the central portion and the main spacers 125m may be arranged in the entire central portion such that the areal density of the main spacers 125m decreases and the number of the sub-spacers 125s to be arranged is appropriately increased as proceeding toward the outer side.

Second Preferred Embodiment

Next, a description will be given regarding a configuration and an operation of a curved display 10a as a liquid crystal display apparatus according to a second preferred embodiment, which is a modification particularly relating to a holding mode using a housing of the curved display 10 of the first preferred embodiment, with reference to FIGS. 14A to 15C. Here, FIGS. 14A to 15C are cross-sectional views illustrating a state corresponding to presence or absence of application of the surface pressing stress FS to a display surface side of the liquid crystal panel 100 in the curved display 10a of the second preferred embodiment, and correspond to FIGS. 9A to 10C used in the description on the operation of the first preferred embodiment. Similarly to the respective cross-sectional views in FIGS. 9A to 10C, FIGS. 14A and 15A correspond to the cross-sectional views in a direction along a curve direction (a vicinity of a central portion), FIGS. 14B and 15B correspond to the cross-sectional views in the direction along the curve direction (a vicinity of an end portion), and FIGS. 14C and 15C correspond to the cross-sectional views in a direction perpendicular to the curve direction (the vicinity of the central portion). Hereinafter, changed portions from the first preferred embodiment will be mainly described.

Figure 14A:
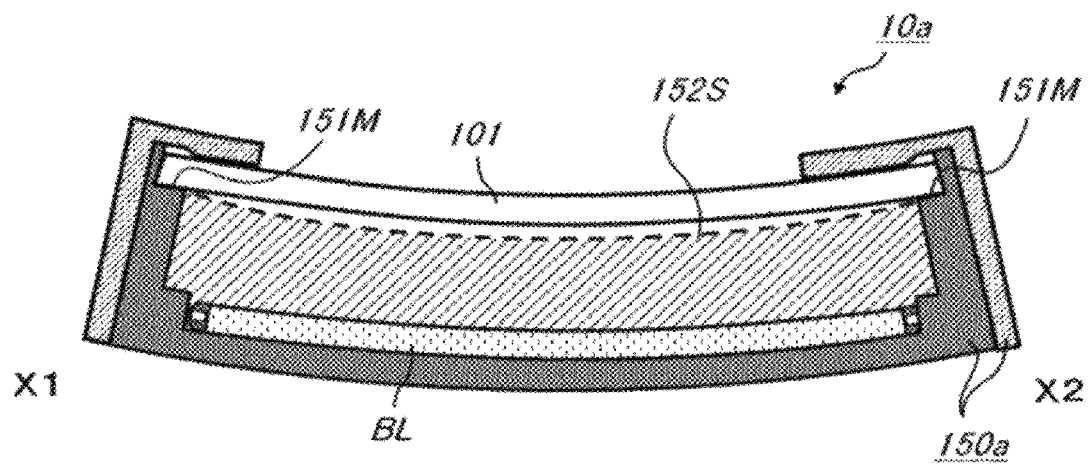
FIGS. 14A to 14C are cross-sectional views for describing a configuration and an operation of a liquid crystal display apparatus according to a second preferred embodiment of the present invention.

First, a description will be given particularly regarding changed portions from the first preferred embodiment in a holding mode as a characteristic part of the configuration of the curved display 10a of the second preferred embodiment with reference to FIGS. 14A to 14C. As illustrated in the respective cross-sectional views in the direction along the curve direction of FIGS. 14A and 14B, a housing 150a that holds the liquid crystal panel 100 is provided with the pair of holding surfaces 151M holding a protruding portion of the curved transparent protection cover 101 on two non-curved sides among four sides of an outer peripheral portion of the liquid crystal panel 100 in the second preferred embodiment, which is common with the first preferred embodiment.

Figure 14B:
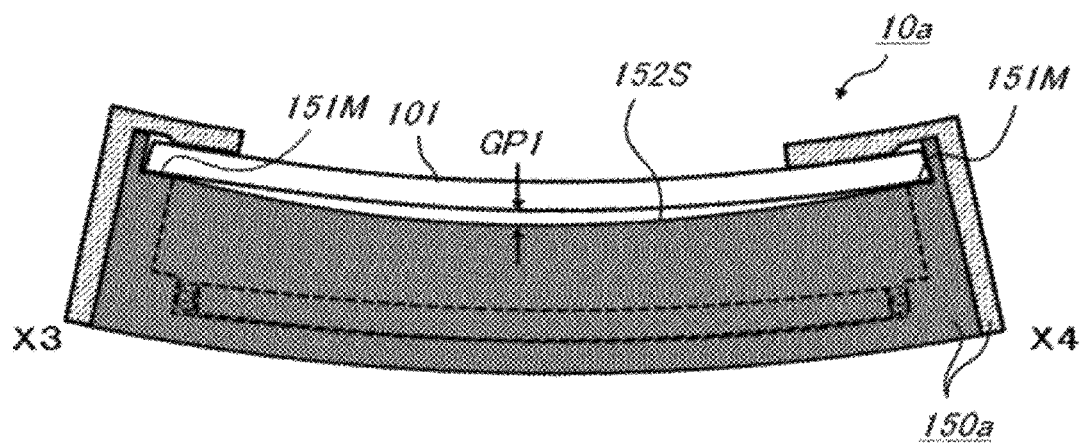
Figure 14C:
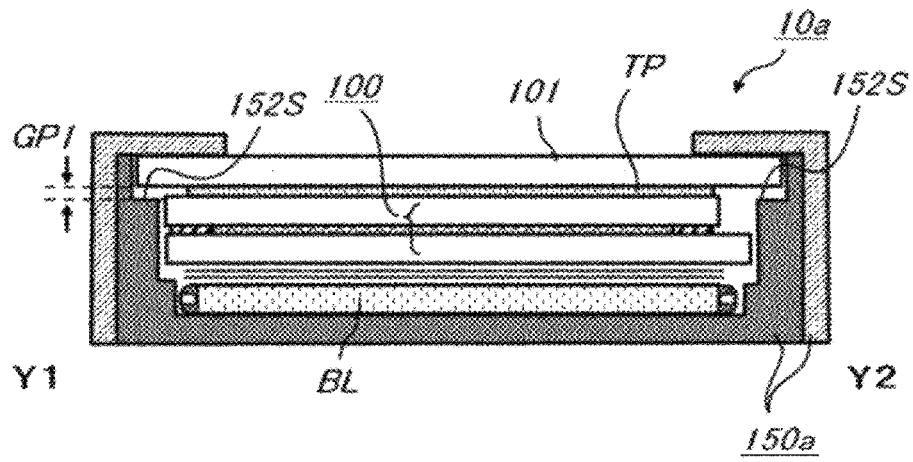

As illustrated in FIGS. 14B and 14C, on two curved sides among the four sides of the outer peripheral portion of the liquid crystal panel 100, the housing 150a is provided with a pair of holding surfaces 152S, provided to oppose the lower surface near the two sides of the curved transparent protection cover 101 with the clearance GP1, which is a common feature. However, the clearance GP1 is different within a formation region of the holding surface 152S of the housing 150a of the second preferred embodiment while the clearance GP1 which is approximately equidistant from the curved transparent protection cover 101 is provided within a formation region of the holding surface 151S of the housing 150 of the first preferred embodiment. Specifically, the clearance GP1 which is the maximum at the central portion in the curve direction of the liquid crystal panel 100 is provided, and the clearance GP1 gradually decreases from the central portion to the end portion. The clearance GP1 almost disappears at the end portion, and the holding surface 152S is provided so as to have the same height as the holding surface 151M.

As a specific curved surface shape of the holding surface 152S, a curved surface shape having a curvature is formed by extrapolating an arc passing a position separated from a lower surface of the liquid crystal panel 100 by the clearance GP1 in the central portion in the curve direction of the liquid crystal panel 100 and positions of end portions of a surface of the holding surface 151M on the center side of the liquid crystal panel 100. That is, the curved surface shape of the holding surface 152S is configured as a curved surface having a curvature following curved shapes of the curved transparent protection cover 101 and the liquid crystal panel 100 when the surface pressing stress FS is applied to the liquid crystal panel 100 and the curved transparent protection cover 101 abuts as will be described in detail later.

Figure 15A:
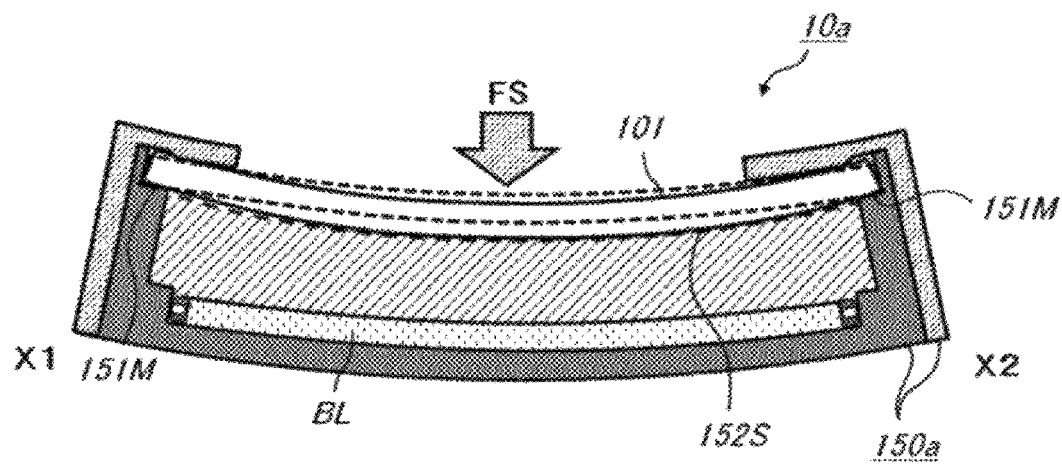
FIGS. 15A to 15C are cross-sectional views illustrating the operation of the liquid crystal display apparatus according to the second preferred embodiment of the present invention.
Figure 15B:
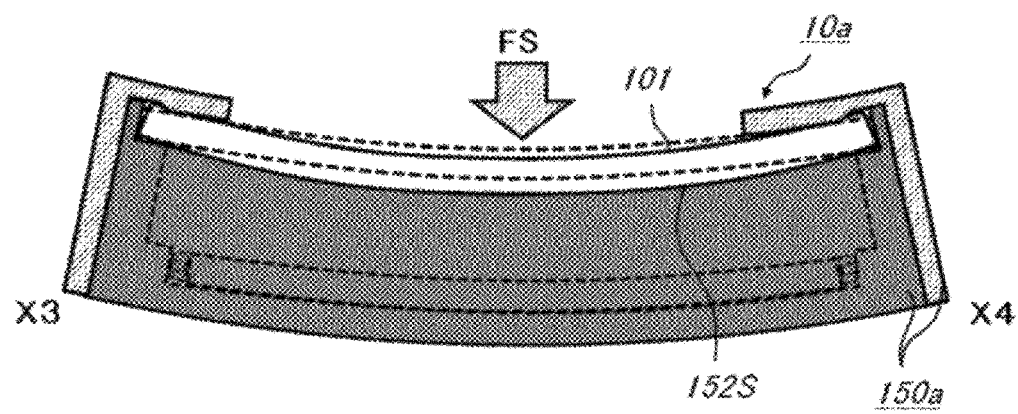
Figure 15C:
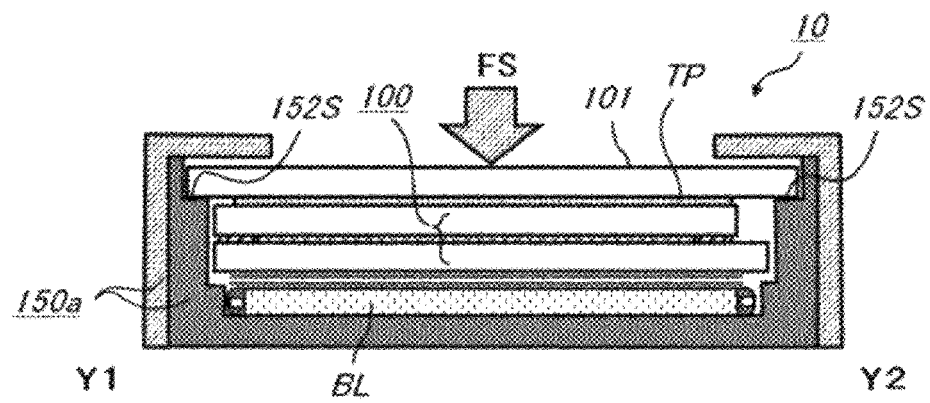

Next, a description will be given regarding an operation obtained in the curved display 10a according to the second preferred embodiment with reference to FIGS. 15A to 15C illustrating a state where the surface pressing stress FS is applied to the display surface side of the liquid crystal panel 100 described above, in addition to FIGS. 14A to 14C illustrating a state where the surface pressing stress FS is not applied. As illustrated in FIGS. 15A to 15C, in the curved display 10a of the second preferred embodiment, the liquid crystal panel 100 is held in a state where a gap portion is provided with respect to the housing 150a such that the curvature of the curved shape of the liquid crystal panel 100 is variable, as a mode of holding the liquid crystal panel 100 using the housing 150a when the surface pressing stress FS is applied to the display surface side, and thus, the curvature variation of the curved shape of the liquid crystal panel 100 is not particularly hindered, and the curved transparent protection cover 101 is deformed such that a curvature of curving increases (curvature radius decreases) as illustrated in the respective cross-sectional views of FIGS. 15A to 15C, which is similar to the first preferred embodiment.

Accordingly, the holding surface 152S provided in the housing 150a abuts on the curved transparent protection cover 101 to serve the role of holding only when the surface pressing stress FS is applied to the display surface side of the liquid crystal panel 100 and the curved transparent protection cover 101, and the liquid crystal panel 100 and the curved transparent protection cover 101 are deformed such that the degree of curving increases, which is the same as the holding surface 151S of the first preferred embodiment. The holding surface 151S of the first preferred embodiment locally abuts in the vicinity of the central portion in the curve direction when abutting on the curved transparent protection cover 101 as the surface pressing stress FS is applied to the display surface side. However, when the holding surface 152S of the second preferred embodiment abuts on the curved transparent protection cover 101 as the surface pressing stress FS is applied to the display surface side, the curved transparent protection cover 101 abuts on substantially the entire formation region of the holding surface 152S as a result of providing the curved surface shape of the holding surface 152S exactly as the curved surface having the curvature when the curved transparent protection cover 101 abuts on the holding surface 152S as illustrated in FIG. 15B. In other words, the curved transparent protection cover 101 is held in the entire formation region of the holding surface 152S.

As a result, the surface pressing stress FS is applied to the display surface side, it is possible to prevent stress concentration when the curved transparent protection cover 101 abuts on the holding surface 152S of the housing 150a, and it is possible to prevent the curved transparent protection cover 101 or the liquid crystal panel 100 from being damaged when being held by the holding surface 152S of the housing 150a. Here, the case where the curved transparent protection cover 101 abuts on the holding surface 152S of the housing 150a when the surface pressing stress FS is applied to the display surface side to change the curvature of the liquid crystal panel 100 has been described. When it is assumed that the liquid crystal panel 100 abuts on any part of the housing 150a, it is preferable to arrange a holding surface having a curved surface with a curvature following the curved shape of the liquid crystal panel 100 at the time of abutment at the corresponding part. Even in such a case, it is possible to obtain the effects of preventing the stress concentration when the liquid crystal panel 100 abuts on a part of the housing 150a and preventing the damage of the liquid crystal panel 100 in the same manner.

As described above, basically, it is possible to obtain the same effects as the first preferred embodiment according to the holding mode of the second preferred embodiment. In addition, it is possible to prevent the stress concentration caused when the surface pressing stress FS is applied to the display surface side and the liquid crystal panel 100 or the curved transparent protection cover 101 abuts on the holding surface 152S of the housing 150a, and to prevent the damage of the liquid crystal panel 100 or the curved transparent protection cover 101 from being damaged accompanying the abutment.

Third Preferred Embodiment

Figure 16:
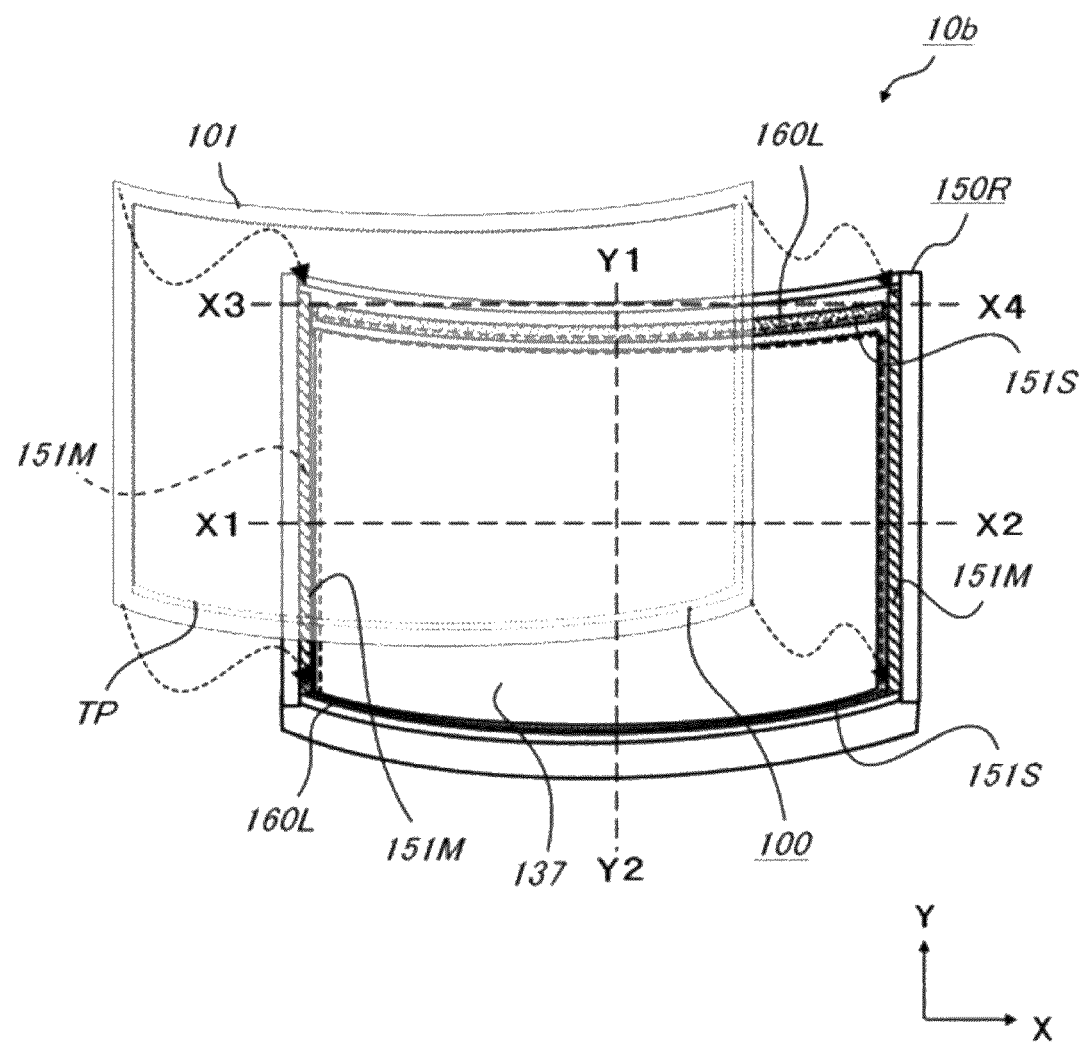
FIG. 16 is an overall view of a liquid crystal panel and a housing of a liquid crystal display apparatus according to a third preferred embodiment of the present invention.

Next, a description will be given regarding a configuration and an operation of a curved display 10b as a liquid crystal display apparatus according to a third preferred embodiment, which is a modification particularly relating to a holding mode using a housing of the curved display 10 of the first preferred embodiment, with reference to FIGS. 16 to 18C. Here, FIG. 16 illustrates an overall view of a liquid crystal panel 100 included in the curved display 10b of the third preferred embodiment and a housing holding the liquid crystal panel 100, and corresponds to FIG. 2 according to the first preferred embodiment. In addition, FIGS. 17A to 18C are cross-sectional views illustrating a state corresponding to presence or absence of application of the surface pressing stress FS to a display surface side of the liquid crystal panel 100 in the curved display 10b, and correspond to FIGS. 9A to 10C used in the description on the operation of the first preferred embodiment. Similarly to the respective cross-sectional views in FIGS. 9A to 10C, FIGS. 17A and 18A correspond to the cross-sectional views in a direction along a curve direction (a vicinity of a central portion: a position along cross-sectional line X1-X2 in FIG. 16), FIGS. 17B and 18B correspond to the cross-sectional views in the direction along the curve direction (a vicinity of an end portion: a position along cross-sectional line X3-X4 in FIG. 16), and FIGS. 17C and 18C correspond to the cross-sectional views in a direction perpendicular to the curve direction (a vicinity of the central portion: a position along cross-sectional line Y1-Y2 in FIG. 16). Hereinafter, changed portions from the first preferred embodiment will be mainly described.

Figure 17A:
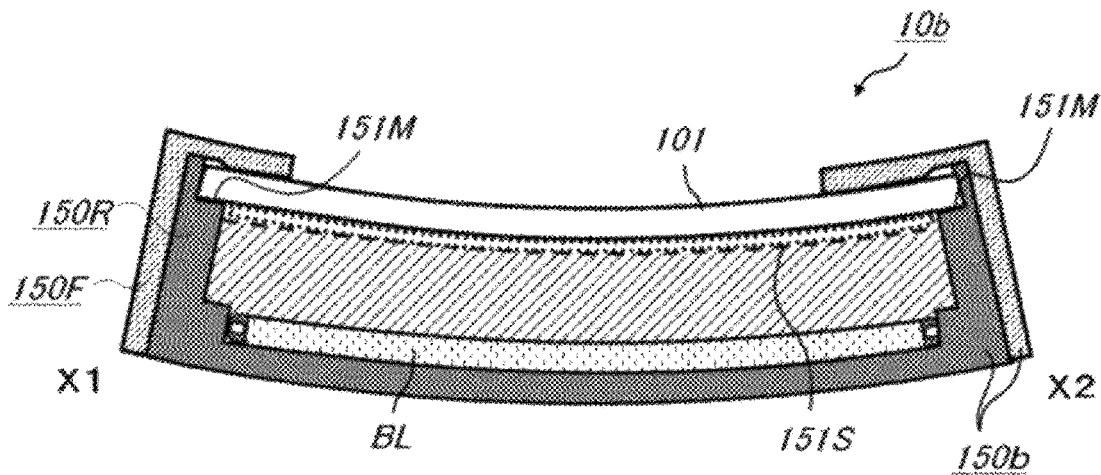
FIGS. 17A to 17C are cross-sectional views for describing a configuration and an operation of the liquid crystal display apparatus according to the third preferred embodiment of the present invention.

First, a description will be given particularly regarding changed portions from the first preferred embodiment in a holding mode as a characteristic part of the configuration of the curved display 10b of the third preferred embodiment with reference to FIGS. 16 to 17C. As illustrated in the overall view of FIG. 16 and the respective cross-sectional views in the direction along the curve direction of FIGS. 17A and 17B, a housing 150b that holds the liquid crystal panel 100 is provided with the pair of holding surfaces 151M holding a protruding portion of the curved transparent protection cover 101 on two non-curved sides among four sides of an outer peripheral portion of the liquid crystal panel 100 in the third preferred embodiment, which is common with the first preferred embodiment.

Figure 17B:
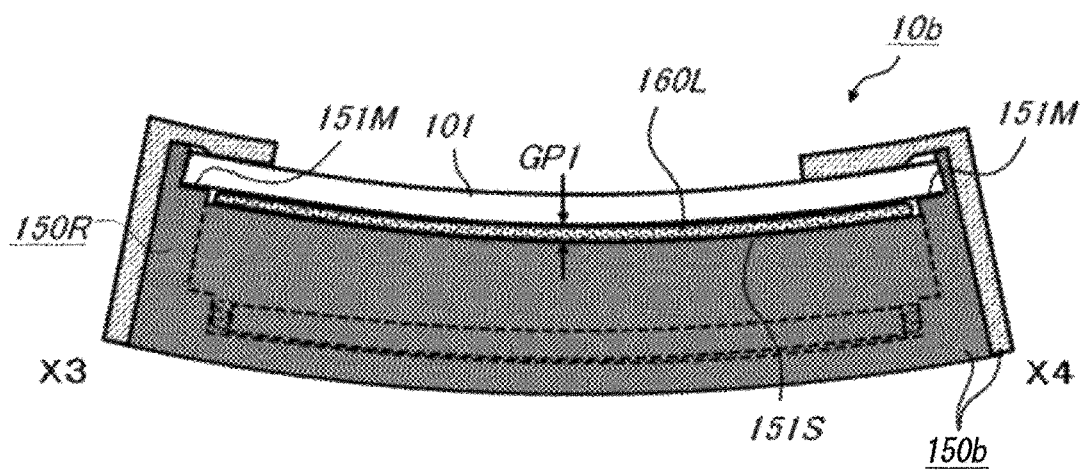
Figure 17C:
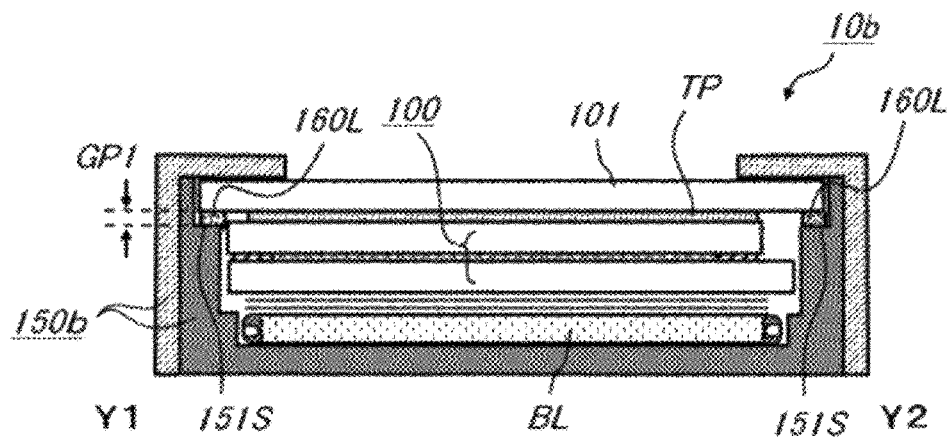

As illustrated in FIGS. 17B and 17C, on two curved sides among the four sides of the outer peripheral portion of the liquid crystal panel 100, the housing 150b is provided with the pair of holding surfaces 151S, provided to oppose lower surfaces near the two sides of the curved transparent protection cover 101 with the clearance GP1, which is a common feature. For example, a difference is that a buffer member 160L such as a cushion material is arranged to fill the clearance GP1 provided between the curved transparent protection cover 101 and the holding surface 151S in a portion of the holding surface 151S provided on the two curved sides of the housing 150b of the third preferred embodiment while the clearance GP1 which is approximately equidistant from the curved transparent protection cover 101 is provided within the formation region of the holding surface 151S of the housing 150 of the first preferred embodiment and the curved transparent protection cover 101 and the holding surface 151S are arranged to oppose each other in a state where nothing is arranged in the gap portion, that is, only with an air layer interposed therebetween.

A member, which acts to buffer an impact, stress, or the like generated when the gap between the curved transparent protection cover 101 and the holding surface 151S is narrowed and the curved transparent protection cover 101 and the holding surface 151S abut on each other, is preferably used as the buffer member 160L, and thus, not only the cushion material but also a rubber or spring material may be used. The spring member may be a spring member integrated with a member of the rear frame 150R forming the holding surface 151S or may be provided separately from the member of the rear frame 150R. As a member having the buffering action, a general elastic material with which a larger repulsive force acts as the deformation amount increases may be used. When emphasizing the impact absorbing action, a soft urethane foam having a low rebound resilience such that a repulsive force does not immediately acts even if being deformed and gradually returns to its original shape, or the like may be used.

Figure 18A:
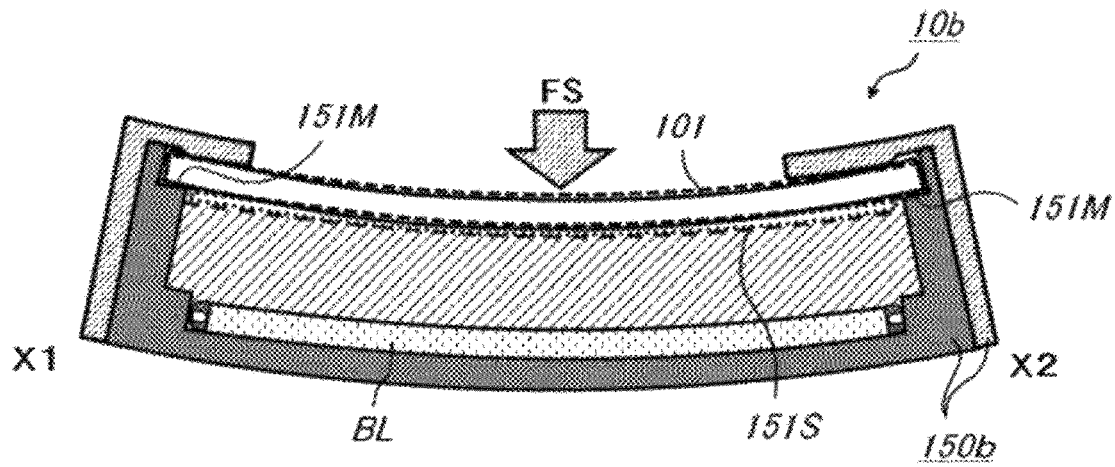
FIGS. 18A to 18C are cross-sectional views illustrating the operation of the liquid crystal display apparatus according to the third preferred embodiment of the present invention.
Figure 18B:
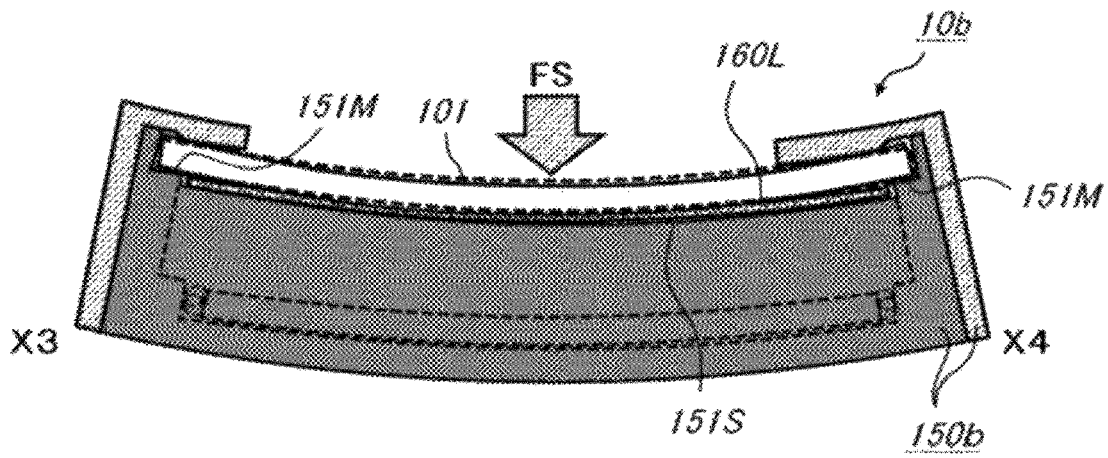
Figure 18C:
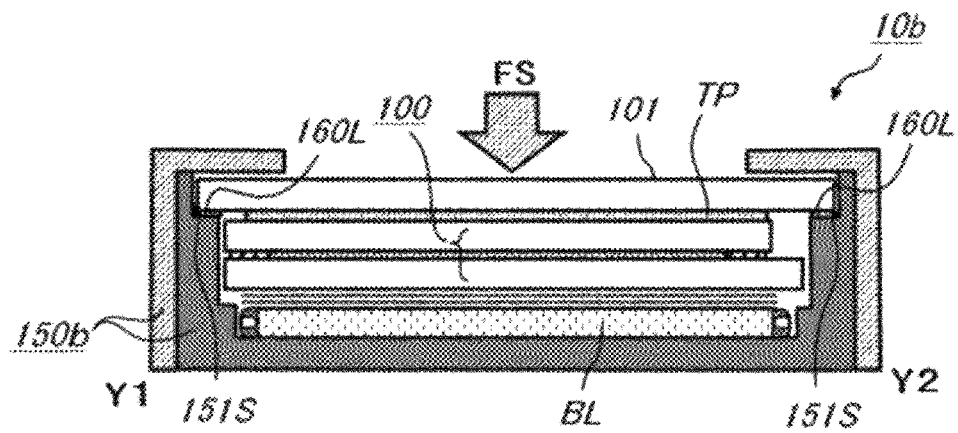

Next, a description will be given regarding an operation obtained in the curved display 10b according to the third preferred embodiment with reference to FIGS. 18A to 18C illustrating a state where the surface pressing stress FS is applied to the display surface side of the liquid crystal panel 100 described above, in addition to FIGS. 17A to 17C illustrating a state where the surface pressing stress FS is not applied. As illustrated in FIGS. 18A to 18C, when the surface pressing stress FS is applied to the display surface side, the liquid crystal panel 100 is held in a state where a gap portion is provided with respect to the housing 150b as a mode of holding the liquid crystal panel 100 using the housing 150b in the curved display 10b of the third preferred embodiment. In particular, the buffer member 160L is provided in the gap portion in the third preferred embodiment, but there is no change in terms of holding the liquid crystal panel 100 such that a curvature of a curved shape is variable. Therefore, a curvature variation of the curved shape of the liquid crystal panel 100 is not particularly hindered, and the curved transparent protection cover 101 is deformed such that a curvature of curving increases (curvature radius decreases) as illustrated in the respective cross-sectional views of FIGS. 18A to 18C, which is the same as the first preferred embodiment.

Therefore, when the surface pressing stress FS is applied to the display surface side of the liquid crystal panel 100 and the curved transparent protection cover 101, the liquid crystal panel 100 and the curved transparent protection cover 101 are deformed such that the degree of curving increases, and the buffer member 160L is greatly compressed until the clearance GP1 substantially disappears, the holding surface 151S provided in the housing 150b has substantially the same function as the holding surface 151S of the first preferred embodiment in terms of functioning to hold the curved transparent protection cover 101 with the buffer member 160L interposed therebetween and to prevent the liquid crystal panel 100 and the curved transparent protection cover 101 from being more greatly deformed. The holding surface 151S of the first preferred embodiment locally abuts in the vicinity of the central portion in the curve direction when abutting on the curved transparent protection cover 101 as the surface pressing stress FS is applied to the display surface side. However, a portion to abut on the curved transparent protection cover 101 to be held as the surface pressing stress FS is applied to the display surface side is deformed such that a shape of the buffer member 160L arranged on the holding surface 151S is provided exactly along the curved surface of the curved transparent protection cover 101 as illustrated in FIG. 18B in the case of the holding surface 151S provided via the buffer member 160L of the third preferred embodiment, and as a result, the curved transparent protection cover 101 abuts on the surface of the buffer member 160L over substantially the entire formation region of the holding surface 151S. In other words, the curved transparent protection cover 101 is held in the entire formation region of the holding surface 151S with the buffer member 160L interposed therebetween.

As a result, the surface pressing stress FS is applied to the display surface side, it is possible to prevent stress concentration when the curved transparent protection cover 101 is held by the holding surface 151S of the housing 150b, and it is possible to prevent the curved transparent protection cover 101 or the liquid crystal panel 100 from being damaged when being held by the holding surface 151S of the housing 150b. In this respect, operations and effects similar to those of the holding mode of the housing 150a of the second preferred embodiment described above can be obtained.

As another operation and effect by the housing 150b having the holding surface 151S provided via the buffer member 160L according to the third preferred embodiment, it has been described in the configuration of the first preferred embodiment that the generation of the repulsive force of the curved transparent protection cover 101 that tries to recover the original curved shape (curvature) is advantageous to prevent the damage of the touch panel TP and the liquid crystal panel 100 when the surface pressing stress FS is applied to the display surface side and the liquid crystal panel 100 and the curved transparent protection cover 101 are curved, and this operation can be obtained in common even in the third preferred embodiment. Further, repulsive action caused by compression of the buffer member 160L as well as the repulsive action by the curved transparent protection cover 101 is applied in the case of the third preferred embodiment. Thus, action of mitigating the deformation of the liquid crystal panel 100 and the curved transparent protection cover 101 with a large curvature becomes great, which is more advantageous to prevent the damage of the touch panel TP or the liquid crystal panel 100.

As described above, according to the holding mode of the third preferred embodiment, the same effects as the first preferred embodiment can be obtained basically, and the effect of preventing the damage of the touch panel TP or the liquid crystal panel 100, which is the effect obtained in the first preferred embodiment, can be more remarkably obtained since the repulsive action caused by the compression of the buffer member 160L provided on the holding surface 151S on the curved two sides of the liquid crystal panel 100 is added to the action of mitigating the deformation of the liquid crystal panel 100 and the curved transparent protection cover 101 with the large curvature. In addition, it is possible to prevent the stress concentration caused when the surface pressing stress FS is applied to the display surface side and the liquid crystal panel 100 or the curved transparent protection cover 101 is held by the holding surface 151S of the housing 150b, and to prevent the liquid crystal panel 100 or the curved transparent protection cover 101 from being damaged accompanying the holding.

Fourth Preferred Embodiment

Figure 19:
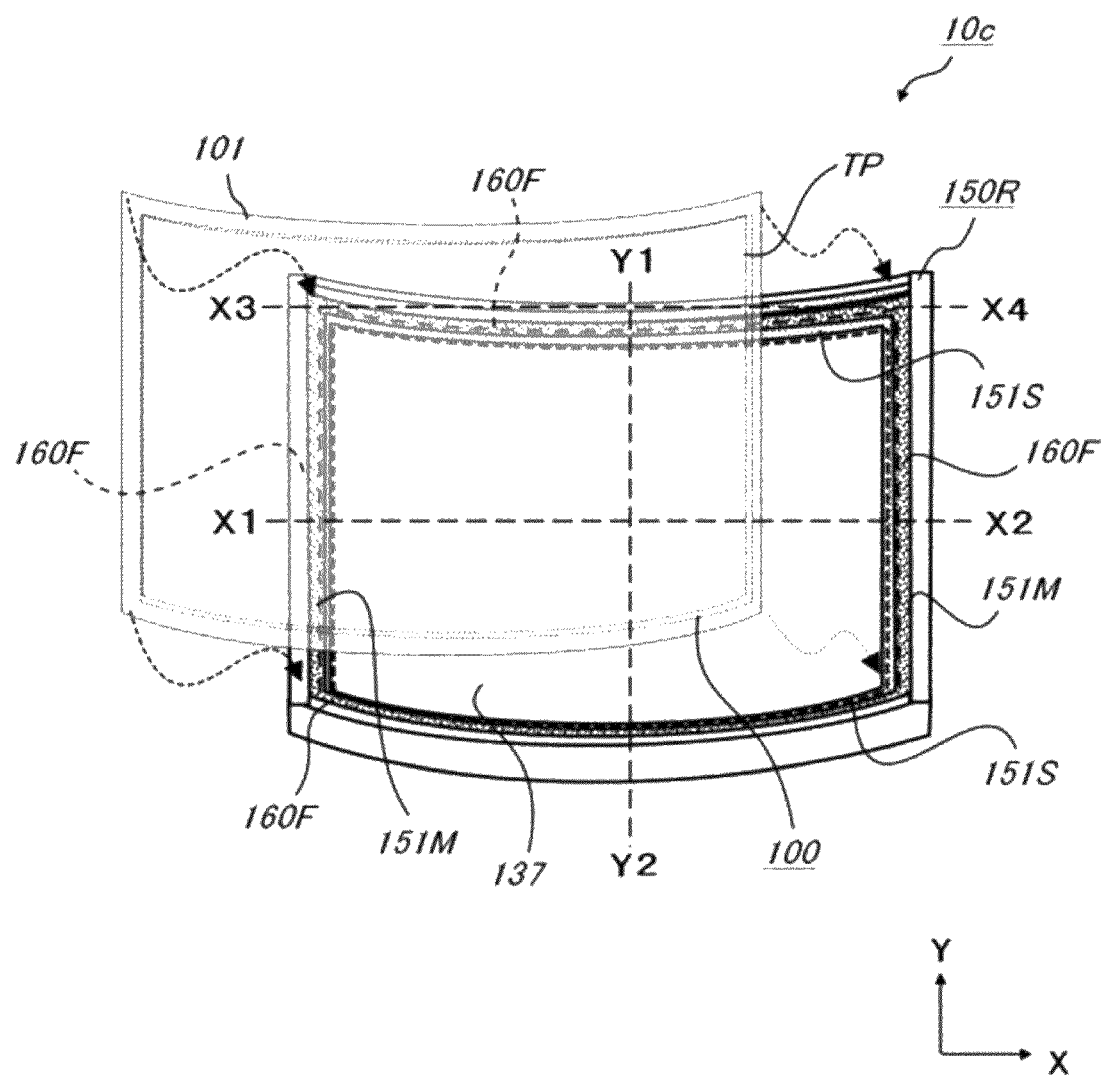
FIG. 19 is an overall view of a liquid crystal panel and a housing of a liquid crystal display apparatus according to a fourth preferred embodiment of the present invention.

Next, a description will be given regarding a configuration and an operation of a curved display 10c as a liquid crystal display apparatus according to a fourth preferred embodiment, which is a modification particularly relating to a holding mode using a housing of the curved display 10*b* of the third preferred embodiment, with reference to FIGS. 19 to 21C. Here, FIG. 19 illustrates an overall view of a liquid crystal panel 100 included in the curved display 10*c* of the fourth preferred embodiment and a housing holding the liquid crystal panel 100, and corresponds to FIG. 16 according to the third preferred embodiment. In addition, FIGS. 20A to 21C are cross-sectional views illustrating a state corresponding to presence or absence of application of the surface pressing stress FS to a display surface side of the liquid crystal panel 100 in the curved display 10*c*, and correspond to FIGS. 17A to 18C used in the description on the operation of the third preferred embodiment. Similarly to the respective cross-sectional views in FIGS. 17A to 18C, FIGS. 20A and 21A correspond to the cross-sectional views in a direction along a curve direction (a vicinity of a central portion: a position along cross-sectional line X1-X2 in FIG. 19), FIGS. 20B and 21B correspond to the cross-sectional views in the direction along the curve direction (a vicinity of an end portion: a position along cross-sectional line X3-X4 in FIG. 19), and FIGS. 20C and 21C correspond to the cross-sectional views in a direction perpendicular to the curve direction (a vicinity of the central portion: a position along cross-sectional line Y1-Y2 in FIG. 19). Hereinafter, changed portions from the third preferred embodiment will be mainly described.

Figure 20A:
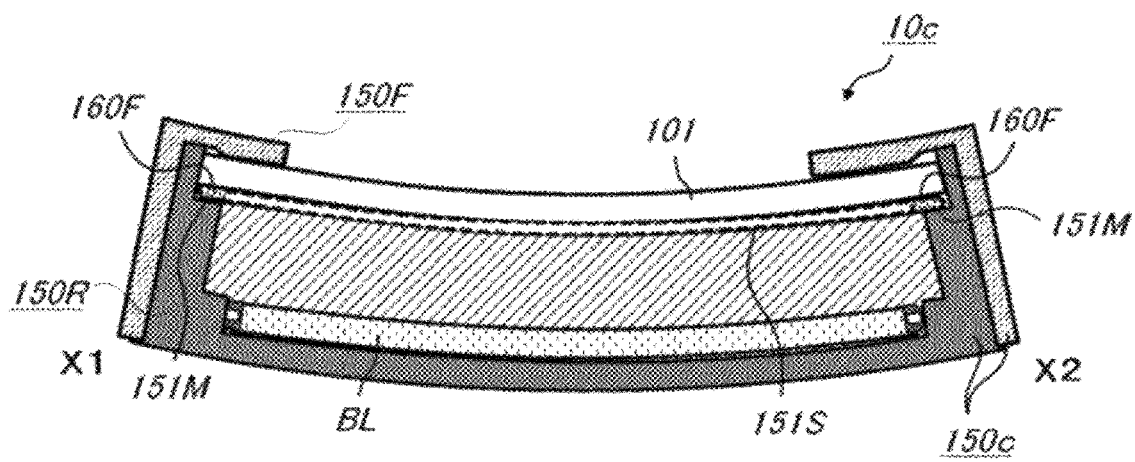
FIGS. 20A to 20C are cross-sectional views for describing a configuration and an operation of the liquid crystal display apparatus according to the fourth preferred embodiment of the present invention.
Figure 20B:
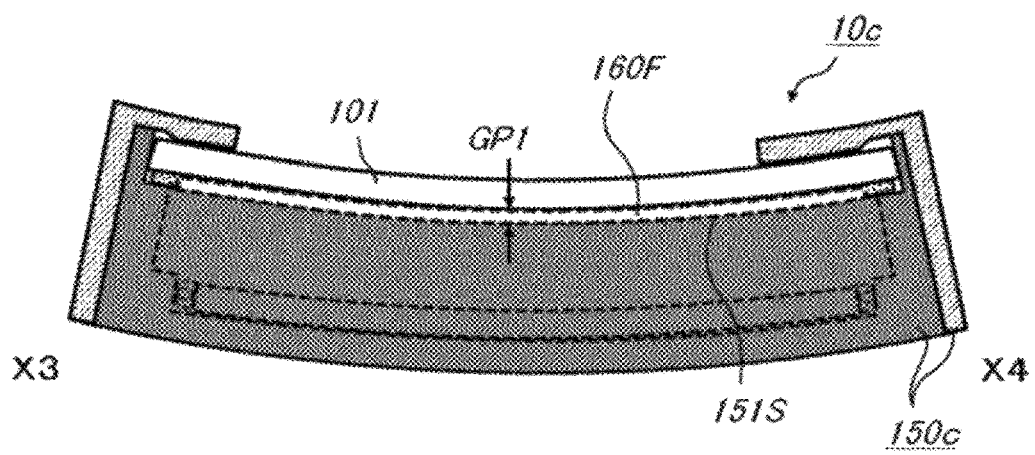
Figure 20C:
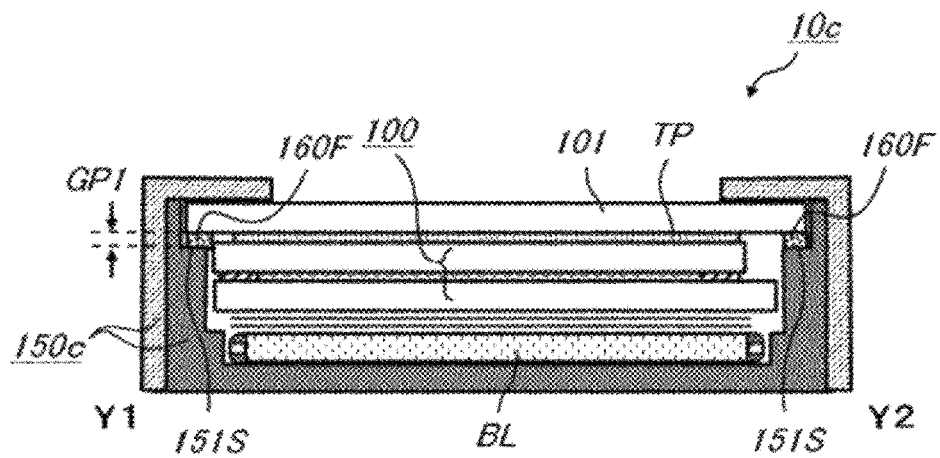

First, a description will be given particularly regarding changed portions from the third preferred embodiment in a holding mode as a characteristic part of the configuration of the curved display 10*c* of the fourth preferred embodiment with reference to FIGS. 19 to 20C. As illustrated in the overall view of FIG. 19 and the respective cross-sectional views of FIGS. 20A to 20C, a housing 150*c* that holds the liquid crystal panel 100 adopts a holding mode of providing a buffer member 160F between the curved transparent protection cover 101 and the holding surface 151S on two curved sides among four sides of an outer peripheral portion of the liquid crystal panel 100 in the fourth preferred embodiment, which is common with the third preferred embodiment, but the holding mode on two non-curved sides of the liquid crystal panel 100 is different. Specifically, the buffer member 160F is provided in a frame shape corresponding to all the four sides of the outer peripheral portion of the liquid crystal panel 100, in the housing 150*c* of the fourth preferred embodiment. That is, the mode is adopted in which the buffer member 160F is provided even on the two non-curved sides of the liquid crystal panel 100, and the holding surface 151M holding the protruding portion of the curved transparent protection cover 101 holds the protruding portion of the curved transparent protection cover 101 with the buffer member 160F interposed therebetween.

Although a difference in surface height is provided between the holding surface 151M and the holding surface 151S in order to provide the gap portion between the holding surface 151S and the curved transparent protection cover 101 in the case of the first preferred embodiment and the third preferred embodiment, surfaces of the holding surface 151M and the holding surface 151S are configured as continuous frame-shaped surfaces in order to place the buffer member 160F provided in the frame shape in the fourth preferred embodiment.

Figure 21A:
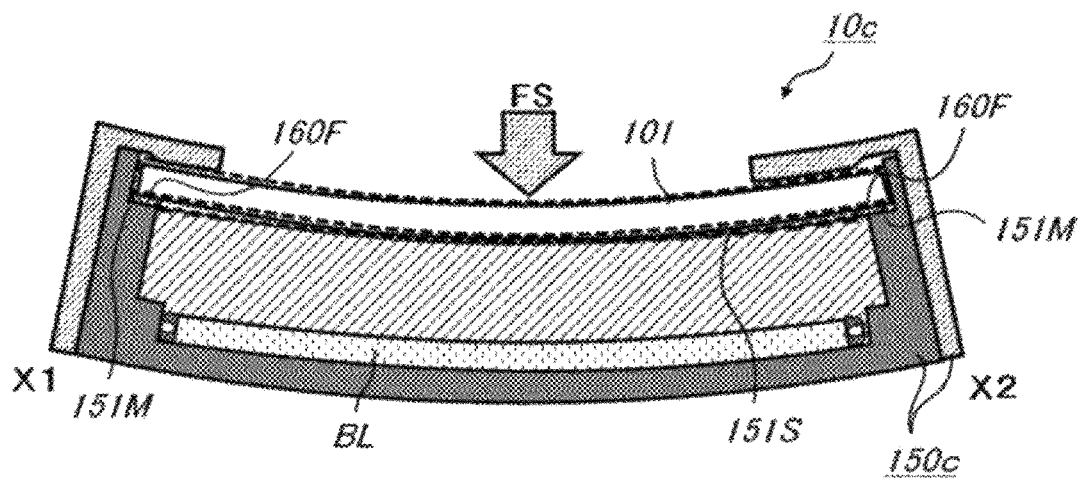
FIGS. 21A to 21C are cross-sectional views illustrating the operation of the liquid crystal display apparatus according to the fourth preferred embodiment of the present invention.
Figure 21B:
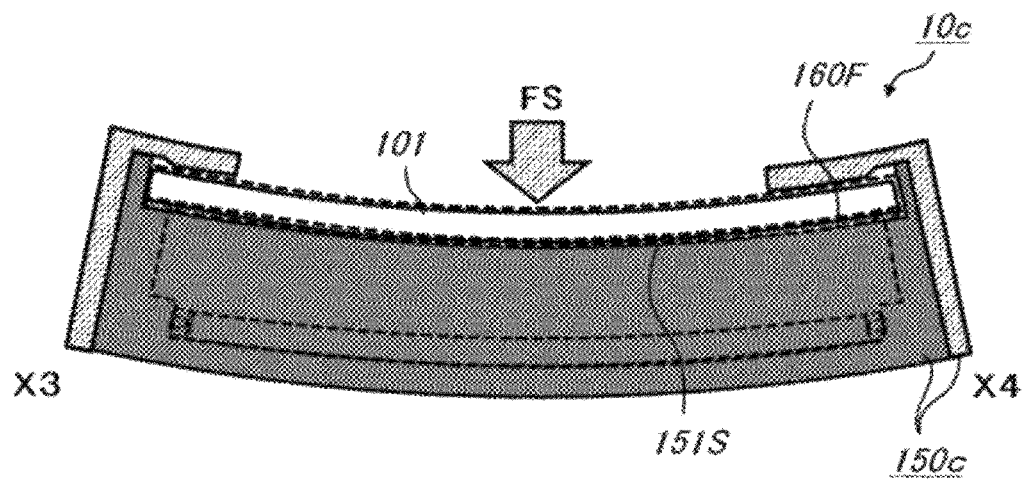
Figure 21C:
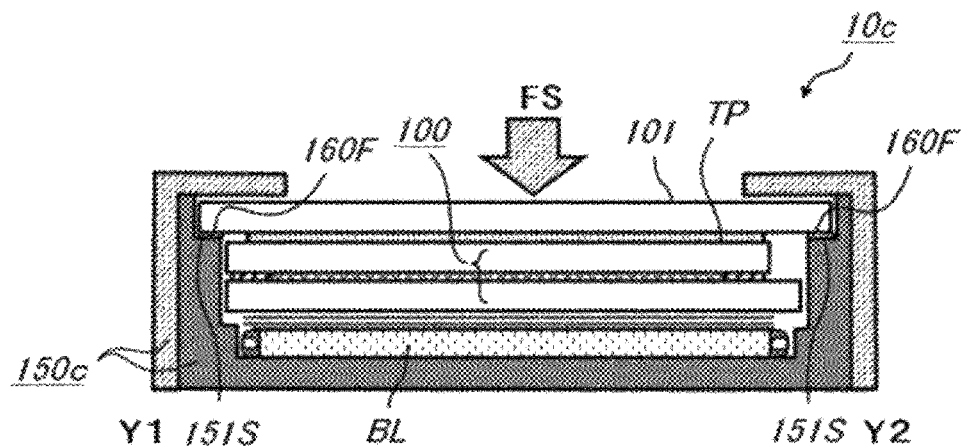

Next, a description will be given regarding an operation obtained in the curved display 10*c* according to the fourth preferred embodiment with reference to FIGS. 21A to 21C illustrating a state where the surface pressing stress FS is applied to the display surface side of the liquid crystal panel 100 described above, in addition to FIGS. 20A to 20C illustrating a state where the surface pressing stress FS is not applied. As illustrated in FIGS. 21A to 21C, when the surface pressing stress FS is applied to the display surface side, the liquid crystal panel 100 is held in a state where a gap portion is provided with respect to the housing 150*c* as a mode of holding the liquid crystal panel 100 using the housing 150*c* in the curved display 10*c* of the fourth preferred embodiment. In particular, the buffer member 160F is provided in the gap portion in the fourth preferred embodiment, but there is no change in terms of holding the liquid crystal panel 100 such that a curvature of a curved shape is variable. Therefore, a curvature variation of the curved shape of the liquid crystal panel 100 is not particularly hindered, and the curved transparent protection cover 101 is deformed to some extent such that a curvature of curving increases (curvature radius decreases) as illustrated in the respective cross-sectional views of FIGS. 21A to 21C, which is the same as the third preferred embodiment.

In order to sufficiently exert the effect obtained as the curvature variation of the curved shape of the liquid crystal panel 100 is not hindered as described above, it is desirable to form an upper surface of the buffer member 160F to abut on the curved transparent protection cover 101 as a slippery surface with low friction against the surface of the curved transparent protection cover 101, or it is desirable that the buffer member 160F itself be made of a relatively soft material that can be deformed even in the transverse direction, in order not to disturb a curving operation of the liquid crystal panel 100.

Further, the housing 150*c* of the fourth preferred embodiment is provided with the holding surface 151M via the buffer member 160F on the two non-curved sides of the liquid crystal panel 100, which is different from holding using the holding surface 151M that is a fixed portion (that is, a rigid body that does not cause deformation in a range of the stress that is assumed to be applied) as in the first to third preferred embodiments. Thus, the curved transparent protection cover 101 is also displaced toward the back side (the lower side in the drawing) in the housing 150*c* even on the two non-curved sides when the surface pressing stress FS is applied as illustrated in FIGS. 21A to 21C. As a result, the curved transparent protection cover 101 and the liquid crystal panel 100 are totally displaced toward the back side (the lower side in the drawing) in the housing 150*c* while accompanying the overall compression of the buffer member 160F provided in the frame shape, and the degree of deformation in which curvatures of the curved transparent protection cover 101 and the liquid crystal panel 100 thus curved increase (curvature radiuses decrease) is smaller than that in the case of the first to third preferred embodiments.

As described above, in the fourth preferred embodiment, a portion to abut on the curved transparent protection cover 101 to be held as the surface pressing stress FS is applied to the display surface side is deformed such that a shape of the buffer member 160F arranged on the holding surface 151S is provided exactly along the curved surface of the curved transparent protection cover 101 as illustrated in FIG. 21B when the surface pressing stress FS is applied, and as a result, the curved transparent protection cover 101 abuts on the surface of the buffer member 160F over substantially the entire formation region of the holding surface 151S, which is similar to the holding mode of the third preferred embodiment. In other words, the curved transparent protection cover 101 is held in the entire formation region of the holding surface 151S with the buffer member 160F interposed therebetween.

As a result, the surface pressing stress FS is applied to the display surface side, it is possible to prevent stress concentration when the curved transparent protection cover 101 is held by the holding surface 151S of the housing 150c, and it is possible to prevent the curved transparent protection cover 101 or the liquid crystal panel 100 from being damaged when being held by the holding surface 151S of the housing 150c. In this respect, the same operations and effects as the holding mode of the housing 150b of the third preferred embodiment described above can be obtained.

In the fourth preferred embodiment, the holding is performed via the buffer member 160F even with respect to the other pair of holding surfaces 151M, and thus, it is also possible to prevent the curved transparent protection cover 101 or the liquid crystal panel 100 from being damaged by a holding force when held by the holding surface 151M. That is, in the fourth preferred embodiment, it is possible to mitigate the action of the holding force when holding the outer peripheral portion of the liquid crystal panel 100 by the housing 150c with respect to curved transparent protection cover 101, the touch panel TP and the liquid crystal panel 100 by the buffer action caused by compression of the buffer member 160F in all the four sides of the liquid crystal panel 100.

Although there is a difference in degree from the third preferred embodiment, a repulsive force of the curved transparent protection cover 101 which tries to recover its original curved shape (curvature) is generated so that the effect of preventing the damage of the touch panel TP or the liquid crystal panel 100 can be obtained, which is common even in the fourth preferred embodiment, Further, repulsive action caused by compression of the buffer member 160F as well as the repulsive action by the curved transparent protection cover 101 is applied, and thus, action of mitigating the deformation of the liquid crystal panel 100 and the curved transparent protection cover 101 with a large curvature becomes great, so that it is more advantageous to prevent the damage of the touch panel TP or the liquid crystal panel 100, which is also the common with the third preferred embodiment.

In the fourth preferred embodiment, the buffer member 160F is also provided with respect to the holding surface 151M provided on the two non-curved sides, and thus, the degree of deformation in which the curvatures of the liquid crystal panel 100 and the curved transparent protection cover 101 thus curved increase (curvature radiuses decrease) is relatively small since the buffer member 160F is compressed as a whole when the surface pressing stress FS is applied as described above. Therefore, it is more advantageous to prevent the touch panel TP or the liquid crystal panel 100 from being damaged due to great curving of the liquid crystal panel 100 and the curved transparent protection cover 101.

Fifth Preferred Embodiment

Figure 22:
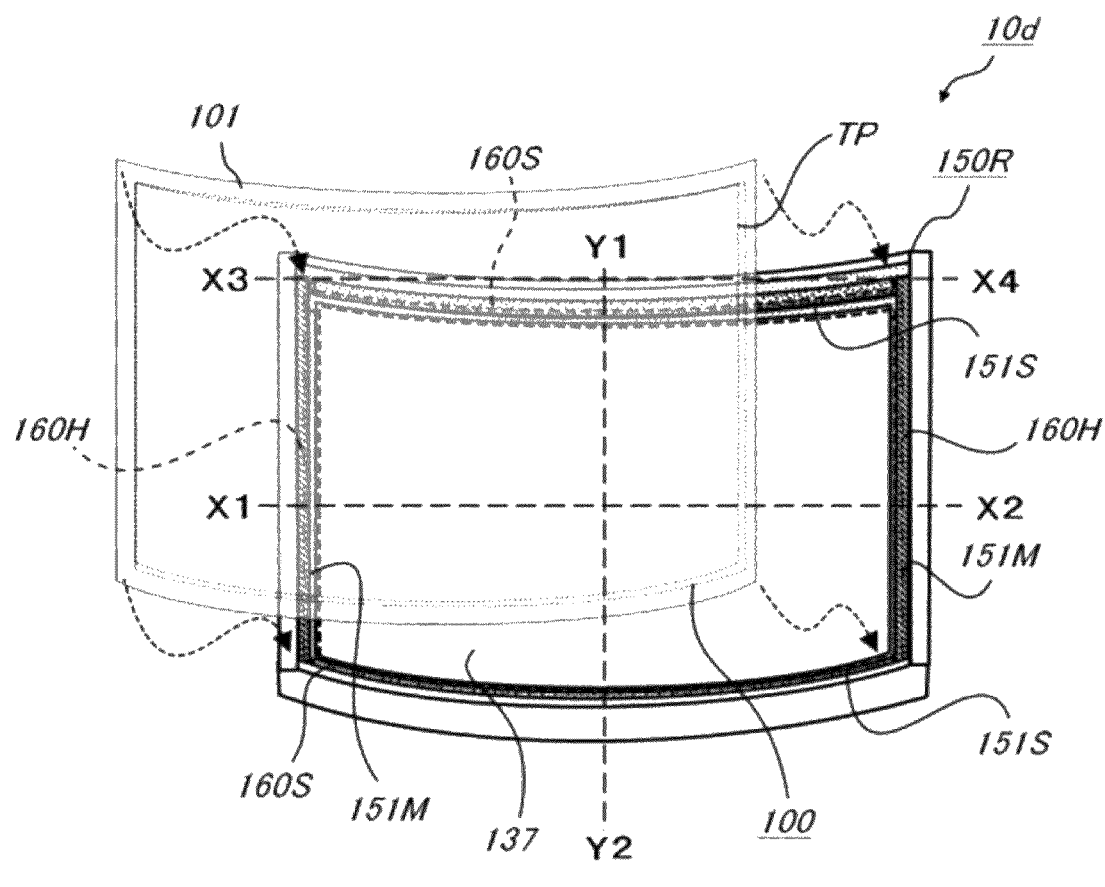
FIG. 22 is an overall view of a liquid crystal panel and a housing of a liquid crystal display apparatus according to a fifth preferred embodiment of the present invention.

Next, a description will be given regarding a configuration and an operation of a curved display 10d as a liquid crystal display apparatus according to a fifth preferred embodiment, which is a modification particularly relating to a holding mode using a housing of the curved display 10c of the fourth preferred embodiment, with reference to FIGS. 22 to 24C. Here, FIG. 22 illustrates an overall view of a liquid crystal panel 100 included in the curved display 10d of the fifth preferred embodiment and a housing holding the liquid crystal panel 100, and corresponds to FIG. 19 according to the fourth preferred embodiment. In addition, FIGS. 23A to 24C are cross-sectional views illustrating a state corresponding to presence or absence of application of the surface pressing stress FS to a display surface side of the liquid crystal panel 100 in the curved display 10d, and correspond to FIGS. 20A to 21C used in the description on the operation of the fourth preferred embodiment. Similarly to the respective cross-sectional views in FIGS. 20A to 21C, FIGS. 23A and 24A correspond to the cross-sectional views in a direction along a curve direction (a vicinity of a central portion: a position along cross-sectional line X1-X2 in FIG. 22), FIGS. 23B and 24B correspond to the cross-sectional views in the direction along the curve direction (a vicinity of an end portion: a position along cross-sectional line X3-X4 in FIG. 22), and FIGS. 23C and 24C correspond to the cross-sectional views in a direction perpendicular to the curve direction (a vicinity of the central portion: a position along cross-sectional line Y1-Y2 in FIG. 22). Hereinafter, changed portions from the fourth preferred embodiment will be mainly described.

Figure 23A:
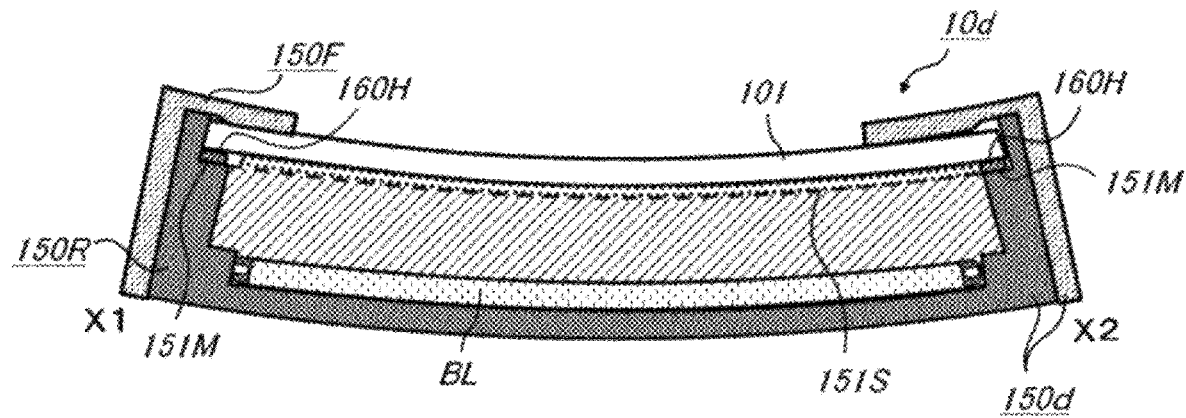
FIGS. 23A to 23C are cross-sectional views for describing a configuration and an operation of the liquid crystal display apparatus according to the fifth preferred embodiment of the present invention.
Figure 23B:
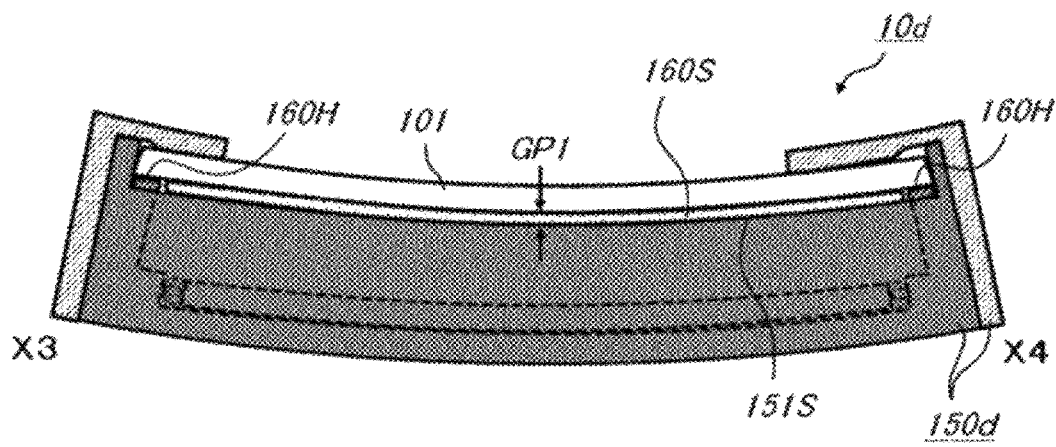
Figure 23C:
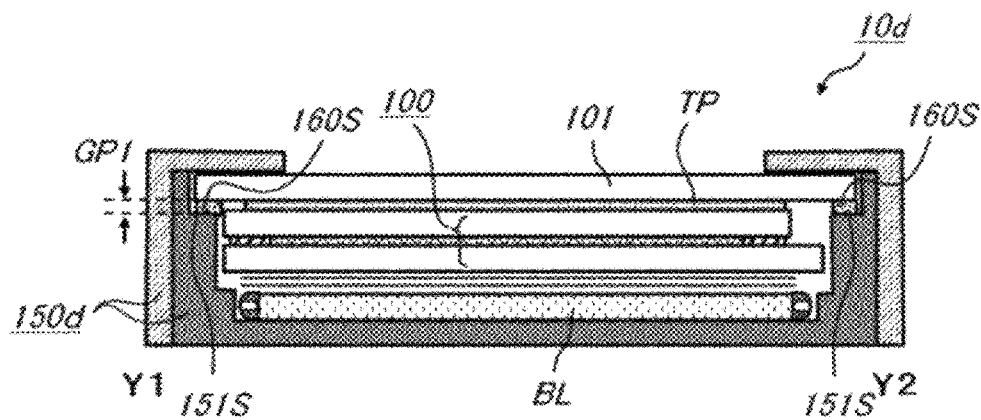

First, a description will be given particularly regarding changed portions from the fourth preferred embodiment in a holding mode as a characteristic part of the configuration of the curved display 10d of the fifth preferred embodiment with reference to FIGS. 22 to 23C. As illustrated in the overall view of FIG. 22 and the respective cross-sectional views of FIGS. 23A to 23C, a housing 150d that holds the liquid crystal panel 100 adopts a holding mode of providing buffer members with respect to the holding surface 151M and the holding surface 151S, respectively, to correspond to all four sides of an outer peripheral portion of the liquid crystal panel 100 in the fifth preferred embodiment, which is common with the fourth preferred embodiment. Although the buffer member 160F provided in the frame shape is used in the fourth preferred embodiment, a relatively hard buffer member 160H is arranged on the holding surfaces 151M on two non-curved sides among the four sides of the outer peripheral portion of the liquid crystal panel 100, and a relatively soft buffer member 160S is arranged on the holding surface 151S on the other two curved sides in the fifth preferred embodiment. Further, a mode of holding a protruding portion of the curved transparent protection cover 101 in which the holding surface 151M performs holding via the relatively hard buffer member 160H and the holding surface 151S performs holding via the relatively soft buffer member 160S is adopted.

Here, as a measure of hardness (hard) or softness (soft) expressing features of members forming the buffer member 160H and the buffer member 160S, the deformation amount at the time of application of pressure to the members is used as a criterion, and the member having a small deformation amount is relatively hard, and the member having a large deformation amount is relatively soft. Therefore, regarding the buffer member 160H and the buffer member 160S, the buffer member 160S is configured using the member having the larger deformation amount at the time of application of pressure as compared with at least the buffer member 160H.

Further, similarly to the buffer member 160L of the third preferred embodiment, a cushion material may be used as modes of the buffer member 160H and the buffer member 160S, a rubber, a spring material, or the like other than the cushion material may be used. As the spring material, a spring material integrated with a member of the rear frame 150R forming the holding surface 151S may be used, or the spring member may be provided separately from the member of the rear frame 150R. As a member having the buffering action, a general elastic material with which a larger repulsive force acts as the deformation amount increases may be used. When emphasizing the impact absorbing action, a soft urethane foam having a low rebound resilience such that a repulsive force does not immediately acts even if being deformed and gradually returns to its original shape, or the like may be used.

As long as the buffer member 160H and the buffer member 160S form a combination that satisfy the above-described relationship regarding hardness or softness, the common mode or different modes may be selected from the above-described modes as appropriate.

Figure 24A:
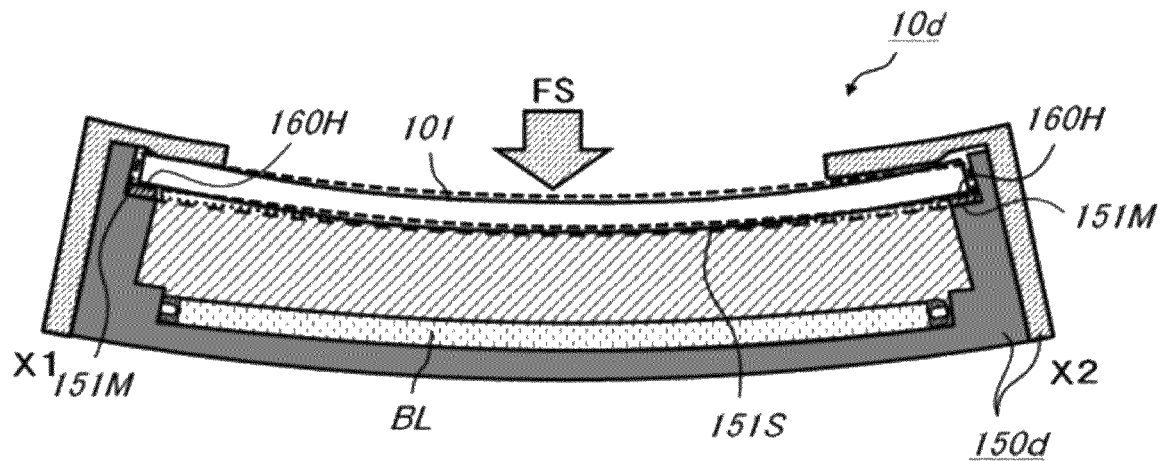
FIGS. 24A to 24C are cross-sectional views illustrating the operation of the liquid crystal display apparatus according to the fifth preferred embodiment of the present invention.
Figure 24B:
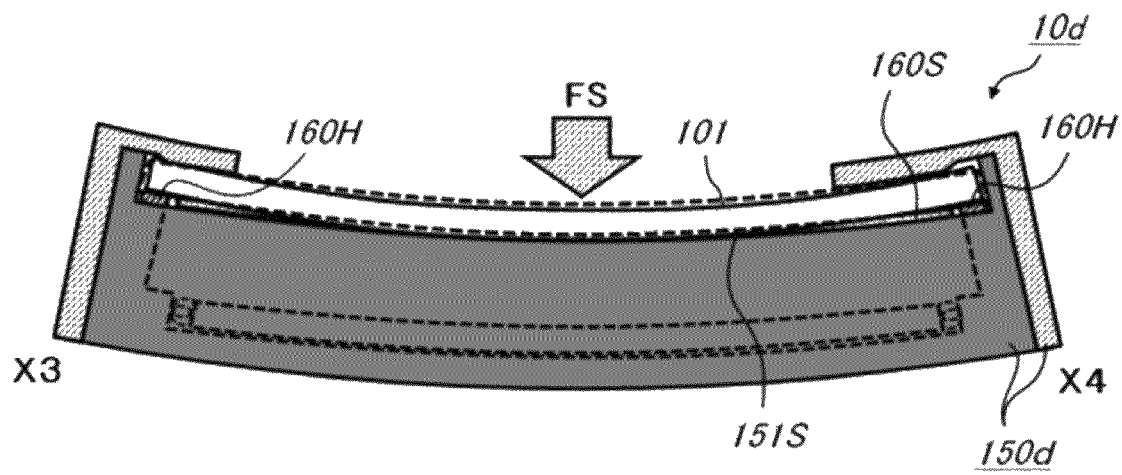
Figure 24C:
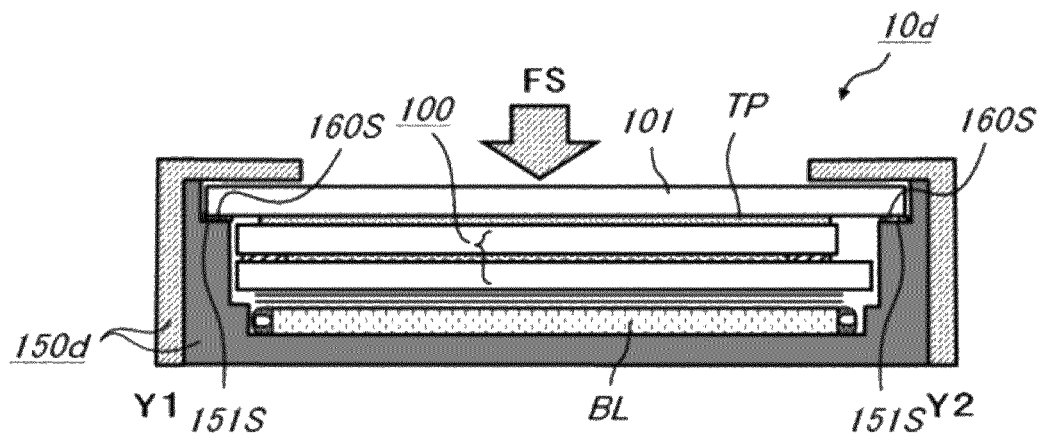

Next, a description will be given regarding an operation obtained in the curved display 10d according to the fifth preferred embodiment with reference to FIGS. 24A to 24C illustrating a state where the surface pressing stress FS is applied to the display surface side of the liquid crystal panel 100 described above, in addition to FIGS. 23A to 23C illustrating a state where the surface pressing stress FS is not applied. As illustrated in FIGS. 24A to 24C, when the surface pressing stress FS is applied to the display surface side, the liquid crystal panel 100 is held in a state where a gap portion is provided with respect to the housing 150d as a mode of holding the liquid crystal panel 100 using the housing 150d in the curved display 10d of the fifth preferred embodiment. In particular, the buffer member 160S is provided in the gap portion in the fifth preferred embodiment, but the buffer member 160S is configured using a relatively soft member so that there is no change in terms of holding the liquid crystal panel 100 such that a curvature of a curved shape is variable. Therefore, a curvature variation of the curved shape of the liquid crystal panel 100 is not particularly hindered, and the curved transparent protection cover 101 is deformed such that a curvature of curving increases (curvature radius decreases) as illustrated in the respective cross-sectional views of FIGS. 24A to 24C, which is the same as the fourth preferred embodiment.

In order to sufficiently exert the effect obtained as the curvature variation of the curved shape of the liquid crystal panel 100 is not hindered as described above, it is desirable to form an upper surface of the buffer member 160H to abut on the curved transparent protection cover 101 as a slippery surface with low friction (that is, causing no large frictional force or constraining force) against the surface of the curved transparent protection cover 101, particularly for the relatively hard buffer member 160H provided on the holding surface 151M on the two non-curved sides of the liquid crystal panel 100 in order not to disturb a curving operation of the liquid crystal panel 100.

Further, the housing 150d of the fifth preferred embodiment is provided with the holding surface 151M via the buffer member 160H on the two non-curved sides of the liquid crystal panel 100, which is different from the holding using the holding surface 151M that is a fixed portion (that is, a rigid body) as in the first to third preferred embodiments. Thus, the curved transparent protection cover 101 is somewhat displaced toward the back side (the lower side in the drawing) in the housing 150d even on the two non-curved sides when the surface pressing stress FS is applied as illustrated in FIGS. 24A to 24C. Therefore, a degree of deformation in which curvatures of the liquid crystal panel 100 and the curved transparent protection cover 101 thus curved increase (curvature radiuses decrease) is smaller than those in the first to third preferred embodiments, which has been described even in the fourth preferred embodiment. In the case of the housing 150d of the fifth preferred embodiment, however, the buffer member 160H provided on the holding surfaces 151M on the two non-curved sides is made of the relatively hard material, that is, the material having the smaller deformation amount at the time of application of pressure. Thus, the degree of deformation in which curvatures of the liquid crystal panel 100 and the curved transparent protection cover 101 thus curved increase (curvature radiuses decrease) is somewhat smaller than those in the first to third preferred embodiments, but is larger than that in the fourth preferred embodiment.

As described above, the housing 150d of the fifth preferred embodiment adopts the holding mode of providing the buffer members with respect to the holding surface 151M and the holding surface 151S, respectively, to correspond to all the four sides of an outer peripheral portion of the liquid crystal panel 100 similarly to the holding mode of the fourth preferred embodiment, and thus, it is possible to obtain the same effects as the fourth preferred embodiment regarding the basic effects. On the other hand, with respect to the buffer member 160H and the buffer member 160S provided on the holding surface 151M on the two non-curved sides among the four sides of the outer peripheral portion of the liquid crystal panel 100 and on the holding surface 151S on the two curved sides, the buffer member 160S is configured using the member having a relatively large deformation amount at the time of application of pressure as compared with the buffer member 160H. Thus, when the surface pressing stress FS is applied, the curved transparent protection cover 101 and the liquid crystal panel 100 are deformed such that the curvature of curving increases (curvature radius decreases). As a result, the repulsive force of the curved transparent protection cover 101 which tries to recover the original curved shape (curvature) increases as compared with the fourth preferred embodiment, and action of mitigating the deformation of the liquid crystal panel 100 and the curved transparent protection cover 101 with a large curvature becomes great due to the action of the repulsive force of the curved transparent protection cover 101 described in the first preferred embodiment so that it is advantageous to prevent the damage of the touch panel TP or the liquid crystal panel 100.

Further, the buffer member 160H is configured using the member that is relatively hard, that is, has a relatively small deformation amount at the time of application of pressure as compared with the buffer member 160S, and the holding is performed via the buffer member 160H which is relatively hard, that is, has a small deformation amount at the time of application of pressure on the two non-curved sides of the liquid crystal panel 100, which is basically close to a situation where direct holding is performed by the holding surface 151M formed of a rigid body as in the holding modes of the first to third preferred embodiments. When the surface pressing stress FS is applied, distortion caused by complicated deformation behavior, such as curving of the liquid crystal panel 100 even in the direction perpendicular to the curve direction (direction parallel to the Y direction in the drawing), hardly occurs. Therefore, the liquid crystal panel 100 is deformed while maintaining the curved shape curved substantially in one direction when the surface pressing stress FS is applied according to the mode of being held by the buffer member 160H, and the buffer member 160H functions to prevent the occurrence of distortion with respect to the curved shape curved in the one direction. As a result, it is possible to prevent occurrence of display unevenness which is concerned to occur due to the distortion.

Sixth Preferred Embodiment

Although the mode of indirectly holding the liquid crystal panel 100 by holding a part of the curved transparent protection cover 101 integrated with the liquid crystal panel 100 has been described as the mode of holding the liquid crystal panel 100 using each of the housings in the first to fifth preferred embodiments described above, the present invention can be also applied to a configuration in which the curved transparent protection cover 101 is omitted, for example. Hereinafter, a description will be given regarding a configuration and an effect of a curved display 10e as a liquid crystal display apparatus according to a sixth preferred embodiment, which is a modification relating to a holding mode in the configuration in which the curved transparent protection cover 101 is omitted from the configuration of the first preferred embodiment, with reference to FIGS. 25 to 26B.

Figure 25:
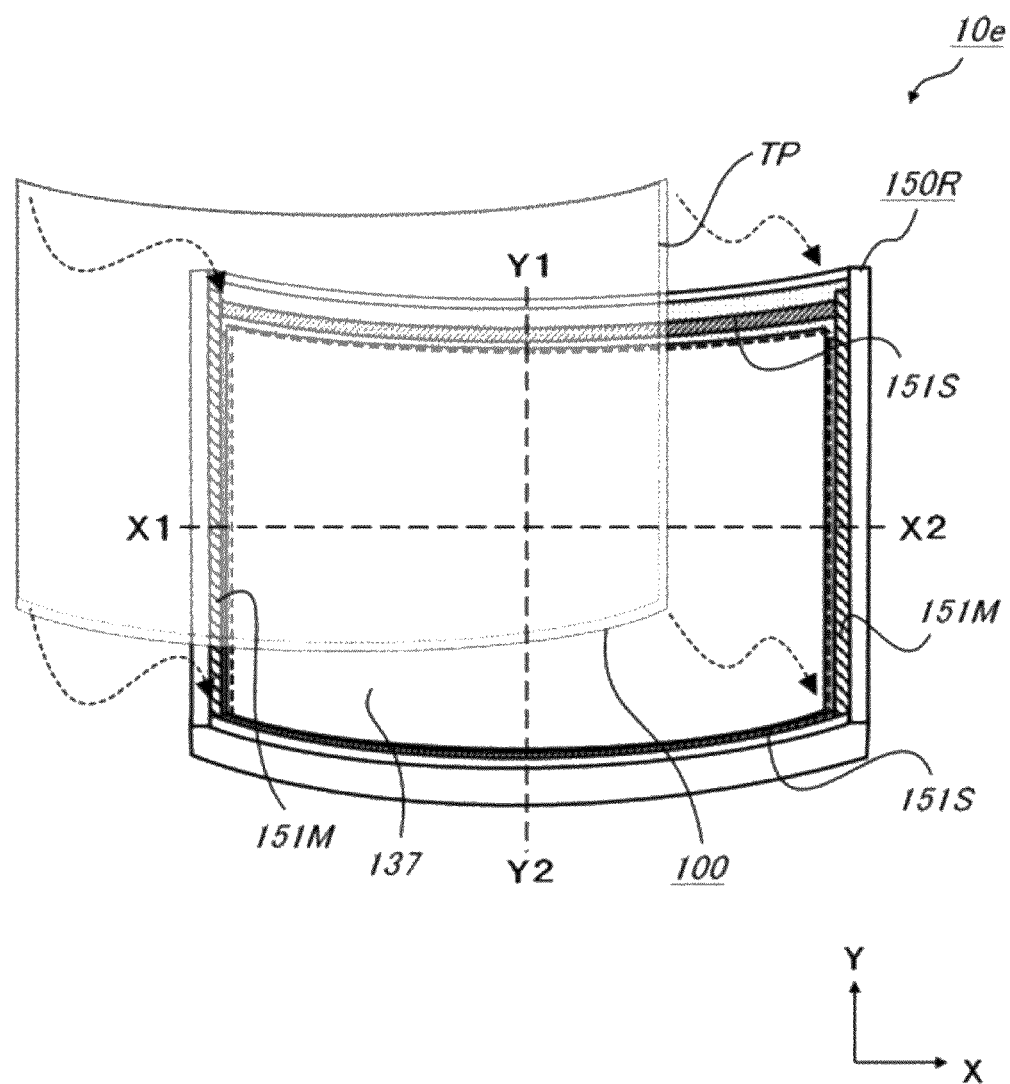
FIG. 25 is an overall view of a liquid crystal panel and a housing of a liquid crystal display apparatus according to a sixth preferred embodiment of the present invention.

Here, FIG. 25 illustrates an overall view of a liquid crystal panel 100 included in the curved display 10e of the sixth preferred embodiment and a housing holding the liquid crystal panel 100, and corresponds to FIG. 2 according to the first preferred embodiment. In addition, FIG. 26A corresponds to a cross-sectional view in a direction along a curve direction (a vicinity of a central portion: a position along cross-sectional line X1-X2 in FIG. 25), and FIG. 26B corresponds to a cross-sectional view in a direction perpendicular to the curve direction (a vicinity of the central portion: a position along cross-sectional line Y1-Y2 in FIG. 25). Hereinafter, changed portions from the first preferred embodiment will be mainly described.

Figure 26A:
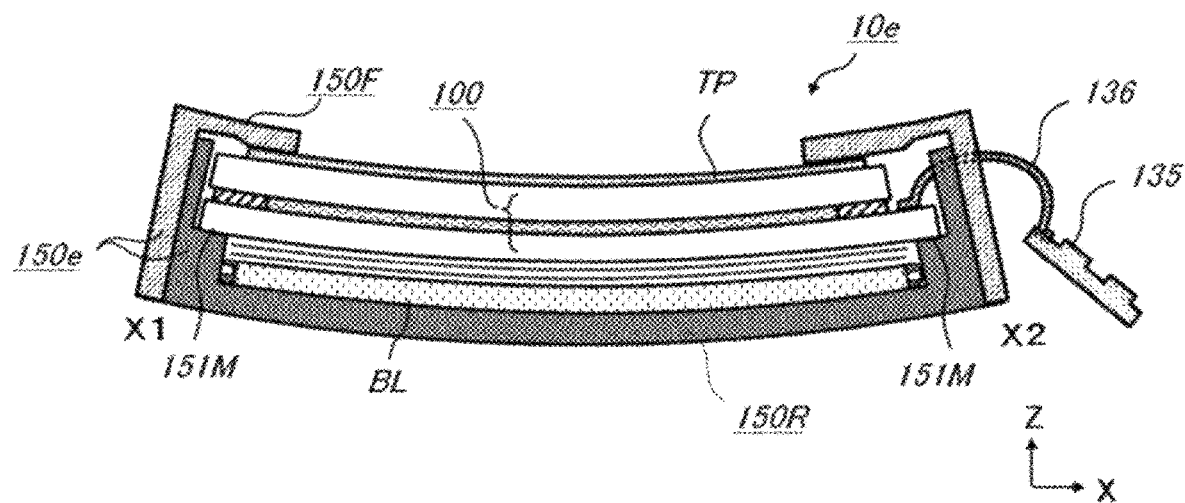
FIGS. 26A and 26B are cross-sectional views of the liquid crystal panel in the liquid crystal display apparatus according to the sixth preferred embodiment of the present invention.
Figure 26B:
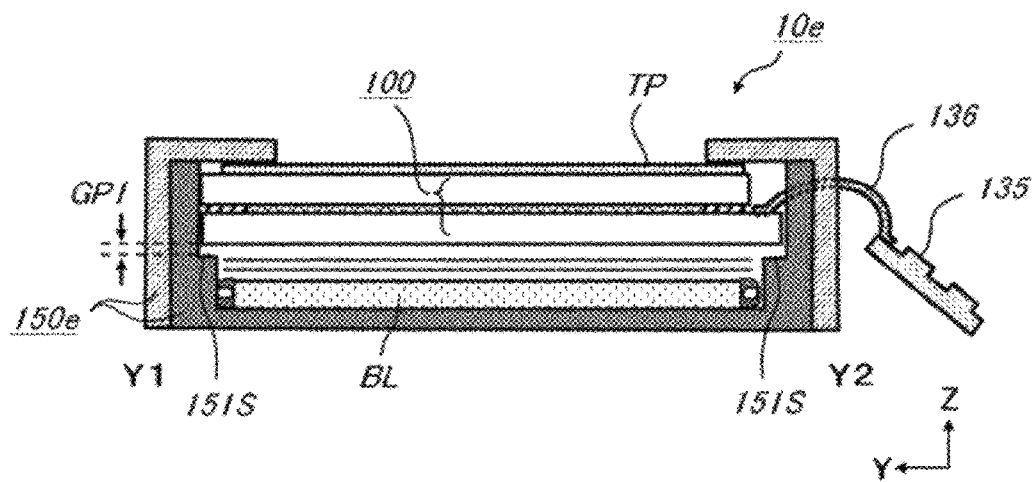

As illustrated in FIGS. 25 to 26B, the curved transparent protection cover 101 is omitted in the curved display 10e of the sixth preferred embodiment, and the touch panel TP is configured to be pasted to and integrated with a front side of the liquid crystal panel 100 via an adhesive layer (not illustrated) made of a transparent pressure-sensitive adhesive sheet or an adhesive. Since the curved transparent protection cover 101 that determines a curved shape with a predetermined curvature is omitted, it may be configured to provide a holding surface having a curved surface with a predetermined curvature, for example, with respect to a substrate forming the touch panel TP. Alternatively, with respect to a polarizing plate 131 and a polarizing plate 132 serving as major components for the liquid crystal panel 100, or the glass substrate 111 and the glass substrate 111, stress balance between the members may be adjusted such that the liquid crystal panel 100 singly maintains a curved shape having a predetermined curvature using a method of pasting the members to each other in the state of being curved in curved shapes with predetermined curvatures, a method of pasting the members to each other in the state of utilizing thermal expansion and providing a temperature difference between the members, or a method of pasting materials to each other having a difference in thermal expansion coefficient between the members at a temperature other than room temperature. Alternatively, when the touch panel TP and the liquid crystal panel 100 are pasted via the transparent pressure-sensitive adhesive sheet, a stacked body in which the touch panel TP and the liquid crystal panel 100 are integrated may be configured to maintain a curved shape with a predetermined curvature by pasting the touch panel TP and the liquid crystal panel 100 in the state of being curved in curved shapes with a predetermined curvature. When using any one of the above configurations, the stacked body in which the liquid crystal panel 100 and the touch panel TP are integrated is configured to maintain the curved shape having a predetermined curvature.

Regarding the configuration of the liquid crystal panel 100 itself, only the fact that there is the case of adjusting the stress balance is a changed feature from the configuration of the liquid crystal panel 100 of the first preferred embodiment as described above, and there is no change in terms of features such as a fact that the density of columnar spacers holding the gap between the substrates is high in the region R1 which is a region of a central portion in the curve direction than in the region R4 which is a region of a peripheral portion in a state where the surface pressing stress FS except for the atmospheric pressure is not applied to the surface of the liquid crystal panel 100 which is another characteristic part.

Regarding a feature of the mode of holding the liquid crystal panel 100, a housing 150e holding the liquid crystal panel 100 is provided with the pair of holding surfaces 151M holding the liquid crystal panel 100 on two non-curved sides among four sides of an outer peripheral portion of the liquid crystal panel 100, which is common with the first preferred embodiment. Although the holding surface 151M is arranged to hold the protruding portion of the curved transparent protection cover 101 in the first preferred embodiment, the holding surface 151M is arranged to directly hold a lower surface of the outer peripheral portion of the liquid crystal panel 100 since the configuration of the curved transparent protection cover 101 is omitted in the sixth preferred embodiment. That is, as illustrated in the cross-sectional view of FIG. 26A, the holding surface 151M is provided to oppose the lower surface of the liquid crystal panel 100 near the two non-curved sides and abuts on the lower surface near the two sides of the liquid crystal panel 100, thereby holding the liquid crystal panel 100.

On the other hand, the housing 150e is provided with the pair of holding surfaces 151S, provided to oppose lower surfaces near two curved sides of the liquid crystal panel 100 with the clearance GP1 interposed therebetween, on the two sides among the four sides of the outer peripheral portion of the liquid crystal panel 100 as illustrated in FIGS. 26A and 26B. That is, an object for which the clearance GP1 is provided with respect to the holding surface 151S is the lower surface of the curved transparent protection cover 101 in the first preferred embodiment, but this object is changed to the lower surface of the liquid crystal panel 100 in the sixth preferred embodiment. However, the holding surface 151S serves to abut on the lower surface of the liquid crystal panel 100 for holding only when the surface pressing stress FS is applied to the display surface side of the liquid crystal panel 100, and the liquid crystal panel 100 is deformed such that the degree of curving increases, which is substantially the same as the holding surface 151S of the first preferred embodiment.

Although the configuration in which the clearance GP2 is provided with respect to the lower surface near the two sides of the liquid crystal panel 100 has been adopted even in the case of the housing 150 of the first preferred embodiment, the first preferred embodiment is configured such that the housing 150 basically abuts on the curved transparent protection cover 101 to hold the liquid crystal panel 100 when the surface pressing stress FS is applied to the display surface side, and the housing 150 is not brought into contact with the lower surface near the two sides of the liquid crystal panel 100. Therefore, a part of the housing 150 that is arranged to oppose the lower surface near the two sides of the liquid crystal panel 100 with the clearance GP2 interposed therebetween does not abut on the liquid crystal panel 100 and does not hold the liquid crystal panel 100 in the first preferred embodiment. In the sixth preferred embodiment, however, the holding surface 151S provided to oppose the lower surface of the liquid crystal panel 100 with the clearance GP1 interposed therebetween abuts on the liquid crystal panel 100 to serve the role of holding when the surface pressing stress FS is applied to the display surface side.

As the basic effects of the present invention have been described in the first preferred embodiment, even the curved display 10e of the sixth preferred embodiment described above adopts the configuration in which the liquid crystal panel 100 including the pair of glass substrates (the glass substrate 111 and the glass substrate 121) is incorporated in the curved shape curved in the one curve direction, the density of the columnar spacers holding the gap between these substrates is higher in the region of the central portion in the curve direction than in the region of the peripheral portion, in a state where the surface pressing stress FS except for the atmospheric pressure is not applied to the surface of the liquid crystal panel 100, and the housing 150e, which holds the outer peripheral portion of the liquid crystal panel 100 such that the curved shape is variable when the surface pressing stress FS is applied, in a state where the clearance GP1 is provided in the central portion of the liquid crystal panel 100, is provided for the holding mode of holding the liquid crystal panel 100. Thus, it is possible to prevent the damage of the liquid crystal panel 100 even if the relatively weak liquid crystal panel 100, made of the pair of thinned glass substrates, is used to be formed in the curved shape, and to make the display unevenness hardly occur even when the surface pressing stress is applied as a person touches the liquid crystal panel 100.

Although the modification in which the object to hold the liquid crystal panel 100 is changed from the curved transparent protection cover 101 directly to the liquid crystal panel 100 in the case of omitting the curved transparent protection cover 101 from the housing 150 of the first preferred embodiment has been illustrated in the sixth preferred embodiment, it is possible to obtain the modification in which the object for holding is similarly changed from any preferred embodiment of the second to fifth preferred embodiments described above. Then, it is possible to obtain the operations and effects peculiar to the respective holding modes in addition to the basic effects of the sixth preferred embodiment described above.

Seventh Preferred Embodiment

In the first to sixth preferred embodiments described above, the description has been given by exemplifying a mode in which the liquid crystal panel 100 is curved in such a direction that the front side, that is, the display surface side of the liquid crystal panel 100 forms the concave surface, as a mode of the curved display. However, the present invention can be also applied to a mode in which the curved direction is an opposite direction, that is, the liquid crystal panel 100 is curved in such a direction that the display surface side forms a convex surface. Hereinafter, a description will be given regarding a configuration and an effect of a curved display 10f as a liquid crystal display apparatus according to a seventh preferred embodiment, which is a modification mainly relating to a holding mode, the configuration in which the curved direction is changed from the first preferred embodiment, with reference to FIGS. 27A to 28B.

Here, FIGS. 27A to 28B are cross-sectional views illustrating a state corresponding to presence or absence of application of the surface pressing stress FS to a display surface side of the liquid crystal panel 100 in the curved display 10f of the seventh preferred embodiment, and correspond to FIGS. 9A to 10C used in the description on the operation of the first preferred embodiment. Similarly to the respective cross-sectional views in FIGS. 9A to 10C, FIGS. 27A and 28A correspond to the cross-sectional views in a direction along a curve direction (a vicinity of an end portion: corresponding to FIGS. 9B and 10B in the first preferred embodiment), and FIGS. 27B and 28B correspond to the cross-sectional views in a direction perpendicular to the curve direction (a vicinity of a central portion: corresponding to FIGS. 9C and 10C in the first preferred embodiment). Hereinafter, changed portions from the first preferred embodiment will be mainly described.

First, a description will be given mainly regarding changed portions from the first preferred embodiment in a holding mode as a characteristic part of the configuration of the curved display 10f of the seventh preferred embodiment with reference to FIGS. 27A and 27B. As illustrated in the cross-sectional views of FIGS. 27A and 27B, the seventh preferred embodiment has an appearance curved in such a direction that the front side of the liquid crystal panel 100, that is, the counter substrate 120 side which is the display surface side forms a convex surface in the state where the curved display 10f is configured. As illustrated in the cross-sectional view of FIG. 27B, the curved display 10f is configured to include: the liquid crystal panel 100 as the main configuration; the curved transparent protection cover 101 made of a transparent protection plate that has a holding surface having a curved surface with a predetermined curvature; and a touch panel TP similarly to the first preferred embodiment although the curve direction is opposite to that of the first preferred embodiment. Further, the touch panel TP and the liquid crystal panel 100 are pasted and integrated to each other via an adhesive layer (not illustrated) made of a transparent pressure-sensitive adhesive sheet or an adhesive along the curved surface of the holding surface provided on the curved transparent protection cover 101, thereby forming a stacked body. In addition, the curved transparent protection cover 101 is molded so as to maintain a curved shape with a predetermined curvature in a direction in which the front side forms a convex surface singly, that is, in a state where no external force is particularly applied.

Regarding the configuration of the liquid crystal panel 100 itself, only the fact that the curved direction is the opposite direction is a changed feature from the configuration of the liquid crystal panel 100 of the first preferred embodiment, and there is no change in terms of features such as a fact that the density of columnar spacers holding the gap between the substrates is high in the region R1 which is a region of a central portion in the curve direction than in the region R4 which is a region of a peripheral portion in a state where the surface pressing stress FS except for the atmospheric pressure is not applied to the surface of the liquid crystal panel 100 which is another characteristic part.

In addition, the housing 150f holding the liquid crystal panel 100 is provided with the pair of holding surfaces 151M holding a protruding portion of the curved transparent protection cover 101 on two non-curved sides among four sides of an outer peripheral portion of the liquid crystal panel 100, and the housing 150f is provided with the pair of holding surfaces 151S, provided to oppose a lower surface near two curved sides of the curved transparent protection cover 101 with the clearance GP1 interposed therebetween, on the two sides among the four sides of the outer peripheral portion of the liquid crystal panel 100, which are common with the first preferred embodiment. In the seventh preferred embodiment, however, the holding surface 151S of the seventh preferred embodiment is provided in a curved shape in which a surface on the front side, that is, on a side arranged to oppose the curved transparent protection cover 101 forms a convex surface so as to correspond to the fact that the liquid crystal panel 100 and the curved transparent protection cover 101 are curved in the direction so as to have the convex surface on the front side.

When the surface pressing stress FS is applied to the display surface side of the liquid crystal panel 100 and the curved transparent protection cover 101, the curved transparent protection cover 101 is deformed such that a curvature of a curved shape decreases (curvature radius increases) accompanying the change in the curved direction of the curved transparent protection cover 101, and an outer shape end portion of the curved transparent protection cover 101 is deformed so as to spread outward although will be described in detail in the following description on operations. Therefore, it is necessary to adopt a mode in which the housing 150*f* holds the liquid crystal panel 100 and the curved transparent protection cover 101 so as not to hinder the movement of the outer shape end portion of the curved transparent protection cover 101 spreading outward in order for the holding in which a curvature of a curved shape of the liquid crystal panel 100 is variable when the surface pressing stress FS is applied to the display surface side. Therefore, the housing 150*f* of the seventh preferred embodiment adopts a holding mode in which flexibility is provided to some extent so that holding can be continued even if the curved shapes of the liquid crystal panel 100 and the curved transparent protection cover 101 change. As a specific holding mode, buffer members 160V to hold the outer shape end portion of the curved transparent protection cover 101 by being sandwiched from both sides are provided on the two non-curved sides of the liquid crystal panel 100 as illustrated in FIG. 27A. That is, a mode of holding side surfaces of the outer shape end portion of the curved transparent protection cover 101 by the housing 150*f* (particularly the rear frame 150R) via the buffer members 160V is adopted.

A specific material or mode of the buffer member 160V may be the same as that of the buffer member 160L used in the third preferred embodiment, and any material or mode exemplified when describing the buffer member 160L can be used. Among them, it is desirable to use one with a weak repulsive force generated when the buffer member 160L is compressed, and one that is relatively soft, that is, has a large deformation amount using the deformation amount at the time of application of pressure as a criterion is desirable as the buffer member 160V.

Figure 27A:
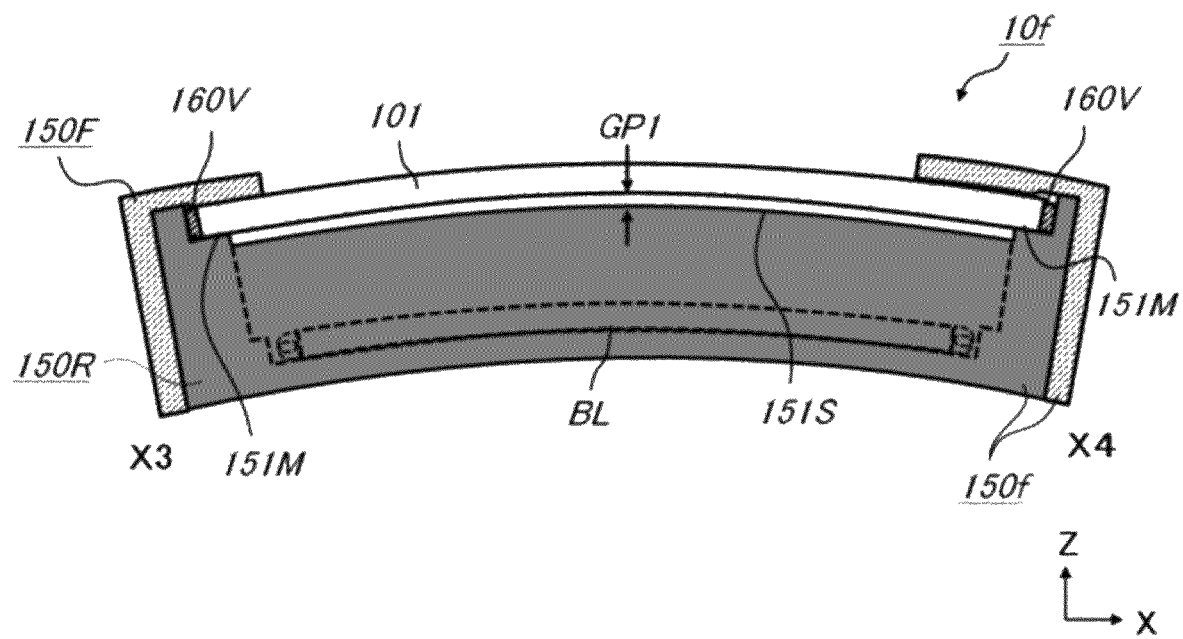
FIGS. 27A and 27B are cross-sectional views for describing a configuration and an operation of a liquid crystal display apparatus according to a seventh preferred embodiment of the present invention.
Figure 27B:
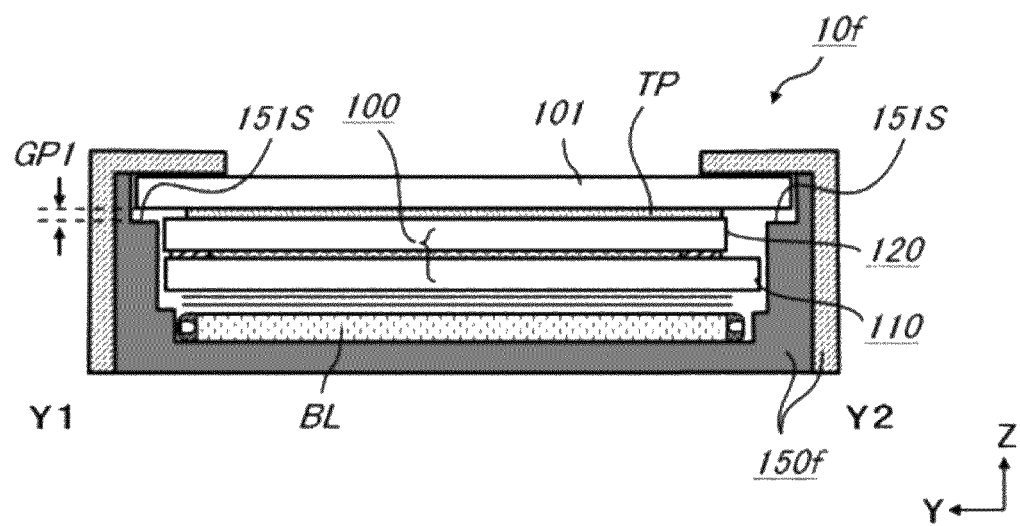
Figure 28A:
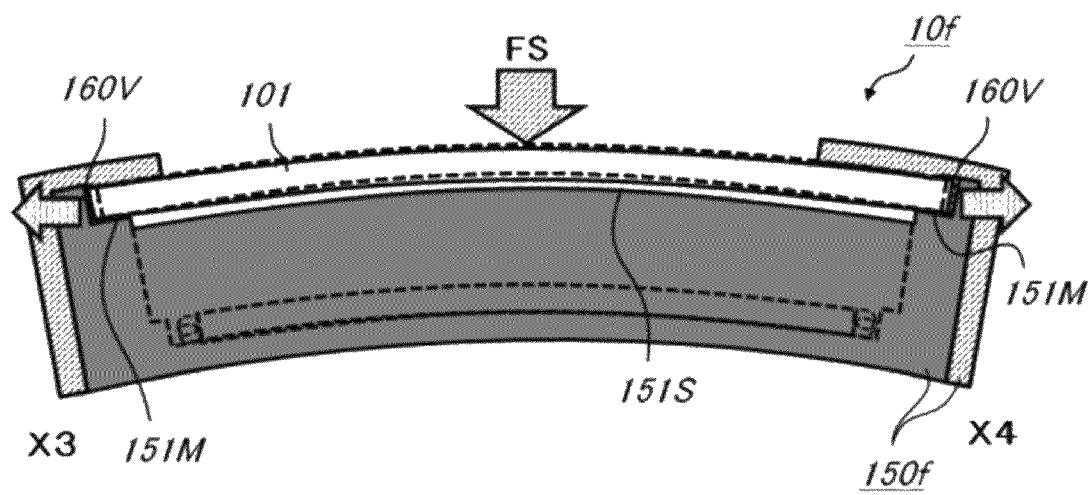
FIGS. 28A and 28B are cross-sectional views illustrating the operation of the liquid crystal display apparatus according to the seventh preferred embodiment of the present invention.
Figure 28B:
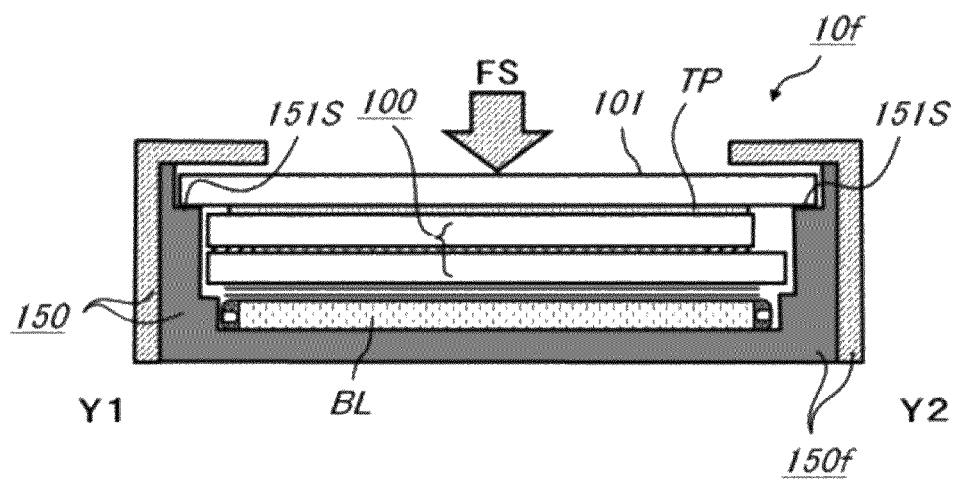

Next, a description will be given regarding an operation obtained in the curved display 10*f* according to the seventh preferred embodiment with reference to FIGS. 28A and 28B illustrating a state where the surface pressing stress FS is applied to the display surface side of the liquid crystal panel 100 described above, in addition to FIGS. 27A and 27B illustrating a state where the surface pressing stress FS is not applied. As illustrated in FIGS. 28A and 28B, in the curved display 10*f* of the seventh preferred embodiment, the liquid crystal panel 100 is held in a state where a gap portion is provided with respect to the housing 150*f* such that the curvature of the curved shape of the liquid crystal panel 100 is variable as a mode of holding the liquid crystal panel 100 using the housing 150*f* when the surface pressing stress FS is applied to the display surface side, and thus, the curvature variation of the curved shape of the liquid crystal panel 100 is not particularly hindered, and the curved transparent protection cover 101 is deformed such that a curvature of curving decreases (curvature radius increases) as illustrated in the respective cross-sectional views of FIGS. 28A and 28B. That is, the configuration in which the housing 150*f* holds the liquid crystal panel 100 without hindering the curvature variation of the curved shape of the liquid crystal panel 100 when the surface pressing stress FS is applied to the display surface side is the same as that of the first preferred embodiment although a deformed direction (a direction of a curvature variation) is opposite.

Further, the holding surface 151S provided in the housing 150*f* locally abuts mainly in the vicinity of the central portion in the curve direction when the surface pressing stress FS is applied to the display surface side of the liquid crystal panel 100 and the curved transparent protection cover 101 as illustrated in the respective cross-sectional views of FIGS. 28A and 28B. Accordingly, the holding surface 151S provided in the housing 150*f* abuts on the curved transparent protection cover 101 to serve the role of holding only when the surface pressing stress FS is applied to the display surface side of the liquid crystal panel 100 and the curved transparent protection cover 101 and the liquid crystal panel 100 and the curved transparent protection cover 101 are deformed such that the degree of curving decreases, which has substantially the same function as the holding surface 151S of the first preferred embodiment although the deformed direction (the direction of the curvature variation) is opposite.

Further, the outer shape end portion of the curved transparent protection cover 101 moves to spread outward when the surface pressing stress FS is applied to the display surface side of the liquid crystal panel 100 and the curved transparent protection cover 101 as illustrated in the respective cross-sectional views of FIGS. 28A and 28B. Meanwhile, the mode of holding the side surfaces of the outer shape end portion of the curved transparent protection cover 101 by the housing 150*f* via the buffer members 160V is adopted as described above regarding the configuration of the holding mode using the housing 150*f*. Thus, the buffer member 160V is somewhat compressed, and the outer shape end portion of the curved transparent protection cover 101 do not abut on side surfaces of the housing 150*f* of course even when the curved transparent protection cover 101 is curved to such an extent that the curved transparent protection cover 101 abuts on the holding surface 151S as the surface pressing stress FS is applied to the display surface side as illustrated in each cross-sectional view of FIGS. 28A and 28B. Further, a positional relationship between the side surface of the housing 150*f* and the outer shape end portion of the curved transparent protection cover 101 or a thickness of the buffer member 160V is configured so as not to prevent a repulsive force from the side surface of the housing 150*f* and the buffer member 160V from hindering the movement of the outer shape end portion of the curved transparent protection cover 101 spreading outward within a range where the curved transparent protection cover 101 is curved to such an extent as to abut on the holding surface 151S.

On the contrary, even in a state where the surface pressing stress FS is not applied as in FIGS. 27A and 27B, the curved transparent protection cover 101 is in the state of being sandwiched from both sides by the buffer members 160V and held by the housing 150*f* (particularly the rear frame 150R) with the buffer members 160V therebetween. Even if some vibration or the like is applied, the liquid crystal panel 100 and the curved transparent protection cover 101 can be held in the housing 150*f* without rattling or the like.

As the basic effects of the present invention have been described in the first preferred embodiment, even the curved display 10*f* of the seventh preferred embodiment described above adopts the configuration in which the liquid crystal panel 100 including the pair of glass substrates (the glass substrate 111 and the glass substrate 121) is incorporated in the curved shape curved in the one curve direction, the density of the columnar spacers holding the gap between these substrates is higher in the region of the central portion in the curve direction than in the region of the peripheral portion, in a state where the surface pressing stress FS except for the atmospheric pressure is not applied to the surface of the liquid crystal panel 100, and the housing 150*f*, which holds the outer peripheral portion of the liquid crystal panel 100 such that the curved shape is variable when the surface pressing stress FS is applied, in a state where the clearance GP1 is provided in the central portion of the liquid crystal panel 100, is provided for the holding mode of holding the liquid crystal panel 100. Thus, it is possible to prevent the damage of the liquid crystal panel 100 even if the relatively weak liquid crystal panel 100, made of the pair of thinned glass substrates, is used to be formed in the curved shape, and to make the display unevenness hardly occur even when the surface pressing stress FS is applied as a person touches the liquid crystal panel 100.

Further, the curved display 10*f* of the seventh preferred embodiment have the following features: the projected capacitive type touch panel TP having the same features as those of the first preferred embodiment is used; the curved transparent protection cover 101 having the curved shape with a predetermined curvature is pasted to and integrated with the surface on the display surface side of the liquid crystal panel 100 to which the surface pressing stress FS is applied via the adhesive layer; the curved transparent protection cover 101 integrated with the liquid crystal panel 100 is provided with the protruding portion protruding from the end portion of the liquid crystal panel 100 as the holding mode of the liquid crystal panel 100, and the holding of the outer peripheral portion of the liquid crystal panel 100 by the housing 150 is performed by holding the protruding portion; and the holding surface 151M that mainly holds the liquid crystal panel 100 is provided on the two non-curved sides of the liquid crystal panel 100, and the holding surfaces 151S opposing with the gap portion (clearance GP1) is provided with respect to the curved transparent protection cover 101, which is another member integrated with the liquid crystal panel 100 to form the stacked body, or the liquid crystal panel 100 on both the two sides along the curve direction. Thus, it is possible to obtain the effects, obtained by the features described in the first preferred embodiment, in common.

As described above, in each of the holding modes of holding the liquid crystal panel 100 using the housing 150*a* to the housing 150*e* described in the first to the sixth preferred embodiments, the description has been given using the example of holding the two non-curved sides of the liquid crystal panel 100 from the lower side by the holding surface 151M or the holding surface 152M provided in each housing and the example of performing the holding by the holding surface 151M via the buffer member 160F or the buffer member 160H. However, the present invention is not limited to the mode of performing the holding from the lower side by providing the holding surface such as the holding surface 151M and the holding surface 152M, and can be changed to a mode of holding the two sides using any holding mode in which flexibility is provided to some extent so that holding can be continued even if the curved shapes of the liquid crystal panel changes.

More specifically, for example, a mode in which the curved panel 100 used in the housing 150*f* holding the liquid crystal panel 100 whose front side is curved to form a convex surface in the seventh preferred embodiment is sandwiched from both sides via the buffer members 160V may be applied so as to partially change each of the holding modes of holding the liquid crystal panel 100 using the housing 150*a* to the housing 150*e* described in the first to sixth preferred embodiments, particularly, the mode of holding the two non-curved sides of the liquid crystal panel 100 into the above-described mode of sandwiching the liquid crystal panel 100 from both the sides via the buffer members 160V. With such a holding mode, the holding can be performed without hindering the variation of the curvature of the curved panel by adopting the holding mode of providing the clearance with respect to the housing in the central portion in the curve direction of the liquid crystal panel similarly to the housing described in each of the preferred embodiments, and it is possible to obtain substantially the same operations and effects as those of the curved display 10 to the curved display 10*e* in the respective first to sixth preferred embodiments. Therefore, it is not always necessary to use the mode of holding from the lower side by the holding surface provided in the housing.

Further, as described above, the liquid crystal panel 100 having the common configuration in the first to seventh preferred embodiments has been described regarding the configuration in which the dual spacer structure including both the main spacer 125*m* being relatively high and the sub-spacer 125*s* being relatively low is provided for the columnar spacers arranged in the display region 200, and the main spacers 125*m* functioning as the columnar spacers holding the gap between the glass substrate 111 and the glass substrate 121 in the display region 200 particularly in the state where the external force except for the atmospheric pressure is not applied to the surface of the liquid crystal panel 100 are arranged such that the density thereof increases toward the central portion in the curve direction. However, the basic contents of the present invention can be applied without being limited to the curved display using the liquid crystal panel 100 having the dual spacer structure.

Specifically, regarding the columnar spacers arranged in the display region 200, a curved display in which a liquid crystal panel having a single spacer structure basically formed of columnar spacers all of which have the same height is curved may be used. That is, it is also possible to change to a configuration having the single spacer structure corresponding to a configuration obtained by omitting only the configuration of the sub-spacer 125*s* having the relatively low height from the liquid crystal panel 100 of the first to the seventh preferred embodiment. In such a case, all. of the columnar spacers arranged in the display region 200 function as the columnar spacers holding the gap between the glass substrate 111 and the glass substrate 121 in the display region 200 in the state where the external force except for the atmospheric pressure is not applied to the surface of the liquid crystal panel 100. Thus, it is preferable to arrange all the columnar spacers arranged in the display region 200 basically such that the density increases toward the central region from the peripheral region in the curve direction similarly to the case of setting the density regarding the density of the main spacers 125*m*. With the above configuration, it is possible to obtain the basic effects obtained in the respective preferred embodiments, that is, effects excluding the effects peculiar to the configuration having the dual spacer structure.

Further, the liquid crystal panel 100 having the common configuration in the first to seventh preferred embodiments is preferably used in the curved display in terms of a viewing angle characteristic regarding an operation mode thereof, and thus, the description has been given by exemplifying the liquid crystal panel 100 using the FFS type among the transverse electric field type. However, a liquid crystal panel of another transverse electric field type using a comb tooth electrode having a comb-tooth shape for both the pixel electrode and the counter electrode may be used as also exemplified above. Even the liquid crystal panel of the transverse electric field type other than the FFS type has a relatively high viewing angle characteristic, and thus, can be suitably used. Further, the present invention is not limited to the transverse electric field type, and can be applied to, for example, even a liquid crystal panel of a vertical electric field type such as a liquid crystal panel of a twisted nematic (TN) type without any problem.

Further, regarding the columnar spacers arranged in the display region 200 in the liquid crystal panel 100 having the common configuration in the first to seventh preferred embodiments, the configuration in which the columnar spacers holding the gap between the glass substrate 111 and the glass substrate 121 in the display region 200 are arranged such that the density increases toward the region of the central portion from the region of the peripheral portion in the curve direction in a state where the external force except for the atmospheric pressure is not applied to the surface of the liquid crystal panel 100 has been described as the most effective mode to obtain the complex effects in combination with the housings 150 to 150f used in the respective modes of the first to the seventh preferred embodiments. However, it is also possible to form a curved display in which a liquid crystal panel which does not have the features of the liquid crystal panel 100 relating particularly to the feature of the density of the columnar spacers is held by the holding modes of using the housings 150 to 150f used in the respective modes of the first to the seventh preferred embodiments, and it is possible to obtain the operations and effects generated singly with each of the holding modes even in this curved display.

For example, as the operations common to the respective holding modes using the housings 150 to 150f, it is possible to obtain the operation of mitigating the influence of the surface pressing stress FS directly acting on the liquid crystal panel surface held by these housings 150 to 150f when the surface pressing stress FS is applied and the operation of limiting the degree of deformation (curvature variation) within a certain range basically by suppressing the degree of deformation (curvature variation) caused by the application of the surface pressing stress FS. With these operations, it is possible to obtain not only the basic effects of making the damage of the liquid crystal panel hardly occur but also the operation of making display unevenness hardly occur due to the gap variation of the liquid crystal panel caused by the surface pressing stress FS acting directly on the liquid crystal panel surface and the gap variation caused depending on the degree of curved deformation of the liquid crystal panel to some extent although it is inferior to the operations obtained in the first to seventh preferred embodiments. That is, even in the case of the curved display obtained by changing the configuration of the liquid crystal panel 100 as described above, it is possible to obtain the basic effects of the present invention such as the effect of preventing the damage of the liquid crystal panel and the effect of making the display unevenness hardly occur when a person touches the liquid crystal panel although there is a difference in degree.

Further, the present invention is not limited to the first to seventh preferred embodiments and the modifications or the configurations suggesting modifications as described above, and some configurations can be changed to known configurations as appropriate within a range not departing from a gist of the present invention. Further, the first to seventh preferred embodiments and the modifications or the configurations suggesting modifications thereof, which have been described above, can be applied in combination with each other within a range not causing contradiction, and it is possible to obtain the respective effects caused by the respective configurations and combined effects thereof.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal display apparatus in which a liquid crystal panel including a pair of glass substrates is incorporated in a curved shape curved in one curve direction, wherein regarding a density of columnar spacers holding a gap between the pair of glass substrates in a display region of the liquid crystal panel in a state where an external force except for an atmospheric pressure is not applied to a surface of the liquid crystal panel, the density in a region of a central portion in the curve direction is higher than the density of a region of a peripheral portion in the curve direction, the liquid crystal display apparatus comprising a housing that holds an outer peripheral portion of the liquid crystal panel such that a curvature of the curved shape is variable when the external force is applied to the surface of the liquid crystal panel in a state where a first gap portion is provided between the housing and the liquid crystal panel in the central portion of the liquid crystal panel, and the liquid crystal panel and the housing are not adhered to one another in the first gap portion.

2. The liquid crystal display apparatus according to claim 1 further comprising a transparent protection plate having a curved shape with a predetermined curvature on a display surface side of the liquid crystal panel, wherein the liquid crystal panel is pasted via an adhesive layer so as to follow the curved shape of the transparent protection plate to be integrated with the transparent protection plate to form a stacked body.

3. The liquid crystal display apparatus according to claim 2, wherein the transparent protection plate is provided with a protruding portion whose outer shape protrudes from an end portion of the liquid crystal panel, and the holding of the outer peripheral portion of the liquid crystal panel by the housing is performed by holding the protruding portion.

4. The liquid crystal display apparatus according to claim 1, wherein the holding of the outer peripheral portion of the liquid crystal panel by the housing is performed by holding two non-curved sides in a direction perpendicular to the curve direction among four sides of the outer peripheral portion of the liquid crystal panel by the housing, on both two sides along the curve direction, the gap portion is provided between the housing and the liquid crystal panel in a state where the external force is not applied, and a second gap portion is further provided between the housing and another member when the liquid crystal panel is integrated with the other member to form a stacked body, the liquid crystal panel and the housing are not adhered to one another in the first gap portion, and the other member and the housing are not adhered to one another in the second gap portion.

5. The liquid crystal display apparatus according to claim 4, wherein in the housing, a first holding surface holding the liquid crystal panel is provided on the two non-curved sides, and a second holding surface, which opposes the liquid crystal panel or the other member with the first gap portion or the second gap portion, is provided on both the two sides along the curve direction.

6. The liquid crystal display apparatus according to claim 5, wherein the second holding surface has a curved surface having a curvature along the curved shape of the liquid crystal panel when the external force is applied to the liquid crystal panel and the liquid crystal panel abuts on the second holding surface.

7. The liquid crystal display apparatus according to claim 5, wherein a buffer member is arranged in the first and second gap portions on both the two sides along the curve direction.

8. The liquid crystal display apparatus according to claim 1, wherein the holding of the outer peripheral portion of the liquid crystal panel by the housing is performed with a buffer member interposed between the housing and the liquid crystal panel or between the housing and another member when the liquid crystal panel is integrated with the other member to form a stacked body, on all four sides of the outer peripheral portion of the liquid crystal panel.

9. The liquid crystal display apparatus according to claim 8, wherein the buffer members are provided such that the buffer member provided on both the two sides along the curve direction is made of a member having a larger deformation amount when a pressure is applied as compared with the buffer member provided on the two non-curved sides.

10. The liquid crystal display apparatus according to claim 1, wherein the columnar spacer forms a main spacer in a dual spacer structure, the liquid crystal display apparatus further comprising a sub-spacer between the pair of glass substrates, the sub-spacer holding the gap between the pair of glass substrates by abutting only on one of the pair of glass substrates in a state where the external force is not applied and abutting on both the pair of glass substrates only when the pair of glass substrates are brought close to each other within a range where the main spacer elastically deforms.

11. The liquid crystal display apparatus according to claim 10, wherein the density of the columnar spacer forming the main spacer in the display region is set within a predetermined range to avoid low-temperature foaming and gravity unevenness in the liquid crystal panel.

12. The liquid crystal display apparatus according to claim 11, wherein the density is within a range of 0.005% to 0.02%.

13. The liquid crystal display apparatus according to claim 10, wherein a total density of the main spacer and the sub-spacer is constant in the display region.

14. The liquid crystal display apparatus according to claim 10, wherein regarding a total density of the main spacer and the sub-spacer, the main spacer and the sub-spacer are arranged such that the density in the region of the central portion in the curve direction is higher than the density in the region of the peripheral portion in the curve direction.

15. The liquid crystal display apparatus according to claim 1 further comprising a projected capacitive type touch panel on a surface of the liquid crystal panel on a display surface side.

16. A liquid crystal display apparatus in which a liquid crystal panel including a pair of glass substrates is incorporated in a curved shape curved in one curve direction, the liquid crystal panel is integrated with another member to form a stacked body, the liquid crystal display apparatus comprising a housing that holds an outer peripheral portion of the other member such that a curvature of the curved shape is variable when an external force is applied to a surface of the liquid crystal panel, wherein the holding of the outer peripheral portion of the other member by the housing is performed as the housing holds two non-curved sides in a direction perpendicular to the curve direction among four sides of the outer peripheral portion of the other member, on both two sides along the curve direction, a first gap portion is provided between the housing and the liquid crystal panel, and a second gap portion is provided between the housing and the other member, in a central portion in the curve direction in a state where the external force is not applied, the liquid crystal panel and the housing are not adhered to one another in the first gap portion, and the other member and the housing are not adhered to one another in the second gap portion.

17. The liquid crystal display apparatus according to claim 16, wherein in the housing, a first holding surface holding the other member is provided on the two non-curved sides, and a second holding surface, which opposes the other member with the second gap portion, is provided on both the two sides along the curve direction.

18. The liquid crystal display apparatus according to claim 17, wherein the second holding surface has a curved surface having a curvature along the curved shape of the liquid crystal panel when the external force is applied to the liquid crystal panel and the other member abuts on the second holding surface.

19. The liquid crystal display apparatus according to claim 18, wherein a buffer member is arranged in the first and second gap portions on both the two sides along the curve direction.

20. The liquid crystal display apparatus according to claim 16 further comprising a transparent protection plate having a curved shape with a predetermined curvature on a display surface side of the liquid crystal panel, wherein the liquid crystal panel is pasted via an adhesive layer so as to follow the curved shape of the transparent protection plate to be integrated with the transparent protection plate to form a stacked body.

21. The liquid crystal display apparatus according to claim 20, wherein
the transparent protection plate is provided with a protruding portion whose outer shape protrudes from an end portion of the liquid crystal panel, and
the holding of the outer peripheral portion of the liquid crystal panel by the housing is performed by holding the protruding portion.

22. The liquid crystal display apparatus according to claim 16 further comprising
a projected capacitive type touch panel on a surface of the liquid crystal panel on a display surface side.

23. A liquid crystal display apparatus in which a liquid crystal panel including a pair of glass substrates is incorporated in a curved shape curved in one curve direction, the liquid crystal display apparatus comprising
a housing that holds an outer peripheral portion of the liquid crystal panel such that a curvature of the curved shape is variable when an external force is applied to a surface of the liquid crystal panel, wherein
the holding of the outer peripheral portion of the liquid crystal panel by the housing is performed with buffer members interposed between the housing and the liquid crystal panel or between the housing and another member when the liquid crystal panel is integrated with the other member to form a stacked body, on all four sides of the outer peripheral portion of the liquid crystal panel, and
the buffer members are provided such that the buffer member provided on both two sides along the curve direction is made of a member having a larger deformation amount when a pressure is applied as compared with the buffer member provided on two non-curved sides.

24. The liquid crystal display apparatus according to claim 23 further comprising a transparent protection plate having a curved shape with a predetermined curvature on a display surface side of the liquid crystal panel, wherein
the liquid crystal panel is pasted via an adhesive layer so as to follow the curved shape of the transparent protection plate to be integrated with the transparent protection plate to form a stacked body.

25. The liquid crystal display apparatus according to claim 24, wherein
the transparent protection plate is provided with a protruding portion whose outer shape protrudes from an end portion of the liquid crystal panel, and
the holding of the outer peripheral portion of the liquid crystal panel by the housing is performed by holding the protruding portion.

26. The liquid crystal display apparatus according to claim 23 further comprising
a projected capacitive type touch panel on a surface of the liquid crystal panel on a display surface side.

* * * * *